United States Patent
Manchinasetti et al.

(10) Patent No.: US 10,606,542 B2
(45) Date of Patent: Mar. 31, 2020

(54) IMAGE DISPLAY APPARATUS

(71) Applicant: LG ELECTRONICS INC., Seoul (KR)

(72) Inventors: Sai Manchinasetti, Bengaluru (IN); Samavarthy Challagali, Bengaluru (IN); Reddy Pratap Ratakonda, Bengaluru (IN); Chanabasappa Chitrali, Bengaluru (IN)

(73) Assignee: LG ELECTRONICS INC., Seoul (KR)

( * ) Notice: Subject to any disclaimer, the term of this patent is extended or adjusted under 35 U.S.C. 154(b) by 315 days.

(21) Appl. No.: 15/403,778

(22) Filed: Jan. 11, 2017

(65) Prior Publication Data
US 2017/0199715 A1   Jul. 13, 2017

(30) Foreign Application Priority Data

Jan. 11, 2016 (KR) .................. 10-2016-0003106

(51) Int. Cl.
| | |
|---|---|
| G06F 3/14 | (2006.01) |
| G06F 3/048 | (2013.01) |
| H04N 5/445 | (2011.01) |
| H04N 5/44 | (2011.01) |
| H04N 21/414 | (2011.01) |
| H04N 21/41 | (2011.01) |
| H04N 21/431 | (2011.01) |
| G06F 3/0484 | (2013.01) |
| G06F 3/0482 | (2013.01) |

(Continued)

(52) U.S. Cl.
CPC .......... *G06F 3/1454* (2013.01); *G06F 3/0346* (2013.01); *G06F 3/048* (2013.01); *G06F 3/0482* (2013.01); *G06F 3/04847* (2013.01); *G06F 3/1462* (2013.01); *H04L 65/4015* (2013.01); *H04N 5/4403* (2013.01); *H04N 5/44582* (2013.01); *H04N 5/44591* (2013.01); *H04N 21/4122* (2013.01); *H04N 21/41407* (2013.01); *H04N 21/4314* (2013.01); *H04N 21/4316* (2013.01); *G06F 3/1423* (2013.01); *G09G 2354/00* (2013.01); *H04N 21/4854* (2013.01)

(58) Field of Classification Search
CPC ...... G06F 3/0346; G06F 3/048; G06F 3/1423; G06F 3/1454; G06F 3/1462; G09G 2354/00
See application file for complete search history.

(56) References Cited

U.S. PATENT DOCUMENTS

| | | |
|---|---|---|
| 2009/0174818 A1 | 7/2009 | Morita et al. |
| 2010/0247061 A1 | 9/2010 | Bennett et al. |

(Continued)

FOREIGN PATENT DOCUMENTS

| | | |
|---|---|---|
| EP | 2682859 A2 | 1/2014 |
| EP | 2741205 A2 | 6/2014 |
| EP | 2797329 A1 | 10/2014 |

*Primary Examiner* — Antonio Xavier
(74) *Attorney, Agent, or Firm* — Birch, Stewart, Kolasch & Birch, LLP

(57) ABSTRACT

An image display apparatus is disclosed. The image display apparatus includes a display, an interface unit to exchange data with a mobile terminal, and a controller configured to display an mirroring image received from the mobile terminal and to display additional information related to the mirroring image in a blank area other than a display area for display of the mirroring image.

15 Claims, 87 Drawing Sheets

(51) Int. Cl.
*G06F 3/0346* (2013.01)
*H04L 29/06* (2006.01)
*H04N 21/485* (2011.01)

(56) References Cited

U.S. PATENT DOCUMENTS

| | | | |
|---|---|---|---|
| 2012/0088548 A1* | 4/2012 | Yun | G08C 17/02 455/557 |
| 2013/0040623 A1* | 2/2013 | Chun | H04N 21/4126 455/414.2 |
| 2013/0094423 A1* | 4/2013 | Wengrovitz | H04L 12/1836 370/312 |
| 2013/0138728 A1* | 5/2013 | Kim | G06F 15/16 709/203 |
| 2013/0326397 A1* | 12/2013 | Kim | G06F 3/0484 715/781 |
| 2014/0002389 A1* | 1/2014 | Kim | G06F 3/1446 345/173 |
| 2014/0026068 A1* | 1/2014 | Park | G06F 3/0482 715/748 |
| 2014/0032635 A1* | 1/2014 | Pimmel | H04N 21/4126 709/203 |
| 2016/0007077 A1* | 1/2016 | Hoffert | H04N 5/44591 348/564 |
| 2016/0139868 A1* | 5/2016 | Vedula | H04W 76/10 715/738 |
| 2016/0350063 A1* | 12/2016 | Chen | G06F 3/1454 |

* cited by examiner

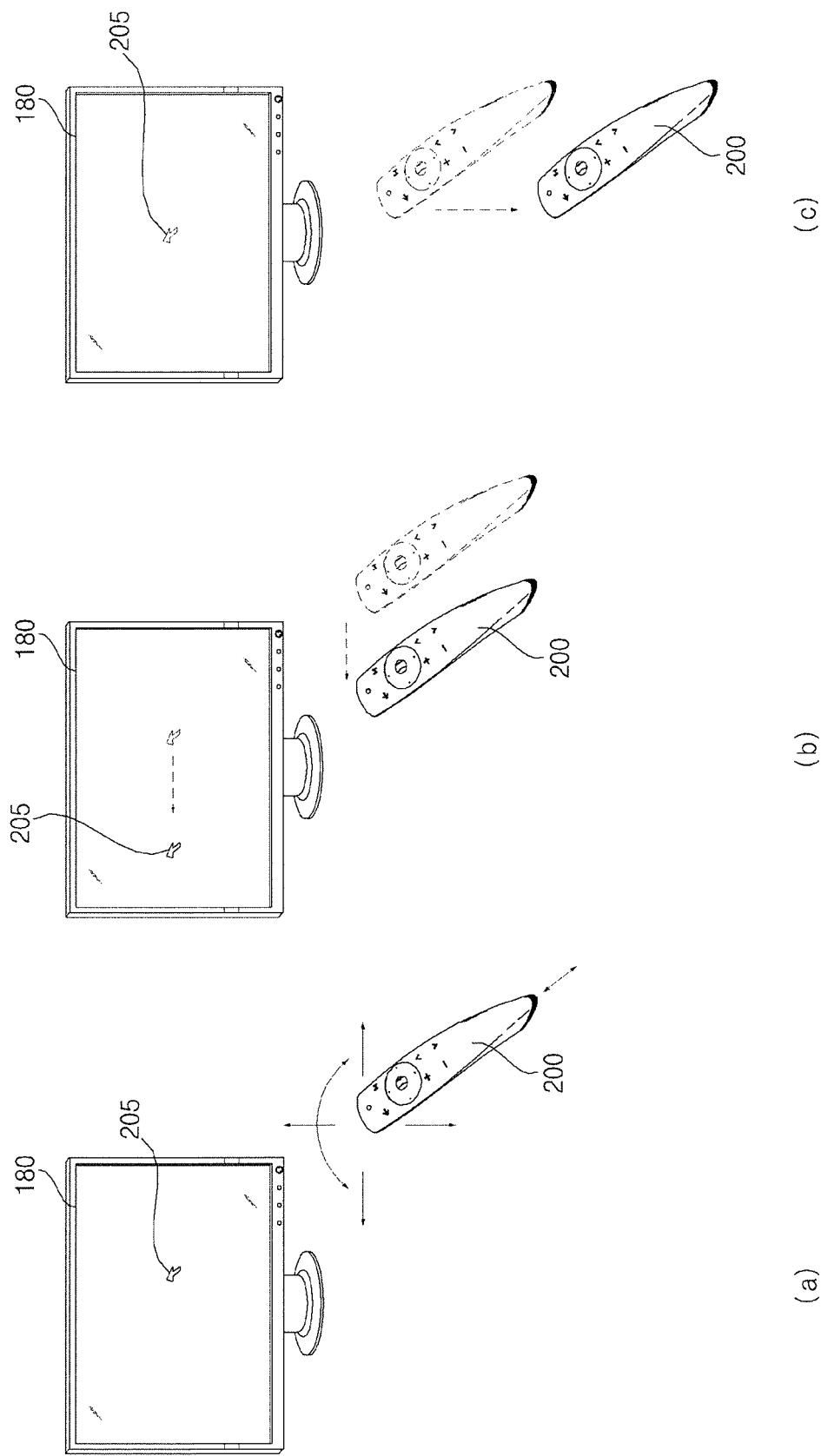

FIG. 7D
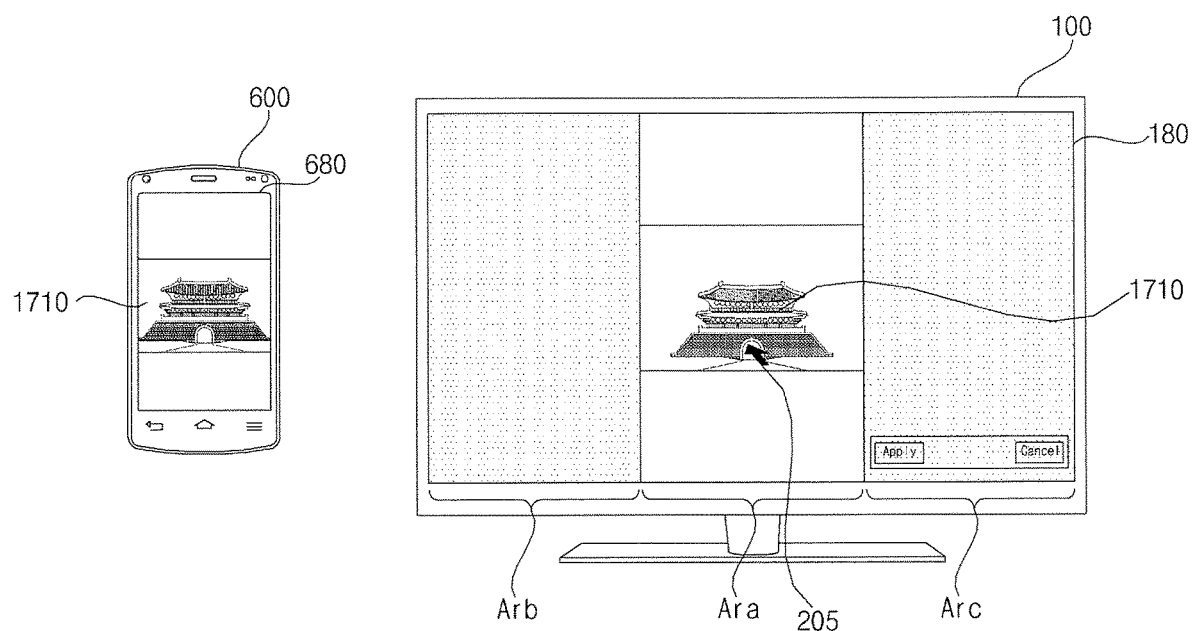
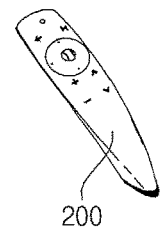

FIG. 7E
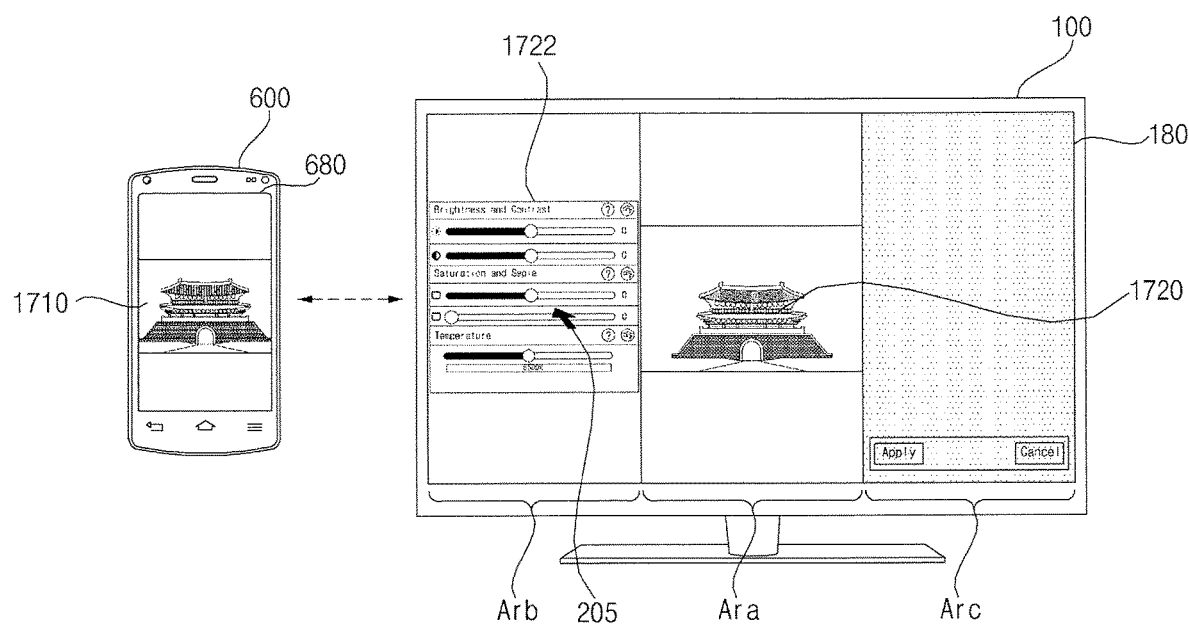
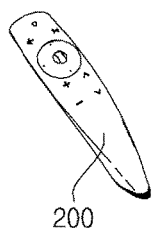

FIG. 8A
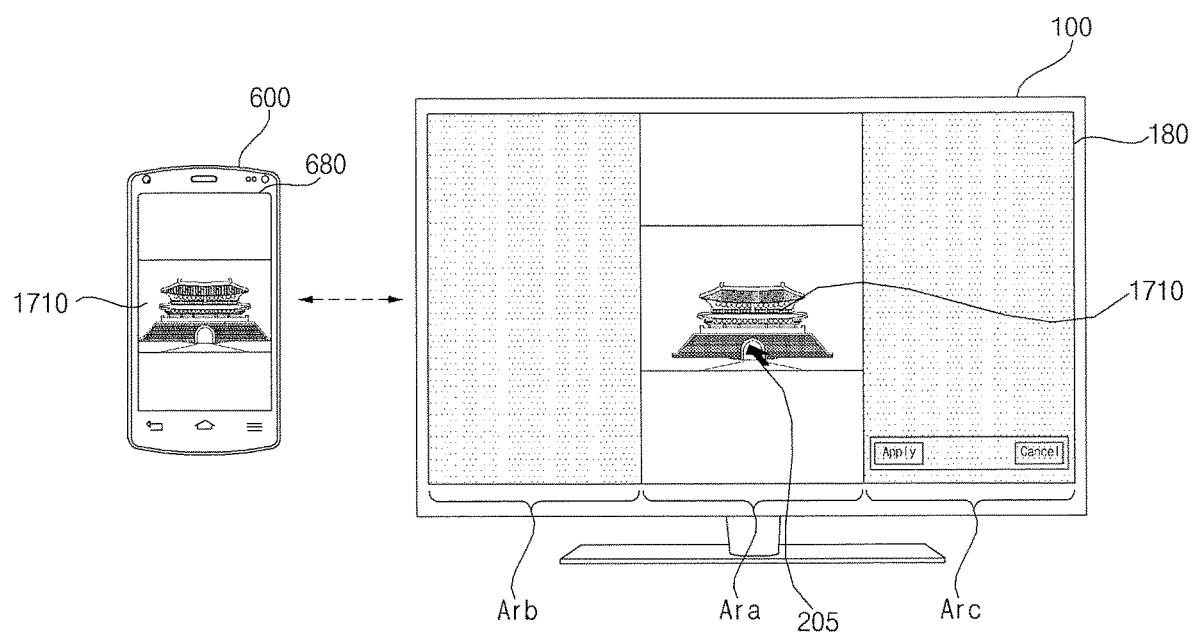
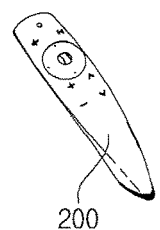

FIG. 8B
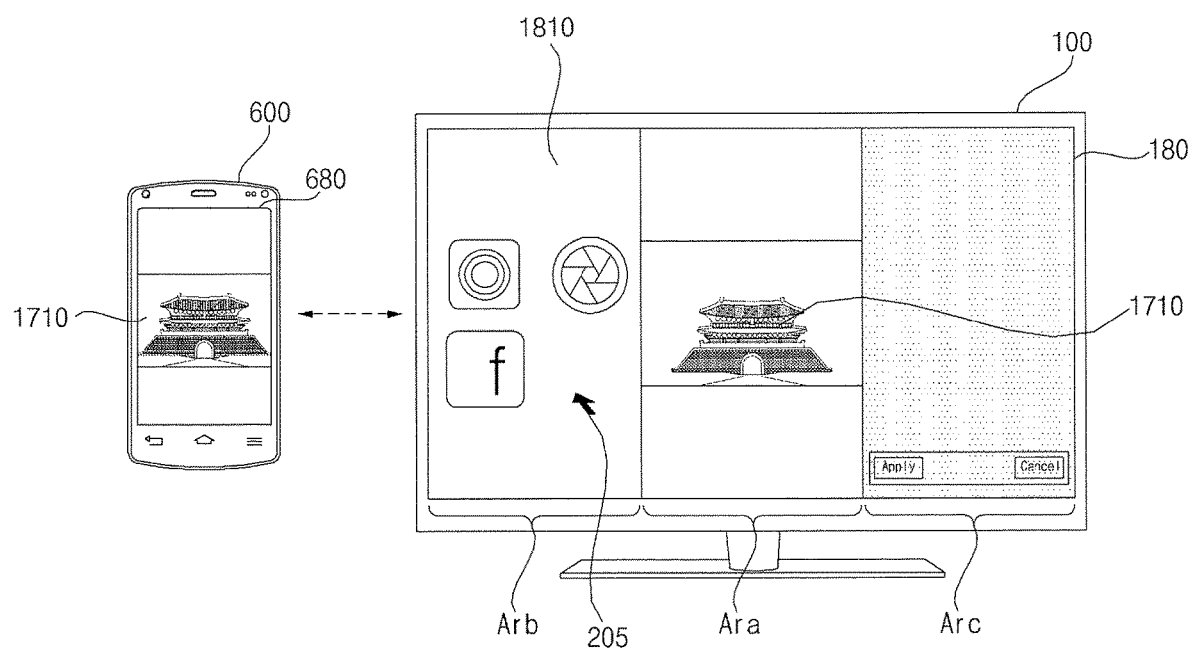
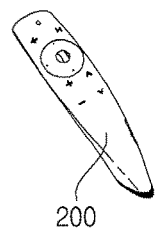

FIG. 8C
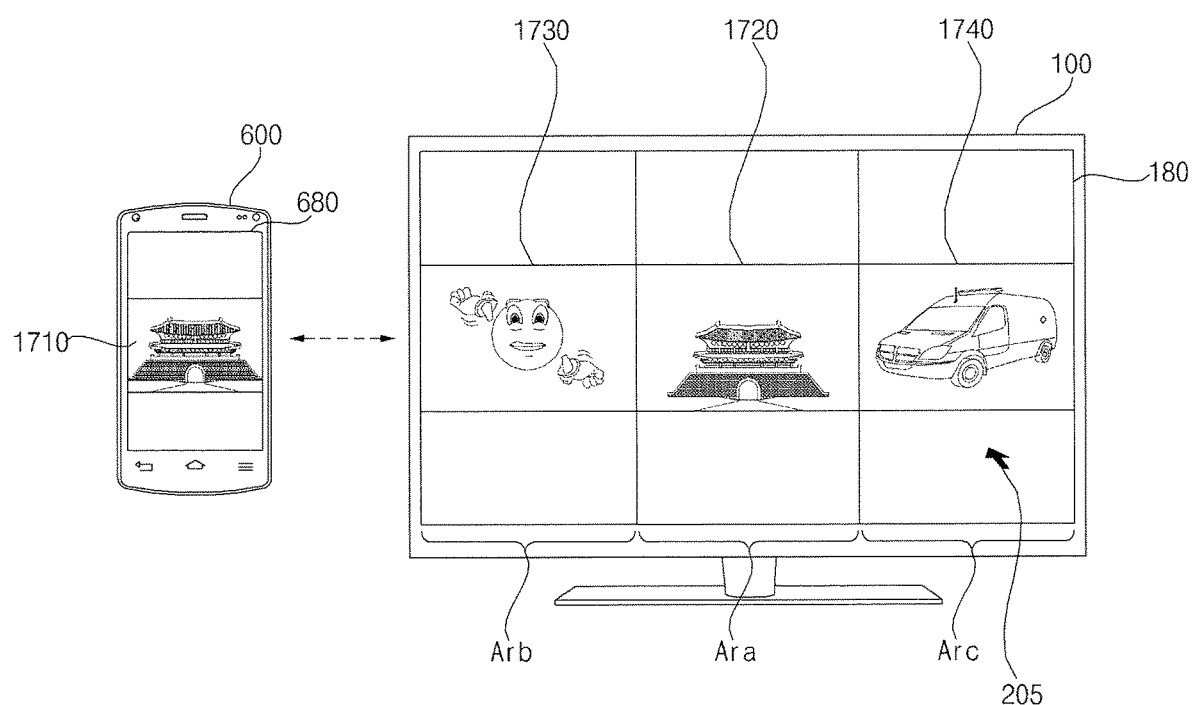
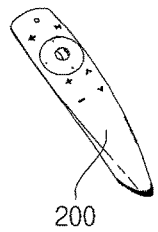

FIG. 9A
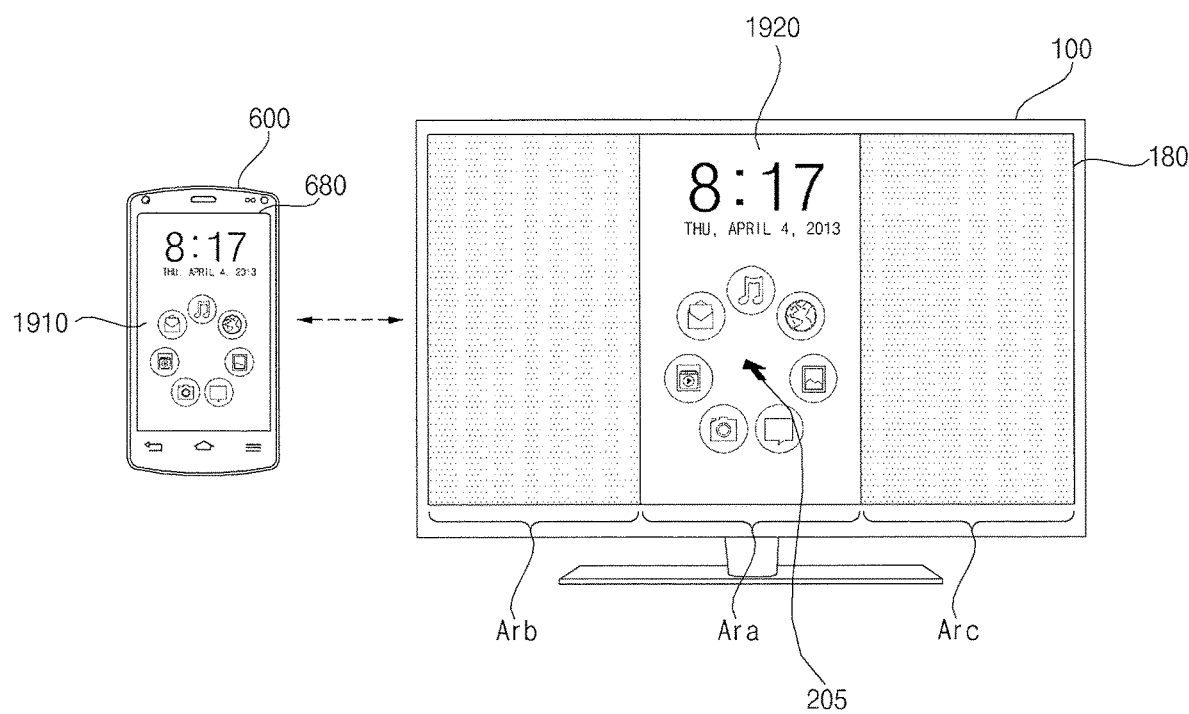
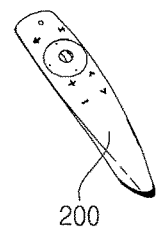

FIG. 9B
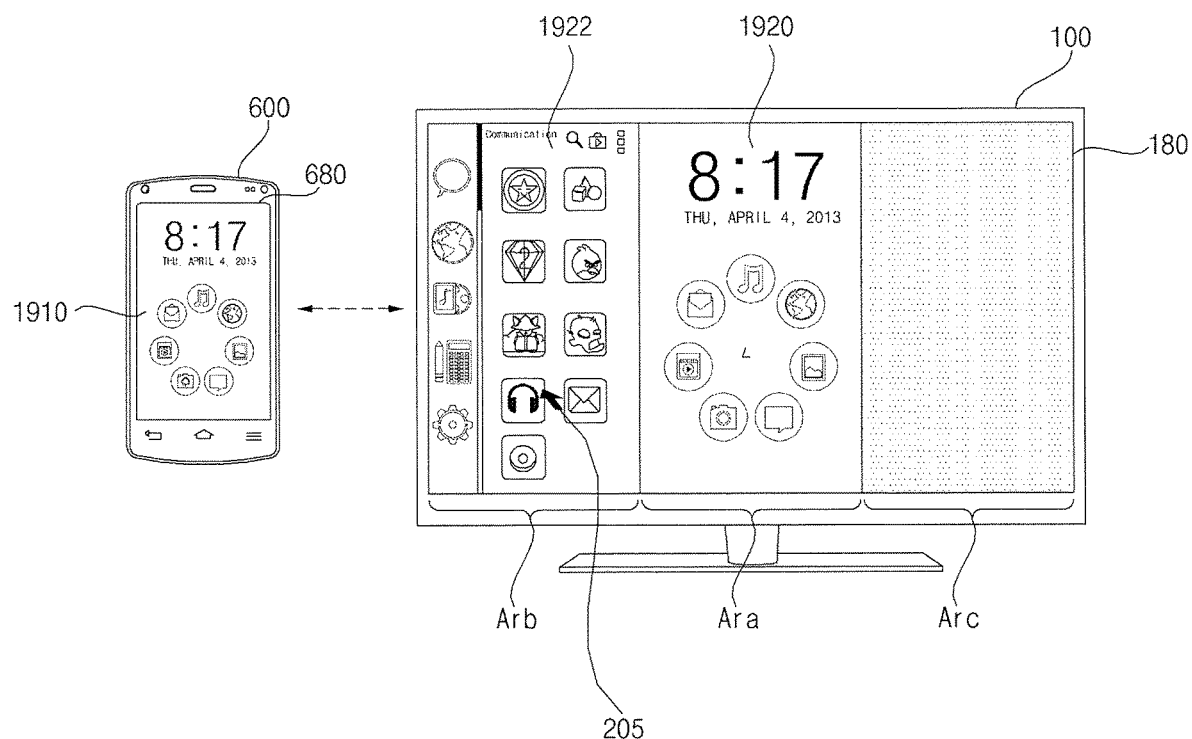
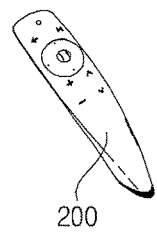

FIG. 9C
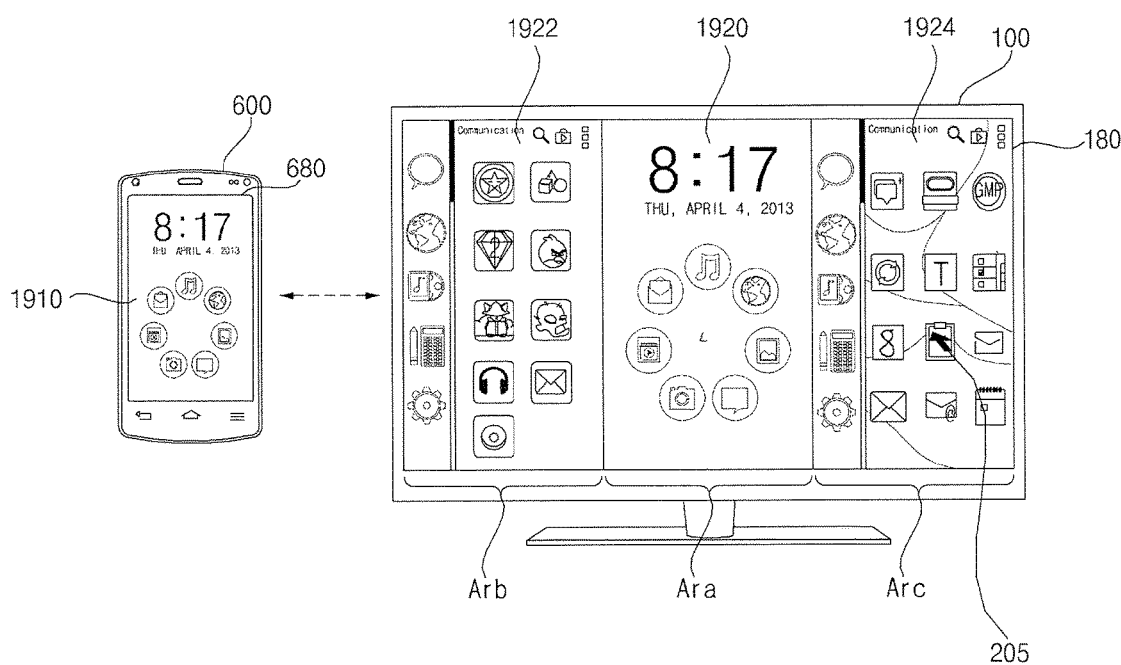
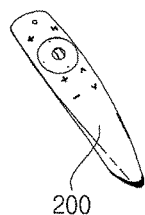

FIG. 11B
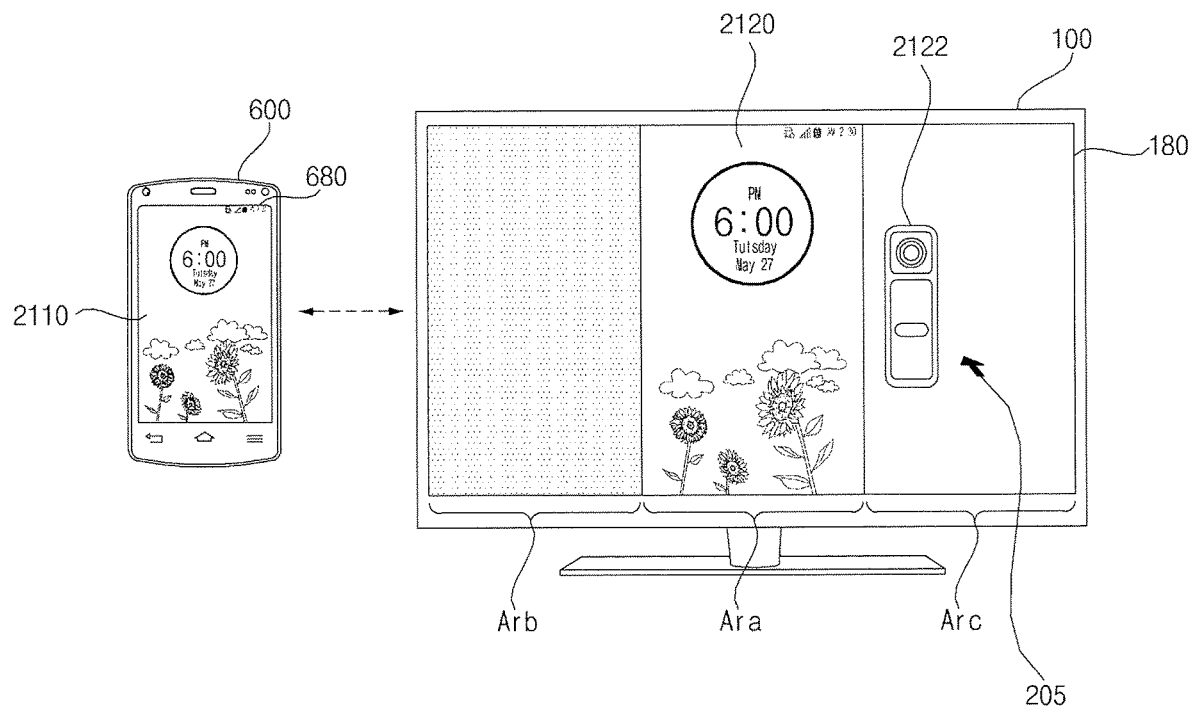
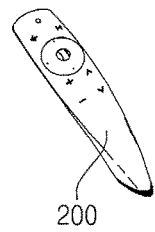

FIG. 11C
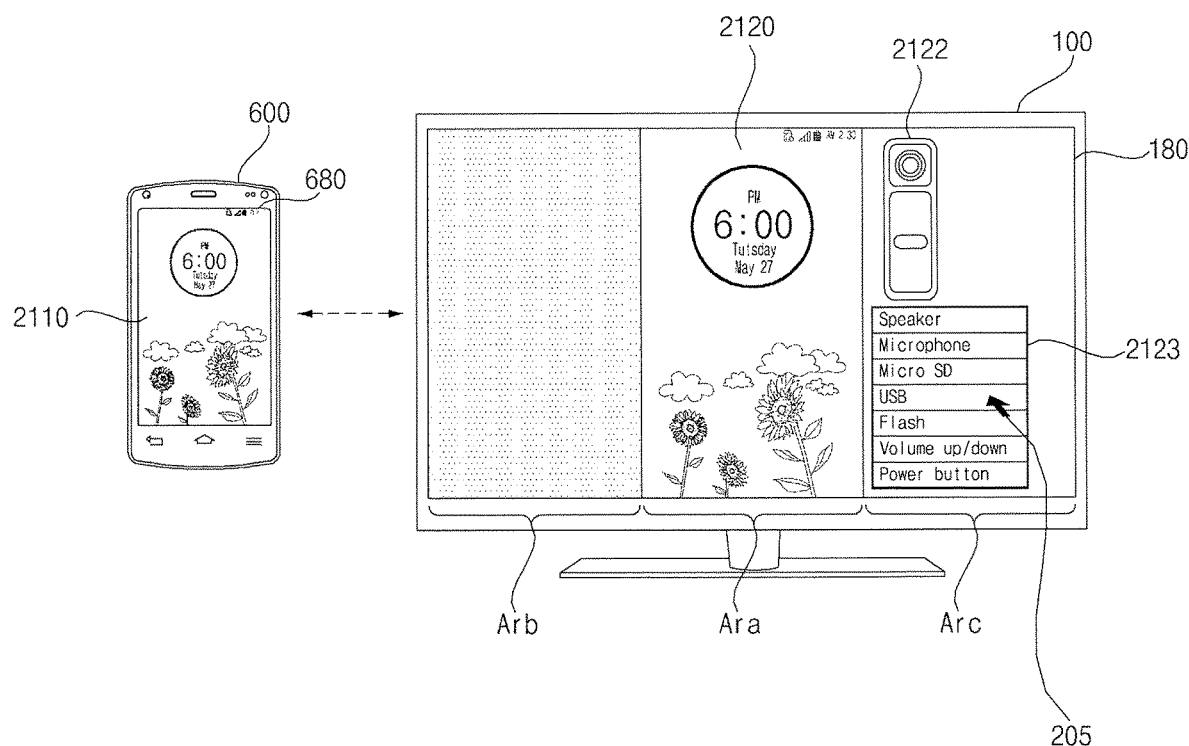
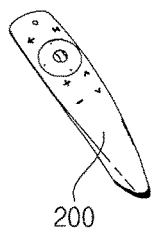

FIG. 11E
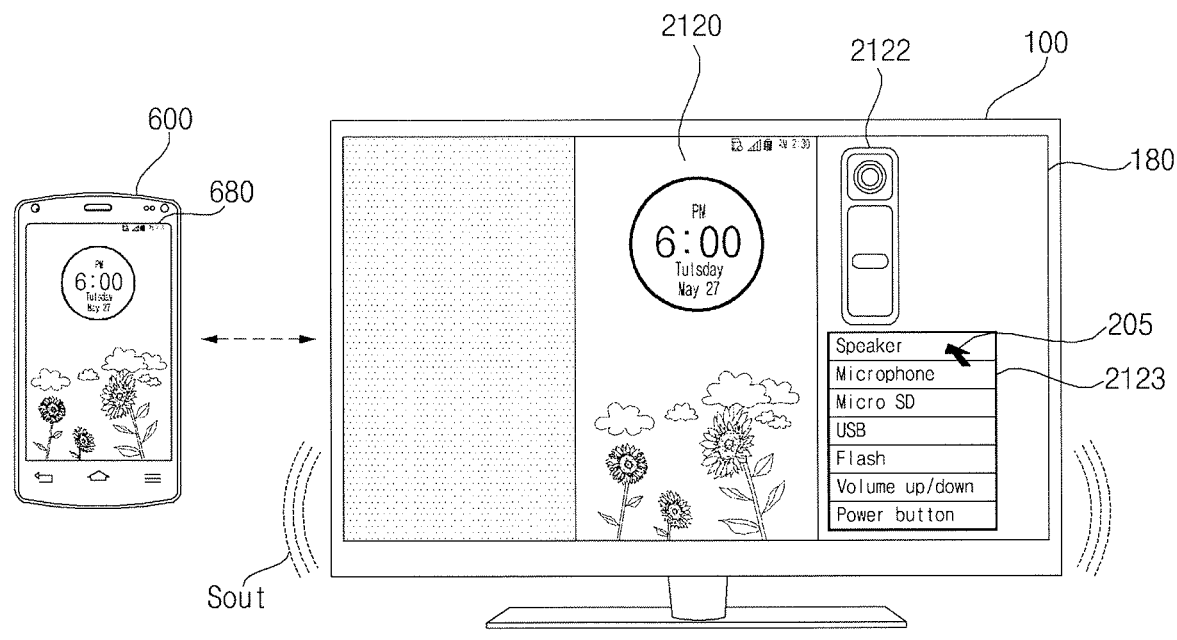
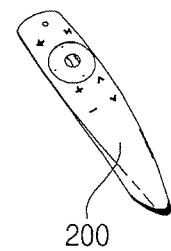

FIG. 11H
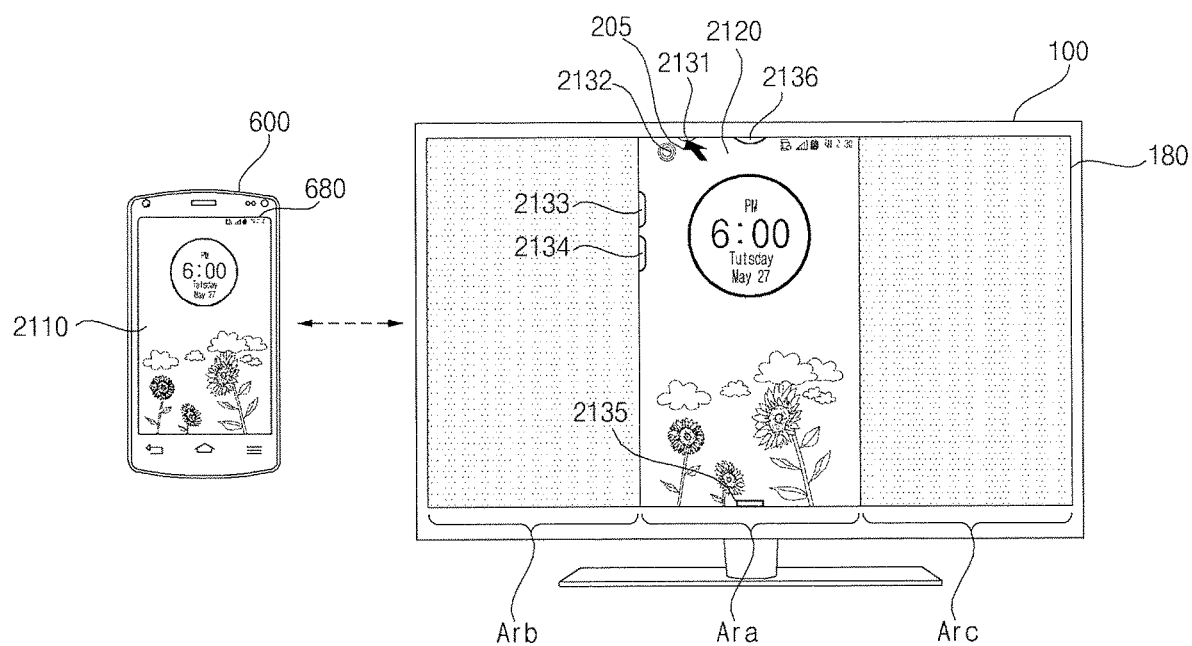
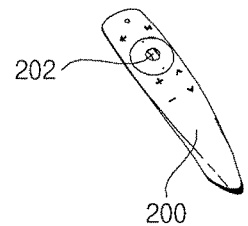

FIG. 11I
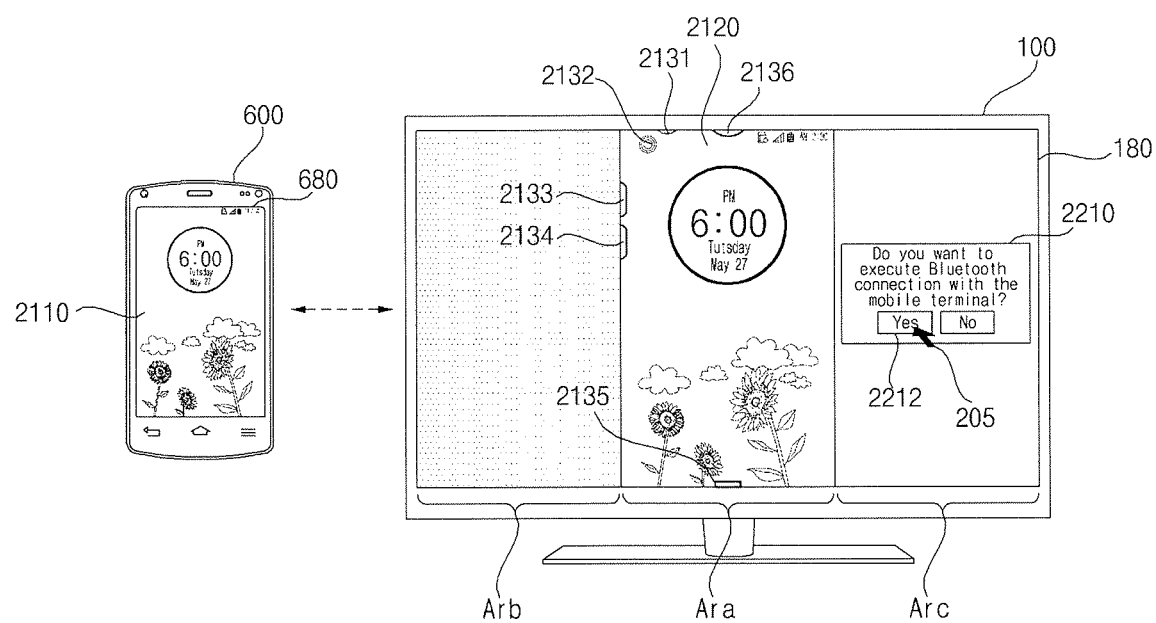
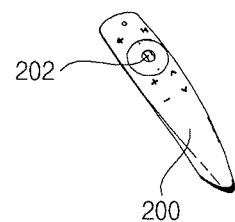

FIG. 11J
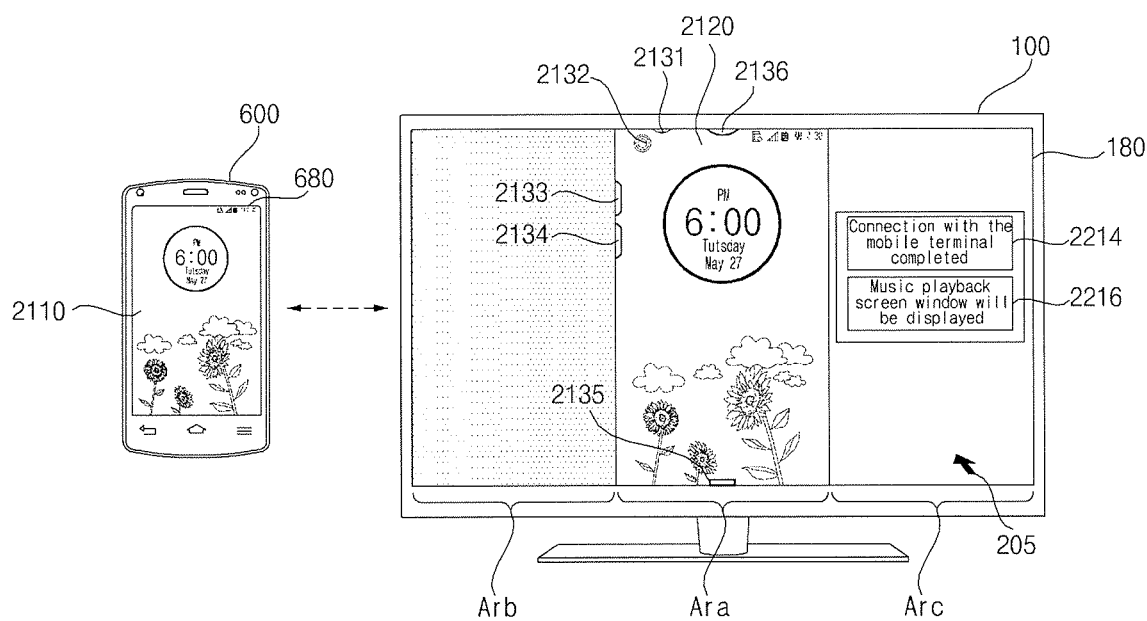
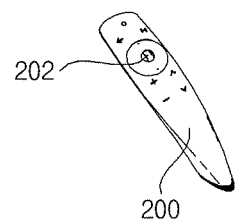

FIG. 11K
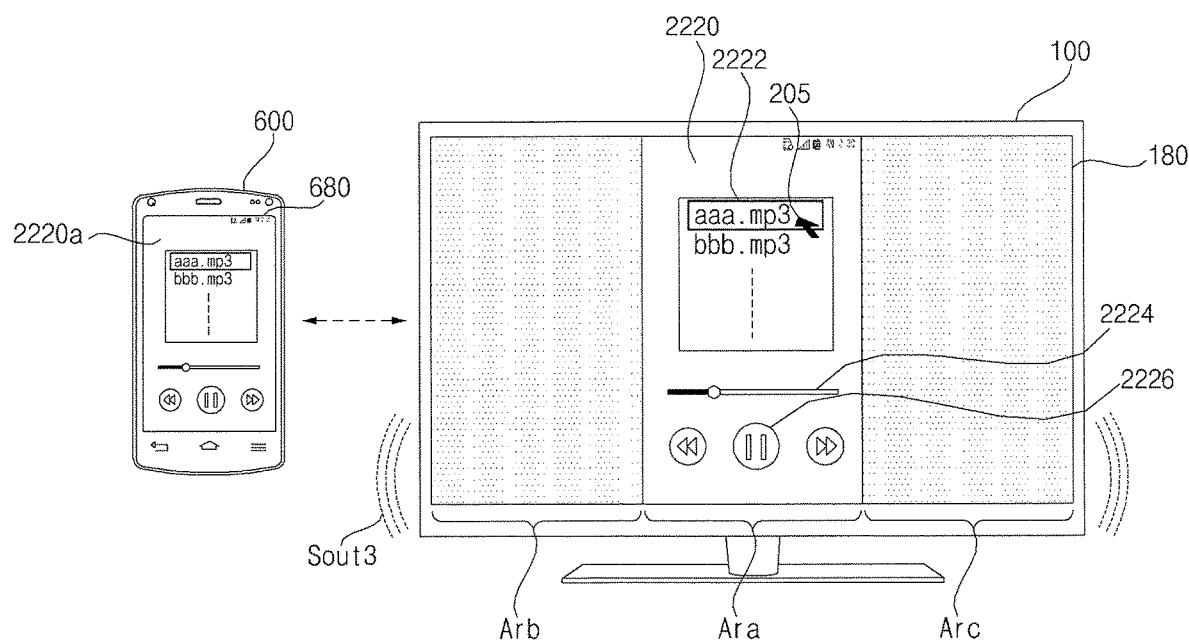
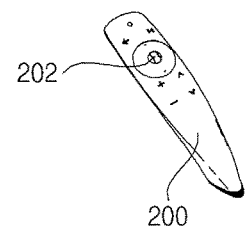

FIG. 13G
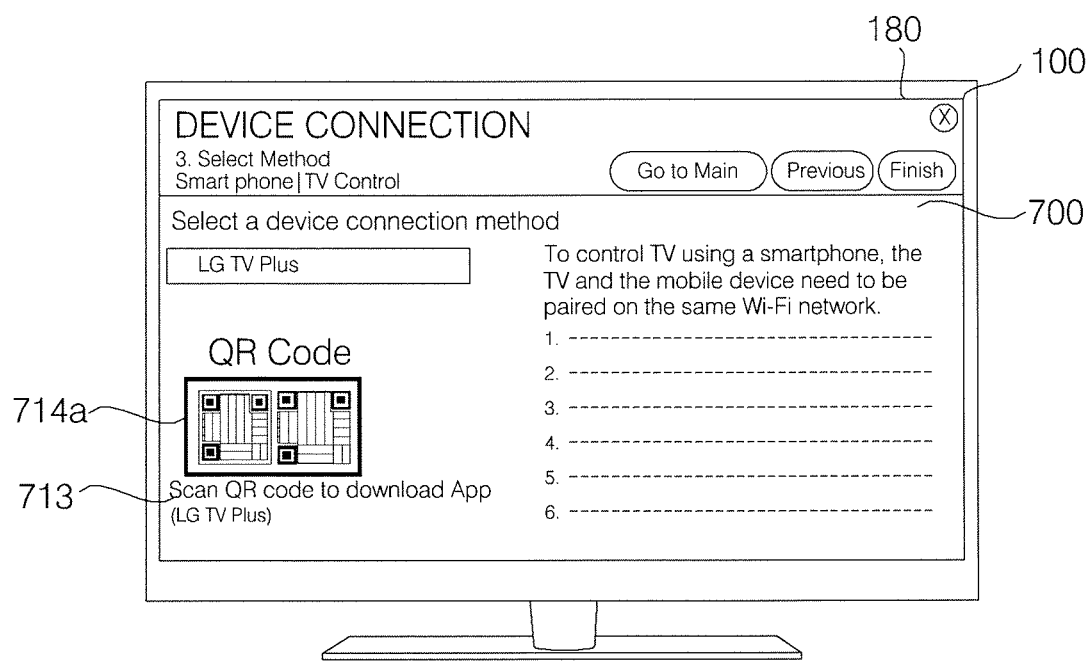
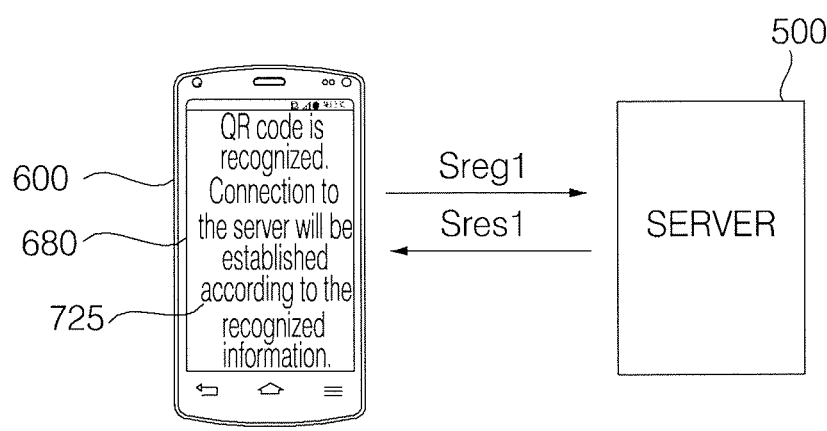

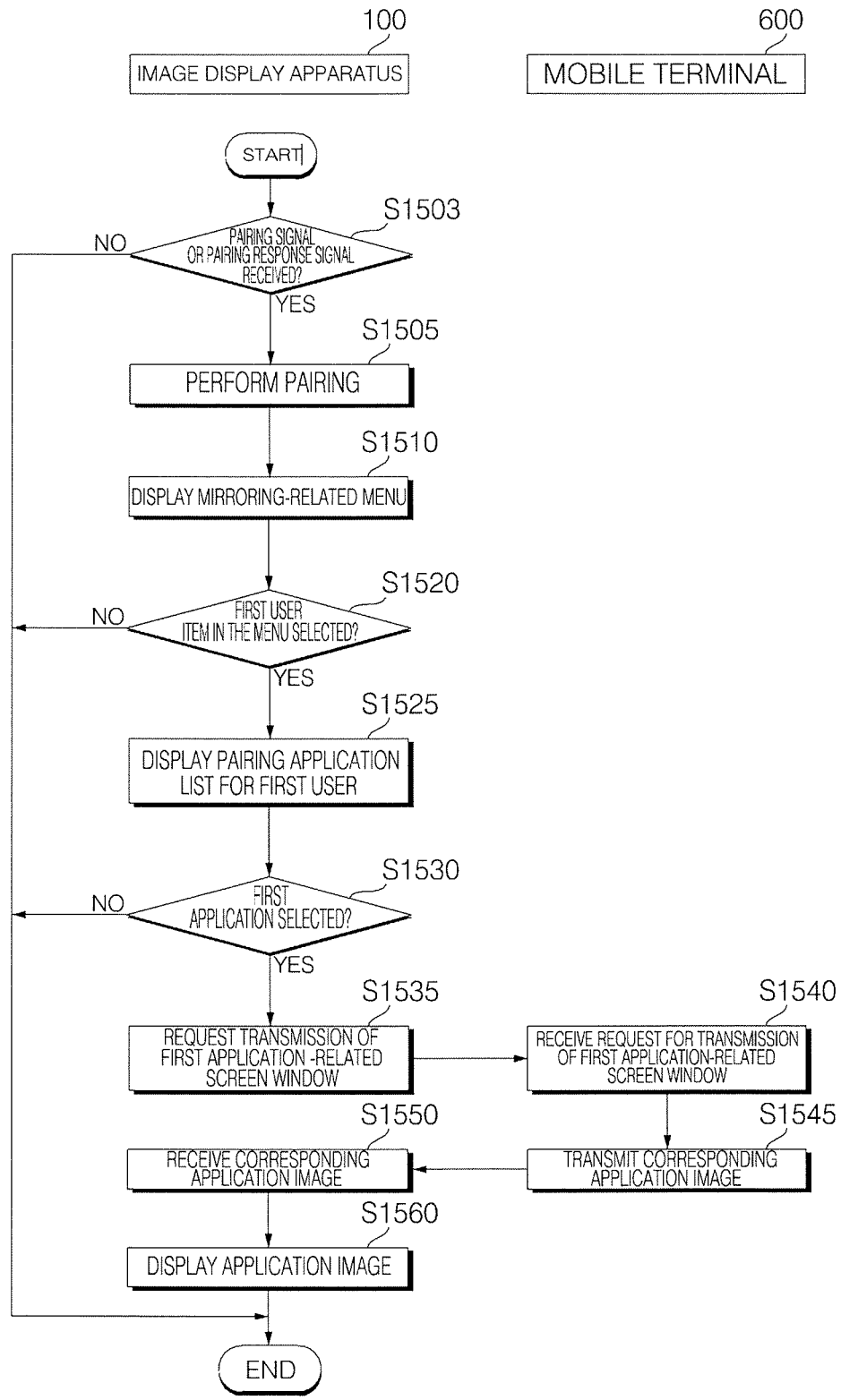

FIG. 17A
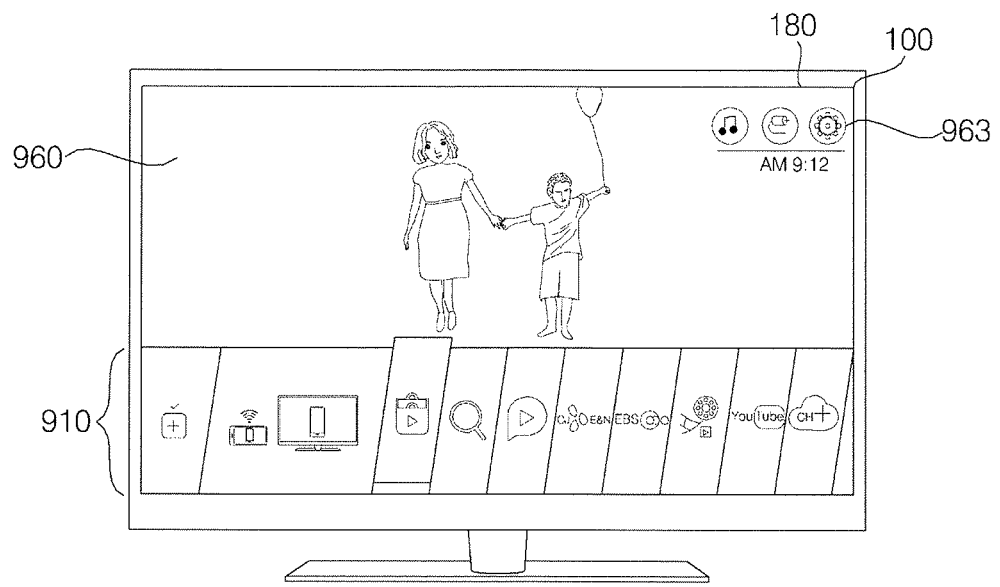
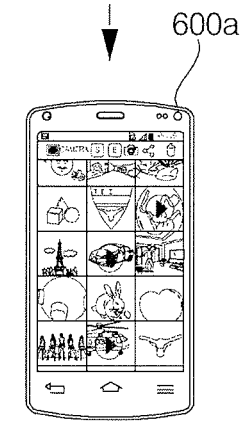

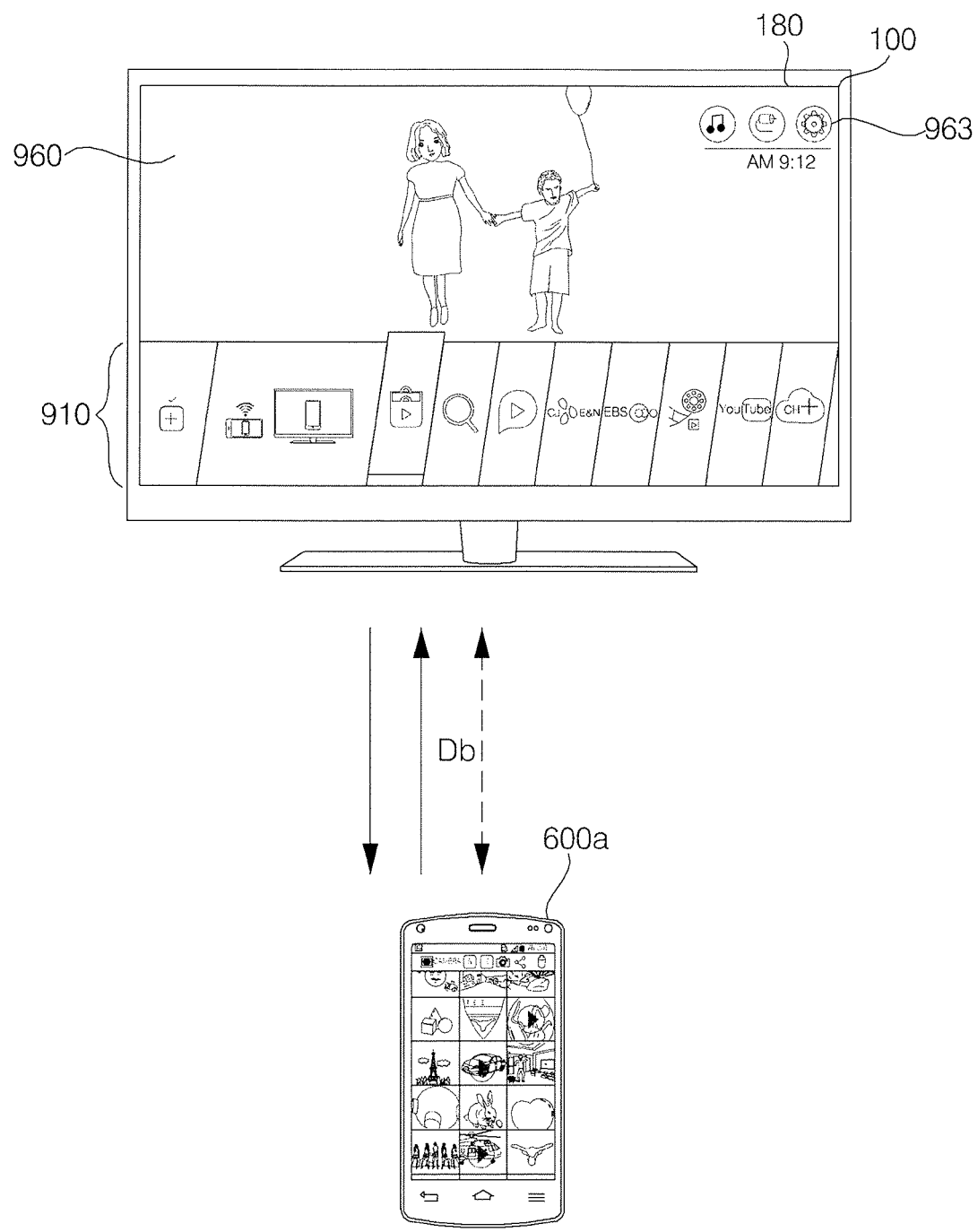

FIG. 17E
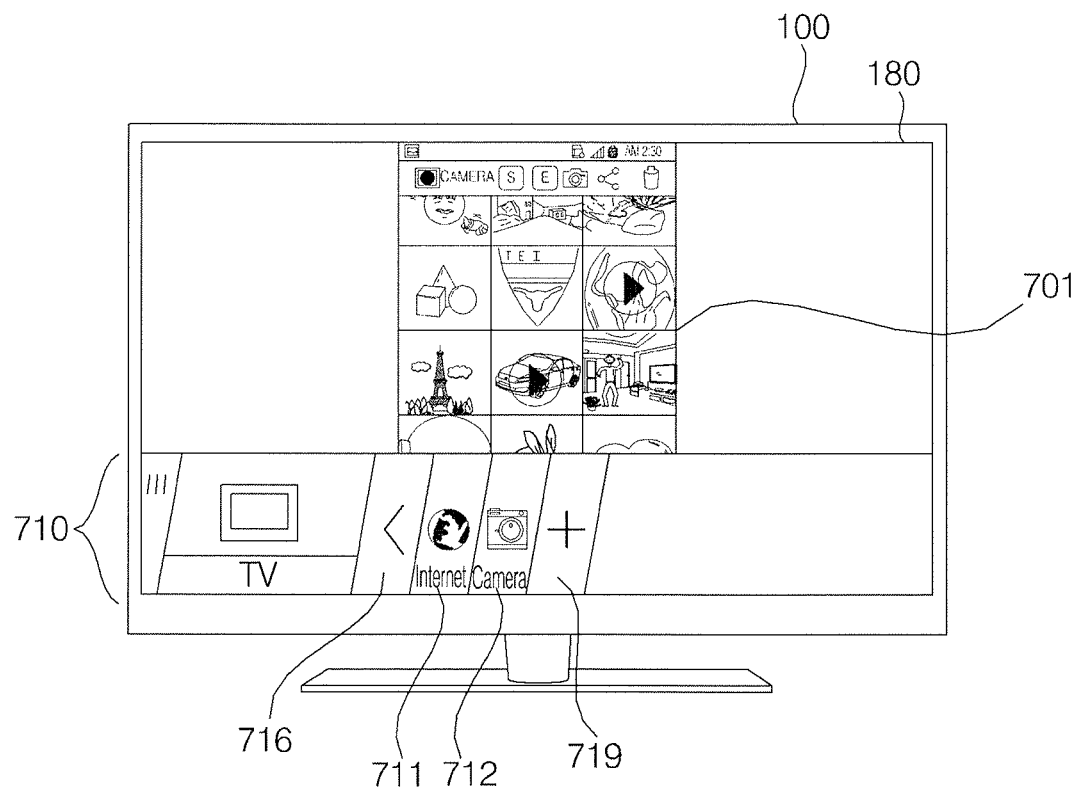
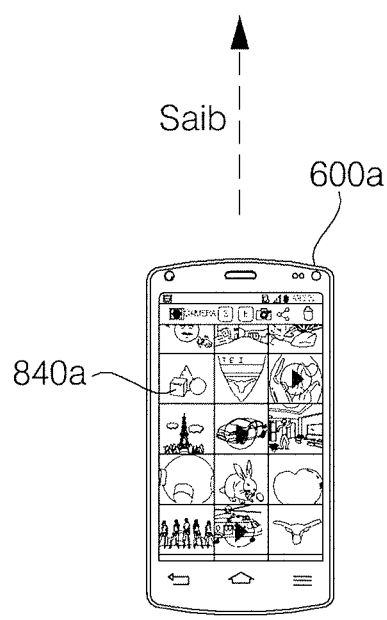

US 10,606,542 B2

IMAGE DISPLAY APPARATUS

CROSS-REFERENCE TO RELATED APPLICATION

This application claims the priority benefit of Korean Patent Application No. 10-2016-0003106, filed Republic of Korea on Jan. 11, 2016, which is hereby expressly incorporated by reference into the present application.

BACKGROUND OF THE INVENTION

1. Field of the Invention

The present invention relates to an image display apparatus and, more particularly, to an image display apparatus enabling simultaneous viewing of a mirroring image and various kinds of information in performing mirroring between a mobile terminal and the image display apparatus.

2. Description of the Related Art

An image display apparatus is an apparatus having a function to provide images viewable by a user. The user may watch a broadcast program through the image display apparatus. The image display apparatus provides a broadcast program selected by the user among broadcast signals transmitted from broadcast stations, and displays broadcast images on the display. Currently, the broadcasting technology is transitioning from analog broadcasting to digital broadcasting around the world.

Digital broadcasting refers to broadcasting for transmitting digital images and voice signals. Compared to analog broadcasting, digital broadcasting is robust to external noises and thus suffers lower data loss. Further digital broadcasting is advantageous in terms of error correction, and provides high definition and clear images. Further, in contrast with analog broadcasting, digital broadcasting enables bidirectional services.

SUMMARY OF THE INVENTION

Therefore, the present invention has been made in view of the above problems, and it is an object of the present invention to provide an image display apparatus enabling simultaneous viewing of a mirroring image and various kinds of information in performing mirroring between a mobile terminal and the image display apparatus.

Another object of the present invention is to provide an image display apparatus capable of facilitating mirroring between the mobile terminal and the image display apparatus.

In accordance with an aspect of the present invention, the above and other objects can be accomplished by the provision of an image display apparatus including a display, an interface unit to exchange data with a mobile terminal, and a controller configured to display an mirroring image received from the mobile terminal and to display additional information related to the mirroring image in a blank area other than a display area for display of the mirroring image.

In accordance with another aspect of the present invention, there is provided an image display apparatus including a display, an interface unit to exchange data with a mobile terminal, and a controller configured to display a mirroring image received from the mobile terminal and to display additional information related to the mirroring image in a display area for display of the mirroring image.

BRIEF DESCRIPTION OF THE DRAWINGS

The above and other objects, features and other advantages of the present invention will be more clearly understood from the following detailed description taken in conjunction with the accompanying drawings, in which:

FIG. 4A illustrates a method for controlling the remote control device of FIG. 2.

FIGS. 7A to 7F, 8A to 8F, 9A to 9C, 10A to 10E and 11A to 11K illustrate the operation method of FIG. 6;

FIGS. 13A to 13H, 14A to 14K and 15A to 15T illustrate the operation method of FIG. 12;

FIG. 16 is a flowchart illustrating operation of an image display apparatus and mobile terminal according to another embodiment of the present invention; and FIGS. 17A to 17H illustrate the operation method of FIG. 16.

DETAILED DESCRIPTION OF THE PREFERRED EMBODIMENTS

Reference will now be made in detail to embodiments of the present invention, examples of which are illustrated in the accompanying drawings. Wherever possible, the same reference numbers will be used throughout the drawings to refer to the same or like parts.

As used herein, the suffixes "module" and "unit" are added to simply facilitate preparation of this specification and are not intended to suggest special meanings or functions. Therefore, the suffixes "module" and "unit" may be used interchangeably.

Figure 1:
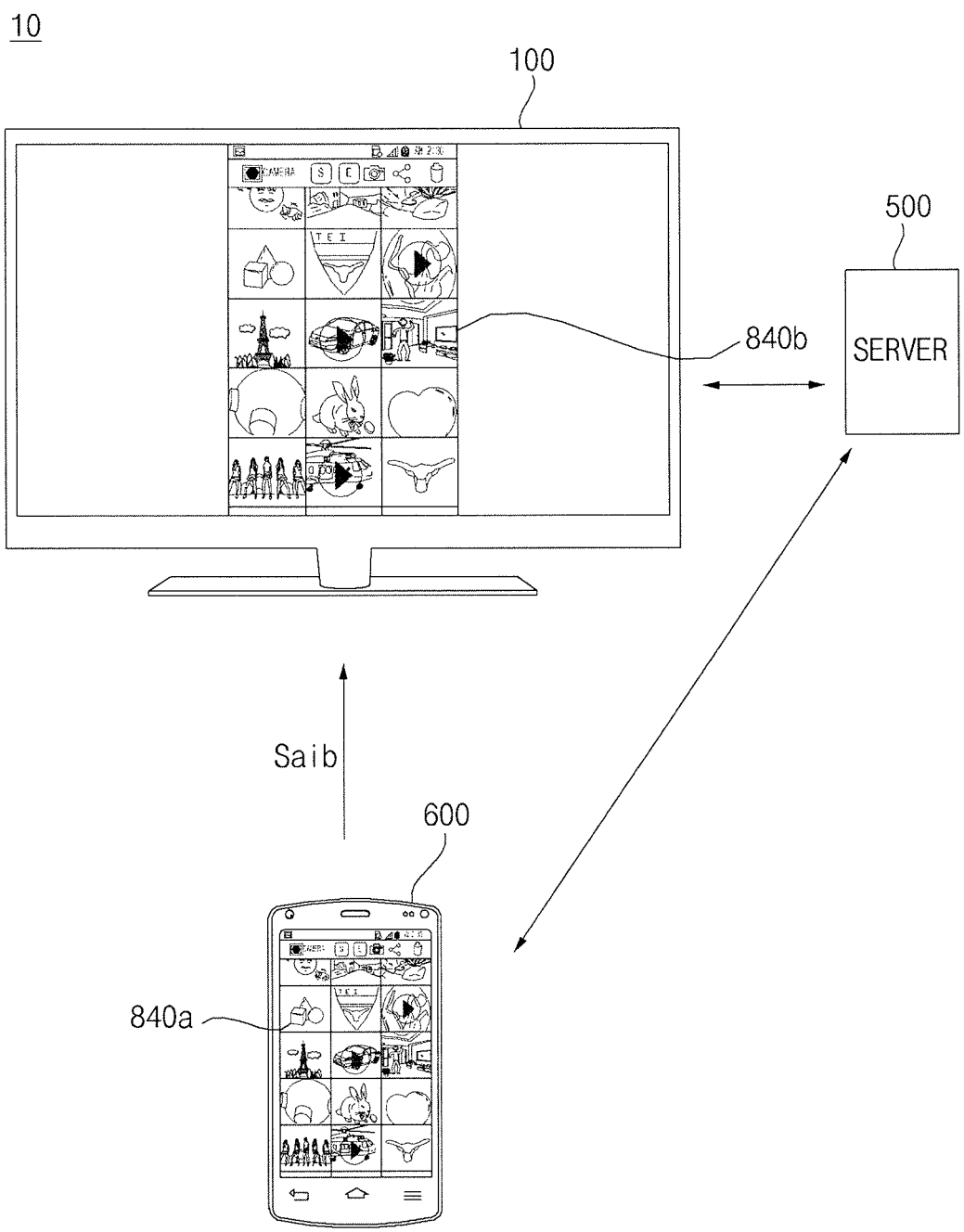
FIG. 1 illustrates an image display system for mirroring according to an embodiment of the present invention.

FIG. 1 illustrates an image display system for mirroring according to an embodiment of the present invention.

Referring to FIG. 1, an image display system 10 for mirroring may include an image display apparatus 100, a mobile terminal 600 and a server 500.

The image display apparatus 100 may perform mirroring with the mobile terminal 600.

In particular, the image display apparatus 100 may receive a mirroring image from the mobile terminal 600 and display the mirroring image on a display 180.

If there is a blank area in addition to a display area for display of a mirroring image when mirroring is performed between the image display apparatus 100 and the mobile terminal 600 and thus the mirroring image is displayed by the image display apparatus 100, additional information related to the mirroring image is displayed. In particular, the additional information is displayed in the blank area other than the display area for display of the mirroring image. Thereby, the mirroring image and various kinds of information may be viewed simultaneously when mirroring is performed between the image display apparatus 100 and the mobile terminal 600.

A controller 170 of the image display apparatus 100 may perform a control operation to display a pointer on the display 180, based on a pointing signal from the remote control device 200. In addition, if the pointer is located in the blank area when the mirroring image is displayed, the controller 170 may perform a control operation to display additional information related to the mirroring image in the blank area. By displaying the additional information according to location of the pointer, information serving the user's intention may be displayed.

In displaying the additional information related to the mirroring image in the display area, the controller 170 of the image display apparatus 100 may perform a control operation to move and display the mirroring image. If the amount of data of the additional information is large, the controller 170 of the image display apparatus 100 may control the displayed mirroring image to move or to be scaled down. Thereby, additional information having a large amount of data may be viewed at once.

In addition, the controller 170 of the image display apparatus 100 may perform a control operation to display the pointer on the display based on a pointing signal of the remote control device 200. If the pointer is located in a second area corresponding to the blank area, the back key of the remote control device operates, or the pointer flicks to the left when a mirroring image is displayed, the controller 170 may perform a control operation to display additional information related to the mirroring image in the second area. If the pointer is located in a third area corresponding to the blank area, or the pointer flicks to the right when a mirroring image is displayed, the controller 170 may control the additional information related to the mirroring image display in the third area. By displaying relevant additional information according to movement of the pointer, user convenience may be enhanced.

If the pointer moves from the second area to the third area when a mirroring image is displayed, the controller 170 of the image display apparatus 100 may perform a control operation to display second additional information in the third area with first additional information displayed in the second area.

If the pointer moves from the second area to the third area when a mirroring image is displayed, the controller 170 of the image display apparatus 100 may control the additional information displayed in the second area to disappear and control the additional information to be displayed in the third area.

The additional information may include at least one of an image adjustment item for the mirroring image, a Share item for sharing an image, a previous image for the mirroring image, a next image for the mirroring image, an image list related to the mirroring image, an application item related to the mirroring image and detailed information about the mirroring image.

If the mirroring image is a home screen window or idle screen window of the mobile terminal 600, the controller 170 of the image display apparatus 100 may perform a control operation to display, in the blank area, at least one of an object corresponding to a camera manipulation button attached to the mobile terminal 600, an object corresponding to a power button, an object corresponding to a volume adjustment button and a zooming adjustment button.

If the mirroring image is the home screen window or idle screen window of the mobile terminal 600, the controller 170 of the image display apparatus 100 may perform a control operation to display, in the blank area, at least one of an object indicating a first connector for connection with an external device and an object indicating a second connector for connection with a detachable additional memory.

The controller 170 of the image display apparatus 100 may control additional information related to the mirroring image to vary according to the attribute of the mirroring image.

For example, if the mirroring image is a gallery application, the controller 170 of the image display apparatus 100 may control the additional information to include an image quality adjustment item.

As another example, if the mirroring image is the gallery application, the controller 170 of the image display apparatus 100 may control the additional information to include a Share item for sharing an image or an application item for sharing.

As another example, if the mirroring image is a moving image which is being reproduced, the controller 170 of the image display apparatus 100 may control the additional information to include title information about the moving image, resolution information about the moving image, caption information, actor/actress information, or frequency information.

As another example, if the mirroring image is an image related to a music file which is being reproduced, the controller 170 of the image display apparatus 100 may control the additional information to include title information about the music file, lyrics information, singer information, composer information, or scale information.

As another example, if the mirroring image is a web image, the controller 170 of the image display apparatus 100 may control the additional information to include previous web image or a bookmark item.

As another example, if the mirroring image is a map image, the controller 170 of the image display apparatus 100 may control the additional information to include a map image of an area is not displayed, information about locations in the map image or shop name information.

As another example, if the mirroring image is the home screen window or idle screen window of the mobile terminal 600, the controller 170 of the image display apparatus 100 may control the additional information to include at least one of an object corresponding to a camera manipulation button attached to the mobile terminal 600, an object corresponding to a power button, an object corresponding to a volume adjustment button and an object corresponding to a zooming adjustment button.

As another example, if the mirroring image is the home screen window or idle screen window of the mobile terminal 600, the controller 170 of the image display apparatus 100 may control the additional information to include at least one of an object indicating a first connector for connection with an external device and an object indicating a second connector for connection with a detachable additional memory.

The controller 170 of the image display apparatus 100 may control a mirroring image received from the mobile terminal to be scaled and displayed in a first area of the display and perform a control operation to display additional information related to the mirroring image in a second area corresponding to a blank area.

To perform mirroring between the image display apparatus 100 and the mobile terminal 600, pairing needs to be performed between the image display apparatus 100 and the mobile terminal 600.

In this embodiment, a method for easily performing pairing between the image display apparatus 100 and the mobile terminal 600 is proposed.

The controller 170 of the image display apparatus 100 may perform a control operation to display a device connection application item according to a predetermined input, and display an image including server information such that the image is captured based on selection of the device connection application item using the mobile terminal 600. Thereafter, the controller 170 may perform pairing with the mobile terminal 600. Once pairing is completed, the controller 170 may perform a control operation to display an object indicating the paired mobile terminal 600.

In particular, after displaying the image including the image the server information such that the image is captured using the mobile terminal 600, the controller 170 of the image display apparatus 100 may perform a control operation to display randomly produced code information. Then, reliable and convenient pairing may be performed through pairing with the mobile terminal 600 after display of the code information. Further, completion of the pairing may be easily recognized.

If pairing with the mobile terminal 600 is performed while an image is being displayed on the display 180, the controller 170 of the image display apparatus 100 may perform a control operation to display an object indicating the paired mobile terminal 600 in the image. Thereby, completion of the pairing may be easily recognized while the displayed image is viewed.

If pairing with the mobile terminal 600 is performed while a broadcast image based on a broadcast signal received from a broadcast receiver 105 is being displayed, the controller 170 of the image display apparatus 100 may perform a control operation to display an object indicating the paired mobile terminal 600.

To perform pairing, the image display apparatus 100 may wirelessly transmit a pairing signal, and the mobile terminal 600 may transmit a pairing response signal in response to the pairing signal. Thereby, pairing may be performed and the mobile terminal 600 and the image display apparatus 100 may be connected to each other.

Herein, the pairing signal and the pairing response signal may be Bluetooth low energy (BLE) signals. In particular, the image display apparatus 100 may periodically transmit a BLE pairing signal.

In addition to the pairing signal, the image display apparatus 100 may further transmit device information including the device ID of the image display apparatus.

If the object indicating the paired mobile terminal 600 is selected, the controller 170 of the image display apparatus 100 may perform a control operation to display an application list related to the paired mobile terminal 600.

When a first application item is selected in the application list related to the paired mobile terminal 600, the controller 170 may send a request for a screen window related to the first application to the mobile terminal 600, and perform a control operation to display an image for execution of the first application on the display based on information received from the mobile terminal 600.

That is, when the first application item is selected in the application list related to the paired mobile terminal 600, the controller 170 may perform a control operation to implement mirroring.

The communication scheme for pairing may be different from the communication scheme for mirroring.

To improve data transfer rate in performing mirroring, if the source of moving images reproduced in the mobile terminal 600 is a coded video signal, the mobile terminal 600 may transmit the coded video signal to the image display apparatus 100 without decoding and reproducing the coded video signal, and the image display apparatus 100 may decode the coded video signal and reproduce and display the decoded video signal.

If the mobile terminal 600 approaches the image display apparatus 100 within a predetermined distance allowing pairing, the controller 170 of the image display apparatus 100 may perform pairing.

The controller 170 may perform a control operation to transmit a pairing signal. If the mobile terminal 600 approaches within a predetermined distance enabling pairing, the controller 170 may receive a pairing response signal from the mobile terminal 600, and perform pairing based on the pairing response signal.

As described above, the image display apparatus 100 may transmit a pairing signal, and the mobile terminal 600 may transmit a pairing response signal. Alternatively, the mobile terminal 600 may transmit a pairing signal, and the image display apparatus 100 may transmit a pairing response signal.

If the image display apparatus 100 is additionally paired with a second mobile terminal 600 while an object indicating the paired mobile terminal is displayed, the controller 170 of the image display apparatus 100 may perform a control operation to display the second object indicating the paired second mobile terminal 600 in addition to the first object.

When the second object indicating the paired second mobile terminal is selected, the controller 170 of the image display apparatus 100 may perform a control operation to display a second application list related to the paired second mobile terminal.

If the second object indicating the second paired mobile terminal 600 is selected after the object indicating the mobile terminal 600 is selected and the application list related to the paired mobile terminal 600 is displayed, the controller 170 of the image display apparatus 100 may perform a control operation to display a second application list related to the second paired mobile terminal 600.

In addition, if the second object indicating the second paired mobile terminal 600 is selected after the object indicating the mobile terminal 600 is selected and the application list related to the paired mobile terminal 600 is displayed, the controller 170 of the image display apparatus 100 may perform a control operation to display a user change object and a user addition object. When the user change object is selected, the controller 170 may perform a control operation to display the second application list related to the second paired mobile terminal 600.

A more detailed description of various methods for operating the image display apparatus 100 and the mobile terminal 600 will be given with reference to FIG. 6.

The image display apparatus 100 of FIG. 1 may be a monitor, TV, Tablet PC, or other types of image display apparatus.

Figure 2:
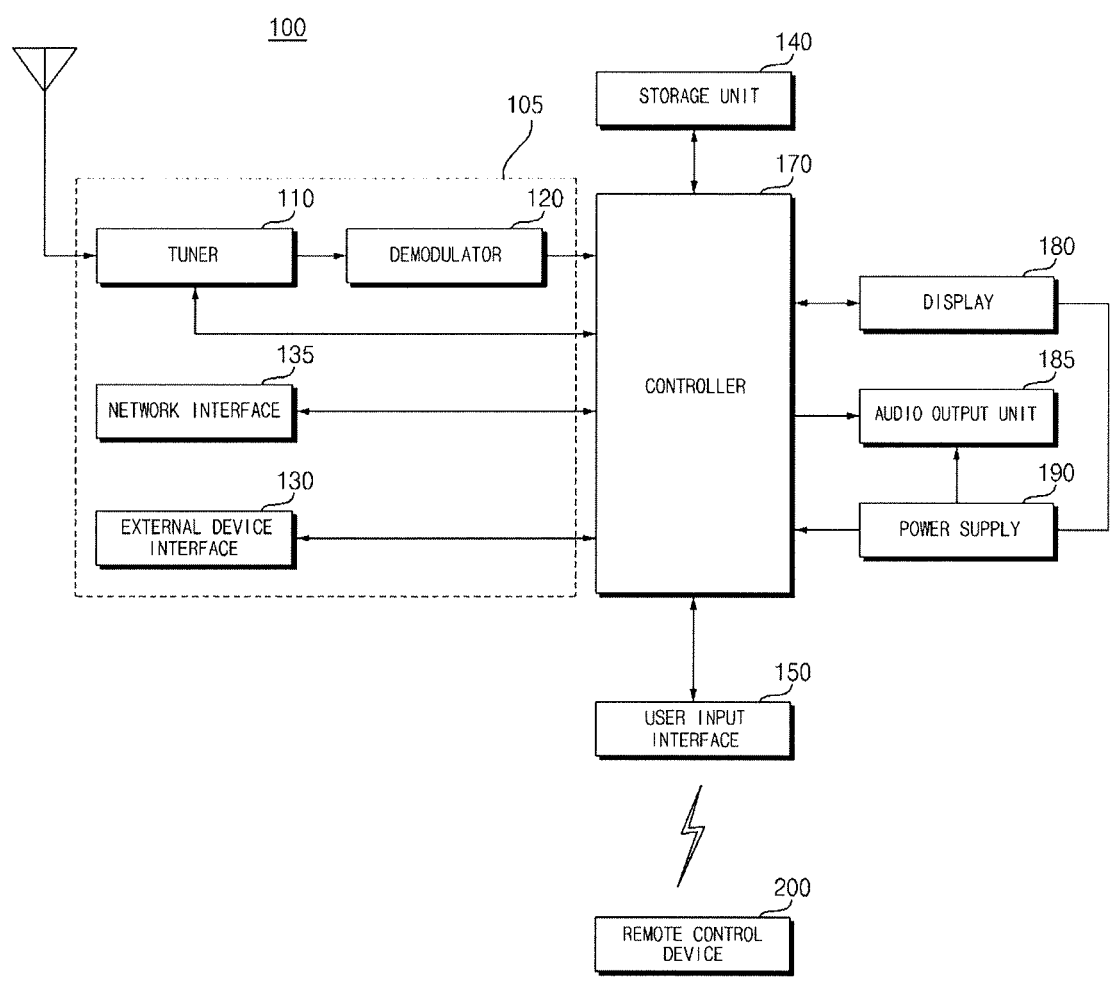
FIG. 2 is an internal block diagram illustrating the image display apparatus of FIG. 1.

FIG. 2 is an internal block diagram illustrating the image display apparatus of FIG. 1.

Referring to FIG. 2, the image display apparatus 100 according to an embodiment may include a broadcast receiver 105, an external device interface unit 130, a storage unit 140, a user input interface unit 150, a sensor unit, a controller 170, a display 180, and an audio output unit 185.

The broadcast receiver 105 may include a tuner 110, a demodulator 120, a network interface unit 135, and an external device interface unit 130.

In contrast with the example of the figure, the broadcast receiver 105 may include only the tuner 110, the demodulator 120, and the external device interface unit 130. That is, the network interface unit 135 may not be included.

The tuner 110 selects a channel selected by a user from among radio frequency (RF) broadcast signals received through an antenna or an RF broadcast signal corresponding to all pre-stored channels. In addition, the tuner 110 converts the selected RF broadcast signal into a middle-frequency signal, a base band image, or a voice signal.

For example, if the selected RF broadcast signal is a digital broadcast signal, the signal is converted into a digital IF (DIF) signal. If the selected RF broadcast signal is an analog broadcast signal, the signal is converted into a baseband image or a voice signal (CVBS/SIF). That is, the tuner 110 may process a digital broadcast signal or an analog broadcast signal. The analog baseband image or voice signal (CVBS/SIF) output from the tuner 110 may be directly input to the controller 170.

In this embodiment, the tuner 110 may sequentially select an RF broadcast signal for all stored broadcast channels from among RF broadcast signals received through the antenna through the channel memorization function, and convert the same into a middle-frequency signal, baseband image, or voice signal.

To receive broadcast signals of two or more channels, two or more tuners 110 may be provided. Alternatively, a single tuner to receive two or more channels simultaneously may be provided.

The demodulator 120 receives and demodulates the DIF signal converted by the tuner.

After performing demodulation and channel decoding, the demodulator 120 may output a stream signal (TS). Herein, the stream signal may be a signal obtained by multiplexing an image signal, voice signal or data signal.

The stream signal output from the demodulator 120 may be input to the controller 170. After performing demultiplexing and image/voice signal processing, the controller 170 outputs an image to the display 180 and voice to the audio output unit 185.

The external device interface unit 130 may transmit or receive data to or from a connected external device, e.g., a set-top box 50. Further, the external device interface unit 130 may include an A/V input/output unit.

The external device interface unit 130 may be connected to external devices such as a DVD (digital versatile disk), a Blu-ray, a gaming device, a camera, a camcorder, a computer (laptop), and a set-top box in a wired/wireless manner, and perform input/output operations with external devices.

The A/V input/output unit may receive image and voice signals input from a external device. A wireless communication unit may perform short-range wireless communication with other electronic devices.

The external device interface unit 130 may exchange data with a neighboring mobile terminal 600 via the wireless communication unit. In particular, in the mirroring mode, the external device interface unit 130 may receive device information, information about an executed application and an application image from the mobile terminal 600.

The network interface unit 135 provides an interface for connection with a wired/wireless network including the Internet. For example, the network interface unit 135 may receive content or data provided by a content provider or a network operator over a network.

The network interface unit 135 may include a wireless communication unit.

The storage unit 140 may store programs for processing and control of signals in the controller 170, and also store a signal-processed image, voice signal or data signal.

The storage unit 140 may function to temporarily store an image signal, a voice signal or a data signal input through the external device interface unit 130. In addition, the storage unit 140 may store information about a predetermined broadcast channel through the channel memorization function such as a channel map.

While it is illustrated in FIG. 2 that the storage unit 140 is provided separately from the controller 170, embodiments of the present invention are not limited thereto. The storage unit 140 may be provided in the controller 170.

The user input interface unit 150 may transmit a signal input by the user to the controller 170 or transmit a signal from the controller 170 to the user.

For example, the user input interface unit 150 may transmit/receive user input signals such as power on/off, channel selection, and screen window setting to/from the remote control device 200, deliver, to the controller 170, user input signals input through local keys such as a power key, a channel key, a volume key, or a setting key, deliver, to the controller 170, user input signals input through a sensor unit configured to sense gesture of the user, or transmit a signal from the controller 170 to the sensor unit.

The controller 170 may demultiplex streams input through the tuner 110, demodulator 120, network interface unit 135 or external device interface unit 130, or process demultiplexed signals. Thereby, the controller 170 may generate an output signal for outputting an image or voice.

An image signal image-processed by the controller 170 may be input to the display 180 and an image corresponding to the image signal may be displayed. In addition, the image signal which is image-processed by the controller 170 may be input to an external output device through the external device interface unit 130.

A voice signal processed by the controller 170 may be output to the audio output unit 185 in the form of sound. In addition, the voice signal processed by the controller 170 may be input to an external output device through the external device interface unit 130.

In FIG. 2, the controller 170 may include a demultiplexer and an image processor, which will be described with reference to FIG. 3 later.

Additionally, the controller 170 may control overall operation of the image display apparatus 100. For example, the controller 170 may control the tuner 110 to tune in RF broadcasting corresponding to a channel selected by the user or a pre-stored channel.

The controller 170 may control the image display apparatus 100 according to a user command input through the user input interface unit 150 or an internal program.

The controller 170 may control the display 180 to display an image. Herein, the image displayed on the display 180 may be a still image, a moving image, a 2D image, or a 3D image.

The controller 170 may perform a control operation to display the predetermined 2D object in an image displayed on the display 180. For example, the object may be at least one of an accessed web page (a newspaper, a magazine, etc.), an EPG (electronic program guide), various menus, a widget, an icon, a still image, a moving image and a text.

The controller 170 may recognize the location of the user based on an image captured by a capture unit. For example, the controller 170 may recognize the distance between the user and the image display apparatus 100 (i.e., a z-axis coordinate). Additionally, the controller 170 may recognize an x-axis coordinate and y-axis coordinate corresponding to the location of the user in the display 180.

The display 180 generates drive signals by converting an image signal, data signal, OSD signal, and control signal processed by the controller 170 or an image signal, data signal and control signal received from the external device interface unit 130.

The display 180 may be a PDP, A LCD display, OLED display, a flexible display, or a 3D display. The 3D display 180 may be divided into a non-glasses type and a glasses type.

The display 180 may be configured by a touchscreen to be used not only as an output device but also as an input device.

The audio output unit 185 receives a voice signal processed by the controller 170 and outputs voice.

The capture unit captures an image of the user. The capture unit (not shown) may be implemented using one camera. However, embodiments of the present invention are not limited thereto. The capture unit may be implemented using two or more cameras. The capture unit may be buried in the upper portion of the display 180 of the image display apparatus or may be separately disposed. Image information captured by the capture unit may be input to the controller 170.

The controller 170 may sense gesture of the user based on an image captured by the capture unit, a sensed signal from the sensor unit, or a combination thereof.

The power supply 190 supplies power to overall parts of the image display apparatus 100. In particular, the power supply 190 may supply power to the controller 170, which may be implemented in the form of system on chip (SOC), the display 180 for display of images, and the audio output unit 185 for outputting audio signals.

Specifically, the power supply 190 may include a converter to convert alternating current (AC) power into direct current (DC) power and a DC-DC converter to change the level of the DC power.

The remote control device 200 transmits a user input to the user input interface unit 150. Further, the remote control device 200 may employ Bluetooth, radio frequency (RF) communication, infrared (IR) communication, ultra-wideband (UWB), or ZigBee. In addition, the remote control device 200 may receive an image signal, a voice signal or a data signal from the user input interface 150, and display or output the same.

The image display apparatus 100 may be a fixed or mobile digital broadcast receiver capable of receiving digital broadcast services.

The block diagram of the image display apparatus 100 shown in FIG. 2 is simply illustrative. Constituents of the block diagram may be integrated, added or omitted according to the specification of the image display apparatus 100 which is implemented in reality. That is, two or more constituents may be combined into one constituent, or one constituent may be subdivided into two or more constituents, when necessary. In addition, the function performed in each block is simply illustrative, and it should be noted that specific operations or devices of the blocks do not limit the scope of the present invention.

Figure 3:
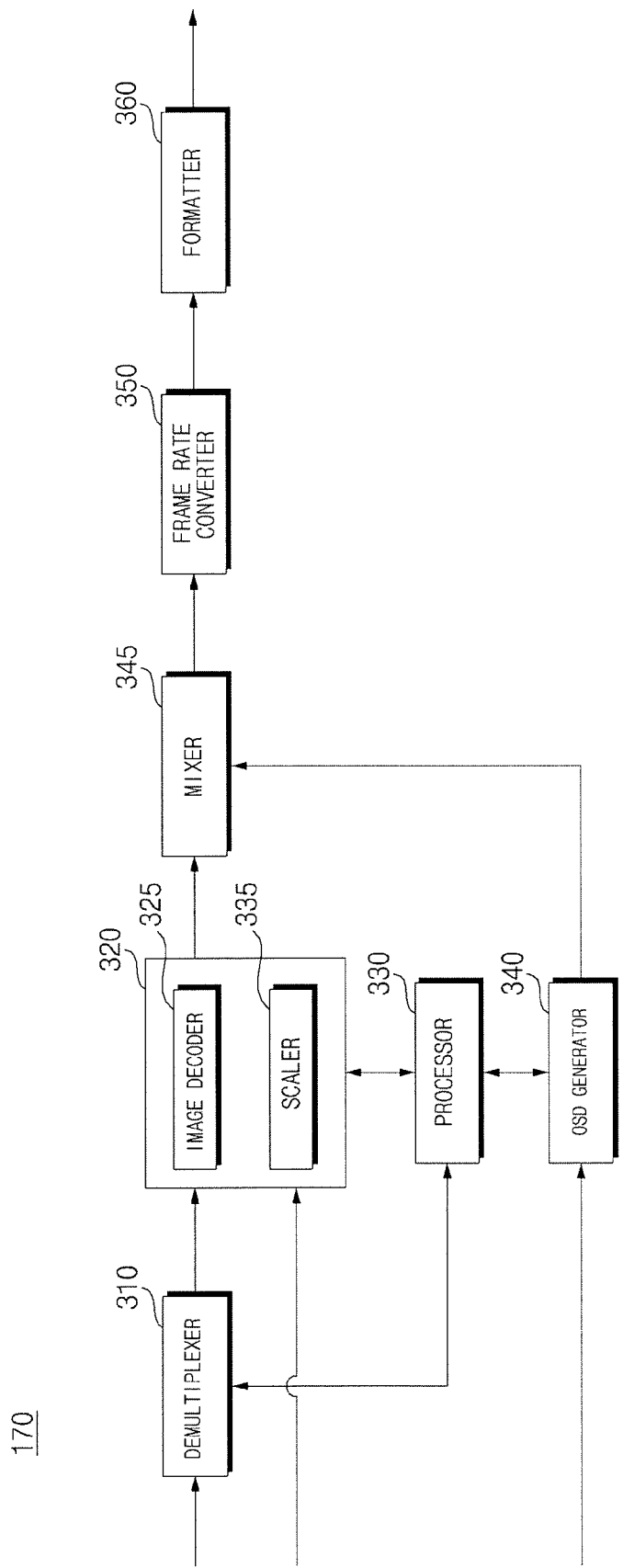
FIG. 3 is an internal block diagram illustrating the controller of FIG. 2.

FIG. 3 is an internal block diagram illustrating the controller of FIG. 2.

Referring to FIG. 3, the controller 170 according to an embodiment of the present invention may include a demultiplexer 310, an image processor 320, a processor 330, an OSD generator 340, a mixer 345, a frame rate converter 350, and a formatter 360.

The demultiplexer 310 demultiplexes an input stream. For example, when MPEG-2 TS is input, the demultiplexer 310 may demultiplex the same to separate the stream into an image signal, a voice signal and a data signal. Herein, the stream signal input to the demultiplexer 310 may be a stream signal output from the tuner 110, the demodulator 120 or the external device interface unit 130.

The image processor 320 may perform image processing on a demultiplexed image signal. Further, the image processor 320 may include an image decoder 325 and a scaler 335.

The image decoder 325 decodes the demultiplexed image signal, and the scaler 335 scales the resolution of the decoded image signal such that the image signal can be output through the display 180.

The image decoder 325 may include decoders of various standards. For example, the image decoder 325 may include an MPEG-2, an H.264 decoder, a 3D image decoder for color images and depth images, and a decoder for multi-viewpoint images.

The processor 330 may control overall operation of the image display apparatus 100 or the controller 170. For example, the processor 330 may control the tuner 110 to tune in RF broadcasting corresponding to a channel selected by the user or a pre-stored channel.

In addition, the processor 330 may control the image display apparatus 100 according to a user command input through the user input interface unit 150 or an internal program.

The processor 330 may control data transmission with the network interface unit 135 or the external device interface unit 130.

The processor 330 may control operations of the demultiplexer 310, image processor 320 and OSD generator 340 in the controller 170.

The OSD generator 340 generates an OSD signal automatically or according to user input. For example, the OSD generator 340 may generate a signal for display of various kinds of information in the form of graphic images or texts on the screen of the display 180 based on a user input signal. The generated OSD signal may include various data including the user interface screen window of the image display apparatus 100, various menu screen windows, widget, and icons. The generated OSD signal may also include a 2D object or a 3D object.

The OSD generator 340 may generate a pointer which can be displayed on the display, based on a pointing signal input from the remote control device 200. In particular, the pointer may be generated by a pointing signal processor, and the OSD generator 340 may include the pointing signal generator. Of course, it is possible to provide the pointing signal processor separately from the OSD generator 340.

The mixer 345 may mix the OSD signal generated by the OSD generator 340 with an image signal processed and decoded by the image processor 320. The mixed image signal is provided to the frame rate converter 350.

The frame rate converter (FRC) 350 may convert the frame rate of an input image. The FRC 350 may output the frame rate without performing separate frame rate conversion.

The formatter 360 may arrange a left image frame and right image frame of a 3D image produced through frame rate conversion. The formatter 360 may output a synchronization signal Vsync to open the left eye glass or right eye glass of a 3D view apparatus.

The formatter 360 may change the format of an input image signal to a format in which the corresponding image can be displayed on the display.

The formatter 360 may change the format of a 3D image signal. For example, the formatter 360 may change the format of the 3D image signal to one of various 3D formats including a side-by-side format, a top/down format, a frame sequential format, an interlaced format, and a checker box format.

The formatter 360 may convert a 2D image signal into a 3D image signal. For example, the formatter 360 may detect an edge or a selectable object in a 2D image signal, and separate and generate the object according to the detected edge of the selectable object as a 3D image signal. In this instance, the generated 3D image signal may be separated into a left image signal L and a right image signal R to be aligned.

In FIG. 3, a 3D processor for 3-dimensional effect signal processing may be further disposed after the formatter 360. The 3D processor may perform processing such as adjustment of brightness, tint and color of an image signal to improve the 3D effect. For example, signal processing of making parts at a close distance clear and making parts at a far distance blurred may be performed. Such function of the 3D processor may be integrated into the formatter 360 or the image processor 320.

An audio processor in the controller 170 may process a demultiplexed voice signal. Further, the audio processor may include various decoders.

The audio processor in the controller 170 may perform processing such as adjustment of bass, treble, and volume.

The data processor in the controller 170 may perform data processing on a demultiplexed data signal. For example, if the demultiplexed data signal is a coded data signal, the data processor may decode the data signal. The coded data signal may be electronic program guide information including broadcast information such as a start time and end time of a broadcast program broadcast on each channel.

The block diagram of the controller 170 shown in FIG. 3 is illustrative. Constituents of the block diagram may be integrated, added or omitted according to the specification of the controller 170 which is implemented.

In particular, the frame rate converter 350 and the formatter 360 may not be provided in the controller 170. Instead, they may be provided individually or provided as one separate module.

FIG. 4 illustrates a method for controlling the remote control device of FIG. 2.

As shown in (a) of FIG. 4A, a pointer 205 corresponding to the remote control device 200 may be displayed on the display 180.

The user may move the remote control device 200 up and down, left and right ((b) of FIG. 4A), or back and forth ((c) of FIG. 4A) or rotate the same. The pointer 205 displayed on the display 180 of the image display apparatus corresponds to movement of the remote control device 200. As shown in the figure, because the pointer 205 moves according to movement of the remote control device 200 in the 3D space, the remote control device 200 may be referred to as a spatial remote control or a 3D pointing device.

(b) of FIG. 4A illustrates where the pointer 205 displayed on the display 180 moves to the left when the user moves the remote control device 200 to the left.

Information about movement of the remote control device 200 sensed through a sensor of the remote control device 200 is transmitted to the image display apparatus. The image display apparatus may calculate coordinates of the pointer 205 based on the information about the movement of the remote control device 200. The image display apparatus may display the pointer 205 such that the pointer 205 corresponds to the calculated coordinates.

(c) of FIG. 4A illustrates where the user moves the controller 170 away from display 180 while pressing down a specific button in the remote control device. In this instance, a selected area on the display 180 corresponding to the pointer 205 may be zoomed in and displayed with the size thereof increased. On the other hand, when the user moves the remote control device 200 closer to the display 180, the selected area may be zoomed out and displayed with the size thereof reduced. Alternatively, the selected area may be zoomed out when the remote control device 200 moves away from the display 180, and may be zoomed in when the remote control device 200 moves closer to the display 180.

Vertical and lateral movement of the remote control device 200 may not be recognized while the specific button in the remote control device 200 is pressed down. That is, when the remote control device 200 approaches or moves away from the display 180, vertical and lateral movements thereof may not be recognized, but only back-and-forth movement thereof may be recognized. If the specific button in the remote control device 200 is not pressed down, the pointer 205 only moves according to vertical and lateral movements of the remote control device 200.

The speed and direction of movement of the pointer 205 may correspond to the speed and direction of movement of the remote control device 200.

Figure 4B:
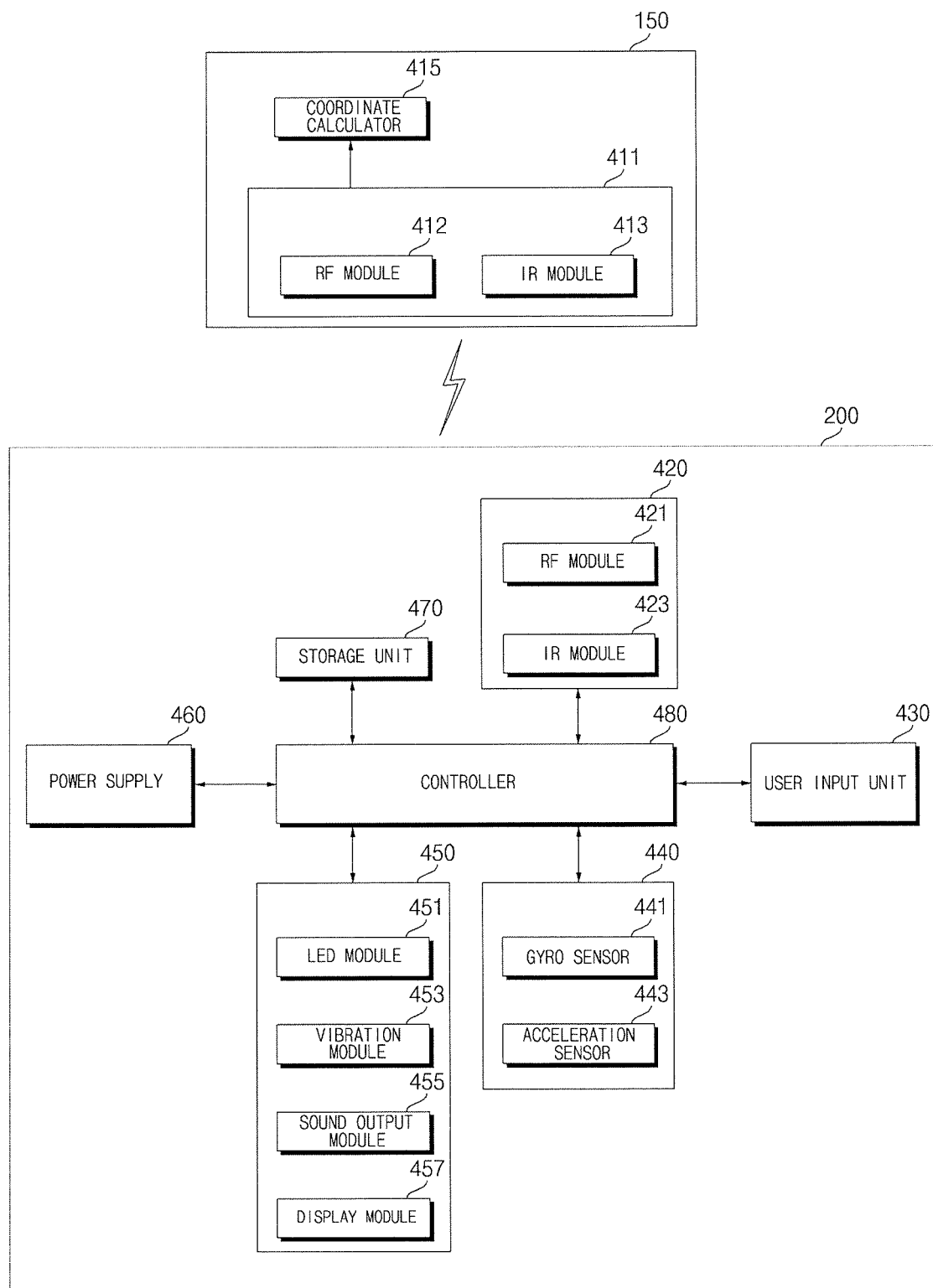
FIG. 4B is an internal block diagram illustrating the remote control device of FIG. 2.

FIG. 4B is an internal block diagram illustrating the remote control device of FIG. 2.

Referring to FIG. 4B, the remote control device 200 may include a wireless communication unit 425, a user input unit 430, a sensor unit 440, an output unit 450, a power supply 460, a storage unit 470, and a controller 480.

The wireless communication unit 425 transmits and receives signals to and from one of the image display apparatuses according to embodiments of the present invention described above. Hereinafter, one image display apparatus 100 according to an embodiment of the present invention will be described.

In this embodiment, the remote control device 200 may include an RF module 421 capable of transmitting and receiving signals to and from the image display apparatus 100 according to an RF communication standard. The remote control device 200 may further include an IR module 423 capable of transmitting and receiving signals to and from the image display apparatus 100 according to an IR communication standard.

In this embodiment, the remote control device 200 transmits a signal including information about movement of the remote control device 200 to the image display apparatus 100 via the RF module 421.

In addition, the remote control device 200 may receive a signal from the image display apparatus 100 via the RF module 421. When necessary, the remote control device 200 may transmit commands related to power on/off, channel change, and volume change to the image display apparatus 100 via the IR module 423.

The user input unit 430 may include a keypad, a button, a touchpad, or a touchscreen. The user may input a command related to the display apparatus 100 with the remote control device 200 by manipulating the user input unit 430. If the user input unit 430 includes a hard key button, the user may input a command related to the image display apparatus 100 with the remote control device 200 by pressing the hard key button. If the user input unit 430 includes a touchscreen, the user may input a command related to the image display apparatus 100 with the remote control device 200 by touching a soft key on the touchscreen. The user input unit 430 may include various kinds of input means such as a scroll key and a jog key which are manipulatable by the user, but it should be noted that this embodiment does not limit the scope of the present invention.

The sensor unit 440 may include a gyro sensor 441 or an acceleration sensor 443. The gyro sensor 441 may sense information about movement of the remote control device 200.

For example, the gyro sensor 441 may sense information about movement of the remote control device 200 with respect to the X, Y and Z axes. The acceleration sensor 443 may sense information about the movement speed of the remote control device 200. The sensor unit 440 may further include a distance measurement sensor to sense a distance to the display 180.

The output unit 450 may output an image signal or voice signal corresponding to manipulation of the user input unit 430 or a signal transmitted from the image display apparatus 100. The user may recognize, via the output unit 450, whether the user input unit 430 is manipulated or the image display apparatus 100 is controlled.

For example, the output unit 450 may include an LED module 451 configured to be turned on when signals are transmitted to and received from the image display apparatus 100 via the wireless communication unit 425, a vibration module 453 configured to generate vibration, a sound output module 455 configured to output sound, or a display module 457 configured to output an image.

The power supply 460 supplies power to the remote control device 200. If the remote control device 200 does not move for a predetermined time, the power supply 460 may stop supplying power to save power. The power supply 460 may resume supply of power when the predetermined key provided to the remote control device 200 is manipulated.

The storage unit 470 may store various kinds of programs and application data necessary for control or operation of the remote control device 200. When the remote control device 200 wirelessly transmits and receives signals to and from the image display apparatus 100 via the RF module 421, the remote control device 200 and the image display apparatus 100 may transmit and receive signals in a predetermined frequency band. The controller 480 of the remote control device 200 may store, in the storage unit 470, information about, for example, a frequency band enabling wireless transmission and reception of signals to and from the image display apparatus 100 which is paired with the remote control device 200, and reference the same.

The controller 480 controls overall operation related to control of the remote control device 200. The controller 480 may transmit, via the wireless communication unit 425, a signal corresponding to manipulation of a predetermined key in the user input unit 430 or a signal corresponding to movement of the remote control device 200 sensed by the sensor unit 440 to the image display apparatus 100.

The user input interface unit 150 of the image display apparatus 100 may include a wireless communication unit 151 capable of wirelessly transmitting and receiving signals to and from the remote control device and a coordinate calculator 415 capable of calculating coordinates of the pointer corresponding to operation of the remote control device 200.

The user input interface unit 150 may wirelessly transmit and receive signals to and from the remote control device 200 via an RF module 412. In addition, the user input interface unit 150 may receive, via an IR module 413, a signal transmitted from the remote control device 200 according to an IR communication standard.

The coordinate calculator 415 may calculate coordinates (x, y) of the pointer 205 to be displayed on the display 180, by correcting the unstable position of a hand or an error in a signal corresponding to operation of the remote control device 200 which is received via the wireless communication unit 151.

The transmitted signal of the remote control device 200 input to the image display apparatus 100 via the user input interface unit 150 is transmitted to the controller 170 of the image display apparatus 100. The controller 170 may determine information about an operation of the remote control device 200 or manipulation of a key from the signal transmitted from the remote control device 200, and control the image display apparatus 100 according to the information.

As another example, the remote control device 200 may calculate coordinates of the pointer corresponding to movement thereof and output the same to the user input interface unit 150 of the image display apparatus 100. In this instance, the user input interface unit 150 of the image display apparatus 100 may transmit, to the controller 170, information about the received coordinates of the pointer without separately correcting the unstable position of the hand or error.

As another example, in contrast with the example of the figure, the coordinate calculator 415 may be provided in the controller 170 rather than in the user input interface unit 150.

Figure 5:
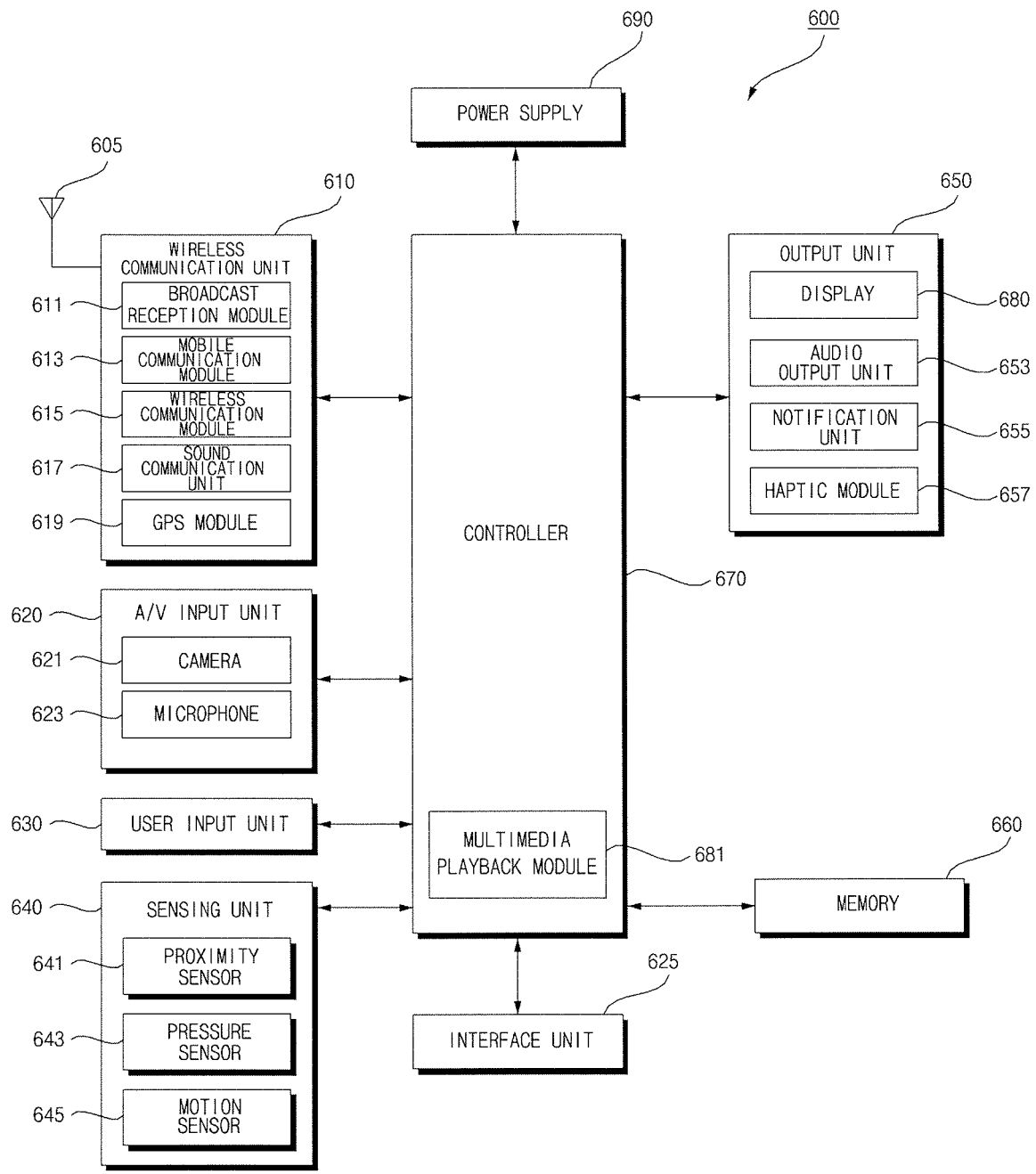
FIG. 5 is an internal block diagram illustrating the mobile terminal of FIG. 1.

FIG. 5 is an internal block diagram illustrating the mobile terminal of FIG. 1.

Referring to FIG. 5, the mobile terminal 600 may include a wireless communication unit 610, an audio/video (A/V) input unit 620, a user input unit 630, a sensing unit 640, and an output unit 650, a memory 660, an interface unit 625, a controller 670 and a power supply 690.

The wireless communication unit 610 may include a broadcast reception module 611, a mobile communication module 613, a wireless communication module 615, a sound communication unit 617, and a GPS module 619.

The broadcast reception module 611 may receive at least one of a broadcast signal and broadcast-related information from an external broadcast management server over a broadcast channel. Herein, the broadcast channel may include a satellite channel and a terrestrial channel.

The broadcast signal and/or broadcast-related information received through the broadcaster reception module 611 may be stored in the memory 660.

The mobile communication module 613 transmits and receives a radio signal to and from at least one of a base station, an external terminal and a server over a mobile communication network. Herein, the wireless signal may include a voice call signal, a video call signal, or various kinds of data according to transmission and reception of a text/multimedia message.

The wireless communication module 615, which refers to a module for wireless Internet access, may be installed inside or outside the mobile terminal 600. For example, the wireless communication module 615 may perform Wi-Fi-based wireless communication or Wi-Fi Direct-based wireless communication.

The sound communication unit 617 may perform sound communication. In the sound communication mode, the sound communication unit 617 may add data of predetermined information to audio data which is to be output and output sound. In addition, in the sound communication mode, the sound communication unit 617 may extract data of predetermined information from received sound.

Available short-range communication technologies may include Bluetooth, RFID (radio frequency identification), IrDA (Infrared Data Association), UWB (Ultra Wideband) and ZigBee.

The GPS module 619 may receive location information from two or more GPS satellites.

The A/V input unit 620 is used for input of an audio signal or a video signal and may include a camera 621 and a microphone 623.

The user input unit 630 generates key input data input by the user to control operation of a terminal of the user. Further, the user input unit 630 may include a keypad, a dome switch, and a touchpad (resistive touchpad/capacitive touchpad). In particular, the touchpad may form a layered architecture together with the display 180, thereby realizing a touchscreen.

The sensing unit 640 may generate a sensing signal for controlling operation of the mobile terminal 600 by sensing the current state of the mobile terminal 600, for example by sensing whether the mobile terminal 600 in the open or closed position, where the mobile terminal 600 is located, and whether the user contacts the mobile terminal 600.

The sensing unit 640 may include a proximity sensor 641, a pressure sensor 643 and a motion sensor 645. The motion sensor 645 may employ an acceleration sensor, a gyro sensor, a gravity sensor and an other types of motion sensors to sense movement or location of the mobile terminal. In particular, the gyro sensor, which is used to measure an angular speed, may sense orientation (angle) of the mobile terminal with respect to a reference direction.

The output unit 650 may include a display 680, an audio output unit 653, a notification unit 655, and a haptic module 657.

The display 680 outputs and displays information processed by the mobile terminal 600.

As described above, if the display 680 forms a layered architecture with the touchpad to implement a touchscreen, the display 680 may be used not only as an output device but also as an input device for input of information according to a touch from the user.

The audio output unit 653 outputs audio data received from the wireless communication unit 610 or stored in the memory 660. The audio output unit 653 may include a speaker and a buzzer.

The notification unit 655 outputs a signal for reporting occurrence of an event in the mobile terminal 600. For example, the notification unit 655 may output a signal in the form of vibration.

The haptic module 657 generates various haptic effects which may be felt by the user. A typical example of the haptic effects generated by the haptic module 657 is vibration.

The memory 660 may store a program for processing and control of the controller 670, and functions to temporarily store input data or output data (e.g., a phonebook, a message, a still image, a moving image, etc.).

The interface unit 625 serves as an interface for all devices connected to the mobile terminal 600. The interface unit 625 may receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 may perform control or processing related to voice communication, data communication, video communication, and other types of communication. The controller 670 may also include a multimedia playback module 681 to reproduce multimedia. The multimedia playback module 681 may be provided in the controller 670 as hardware or may be configured separately from the controller 670.

The power supply 690 supplies power necessary for operations of the respective constituents according to control of the controller 670 when external power or internal power is applied thereto.

The block diagram of the mobile terminal 600 shown in FIG. 5 is simply illustrative. The respective constituents of the block diagram may be integrated, added or omitted according to the specification of the mobile terminal 600 which is implemented in reality. That is, two or more constituents may be combined into one constituent, or one constituent may be subdivided into two or more constituents, when necessary. In addition, the function performed in each block is simply illustrative, and it should be noted that specified operations or devices of the blocks do not limit the scope of the present invention.

Figure 6:
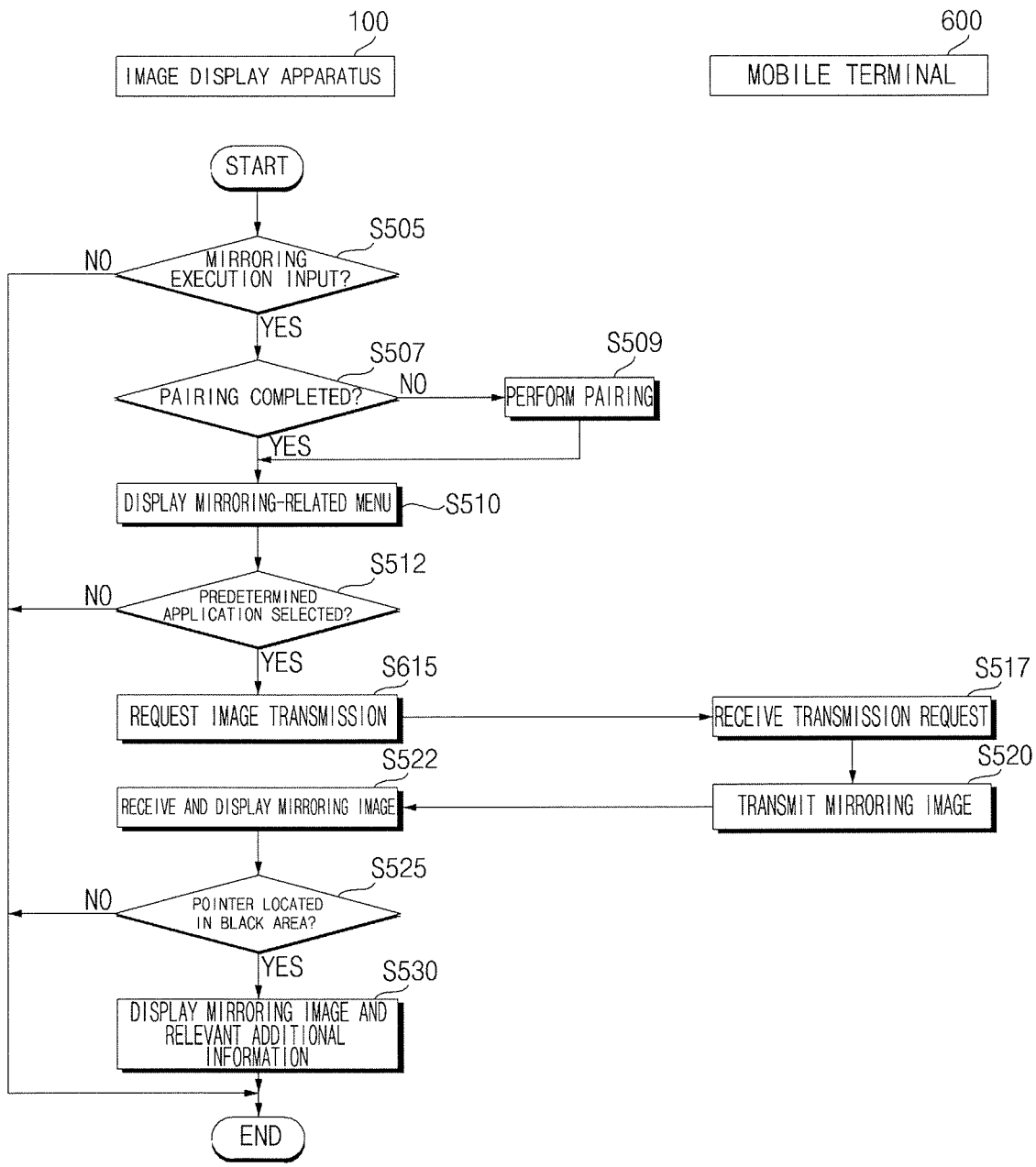
FIG. 6 is a flowchart illustrating operation of an image display apparatus and mobile terminal according to an embodiment of the present invention.

FIG. 6 is a flowchart illustrating operation of an image display apparatus and mobile terminal according to an embodiment of the present invention, and FIGS. 7A to 11K illustrate the operation method of FIG. 6.

Referring to FIG. 6, the controller 170 of the image display apparatus 100 determines whether there is a mirroring execution input (S505).

The mirroring execution input may include input for selection of a mirroring application displayed on the image display apparatus 100 or input for selection of a mirroring application displayed on the mobile terminal 600.

When a mirroring execution input is provided, the controller 170 of the image display apparatus 100 determines whether pairing has been performed (S507).

If the distance between the image display apparatus 100 and the mobile terminal 600 is within a predetermined distance, pairing may be automatically performed based on a Bluetooth low energy (BLE)-based pairing signal output from the image display apparatus 100 and a pairing response signal from the mobile terminal 600.

If mirroring has not been performed, the controller 170 of the image display apparatus 100 controls pairing to be performed (S509).

For example, if there is a mirroring execution input, the controller 170 of the image display apparatus 100 may perform a control operation to output a pairing signal and to receive a pairing response signal from the mobile terminal 600 even if the distance between the image display apparatus 100 and the mobile terminal 600 is not within a predetermined distance.

The output level of a pairing signal that is output when the distance between the image display apparatus 100 and the mobile terminal 600 is beyond the predetermined distance is higher than the output level of a pairing signal that is output when the distance between the image display apparatus 100 and the mobile terminal 600 is within the predetermined distance.

If pairing is not performed when the distance between the image display apparatus 100 and the mobile terminal 600 is within the predetermined distance, pairing may be controlled to be performed according to the aforementioned procedure.

Next, when pairing is completed, the controller 170 of the image display apparatus 100 performs a control operation to display a mirroring-related (S510).

For example, when pairing is completed, the controller 170 of the image display apparatus 100 may perform a control operation to display an application list including a mirroring application item.

As another example, when pairing is completed, the controller 170 of the image display apparatus 100 may perform a control operation to display an execution icon indicating the user of a mobile terminal or the mobile terminal.

Then, if the execution icon is selected, the controller 170 of the image display apparatus 100 may perform a control operation to display an application list including a mirroring application item.

Next, if a predetermined application item is selected from the application list, particularly, if the mirroring application item is selected, the controller 170 of the image display apparatus 100 performs a control operation to transmit, via the network interface unit 135, a request for transmission of a mirroring image for the selected application item to the mobile terminal 600 (S615).

Then, the controller 670 of the mobile terminal 600 receives the request for transmission of the mirroring image via the communication unit 610 in response (S517).

Next, the controller 670 of the mobile terminal 600 performs a control operation to execute a corresponding application according to the request for transmission of the mirroring image. Then, the controller 670 performs a control operation to transmit the image of the executed application to the image display apparatus 100 via the communication unit 610 (S520). The image of the executed application is transmitted as a mirroring image.

Next, the controller 670 of the mobile terminal 600 performs a control operation to receive the mirroring image from the mobile terminal 600 and display the moved mirroring image via the network interface unit 135 (S522).

The controller 670 of the mobile terminal 600 determines whether a pointer displayed based on the pointing signal from the remote control device 200 is located in a blank area other than the display area for the mirroring image (S525).

If the pointer is located in the blank area, the controller 170 of the image display apparatus 100 performs a control operation to display additional information related to the mobile terminal or the mirroring image in at least one part of the blank area (S530). As the mirroring image and the additional information related to the mirroring image are displayed together, user convenience may be enhanced.

Examples of the additional information will be described with reference to FIGS. 7A to 11K.

Figure 7A:
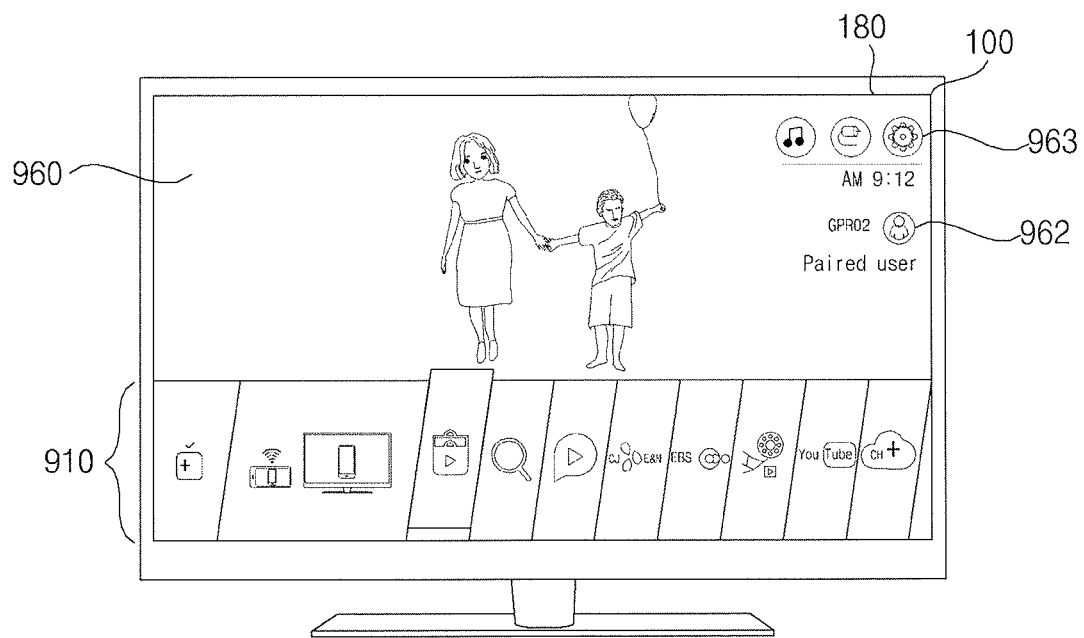

FIG. 7A illustrates where the mobile terminal 600 and the image display apparatus 100 remain connected to each other.

When the mobile terminal 600 and the image display apparatus 100 are wirelessly connected to each other, the controller 170 of the image display apparatus 100 may perform a control operation to display an object 962 indicating a paired mobile terminal on the display 180, as shown in FIG. 7A.

In particular, the controller 170 of the image display apparatus 100 may perform a control operation to display the object 962 indicating the paired mobile terminal on a displayed image 960 on the display 180. Thereby, the user of the mobile terminal or another user who is viewing the image 960 of the image display apparatus 100 may recognize that the mobile terminal is connected and paired with the image display apparatus.

Figure 7B:

In FIG. 7A, if the object 962 indicating the paired mobile terminal is selected, the controller 170 of the image display apparatus 100 may perform a control operation to display an application list 970 and a wish list 975 which are related to the paired mobile terminal, as shown in FIG. 7B.

The application list 970 related to the paired mobile terminal may include application items for which mirroring can be performed between the mobile terminal 600 and the image display apparatus 100 and an Add item 966.

In the figure, an App Store item, moving image playback item, map item, image viewer item and Internet item are provided as examples of application items for which mirroring can be performed.

If the gallery application item is selected in the application list 970 displayed as shown in FIG. 7B, the controller 170 of the image display apparatus 100 may transmit, to the mobile terminal 600, an application execution request Saib related to the gallery application item. Then, when an application of the mobile terminal 600 related to the gallery application item is executed, the controller 170 may perform mirroring.

Figure 7C:
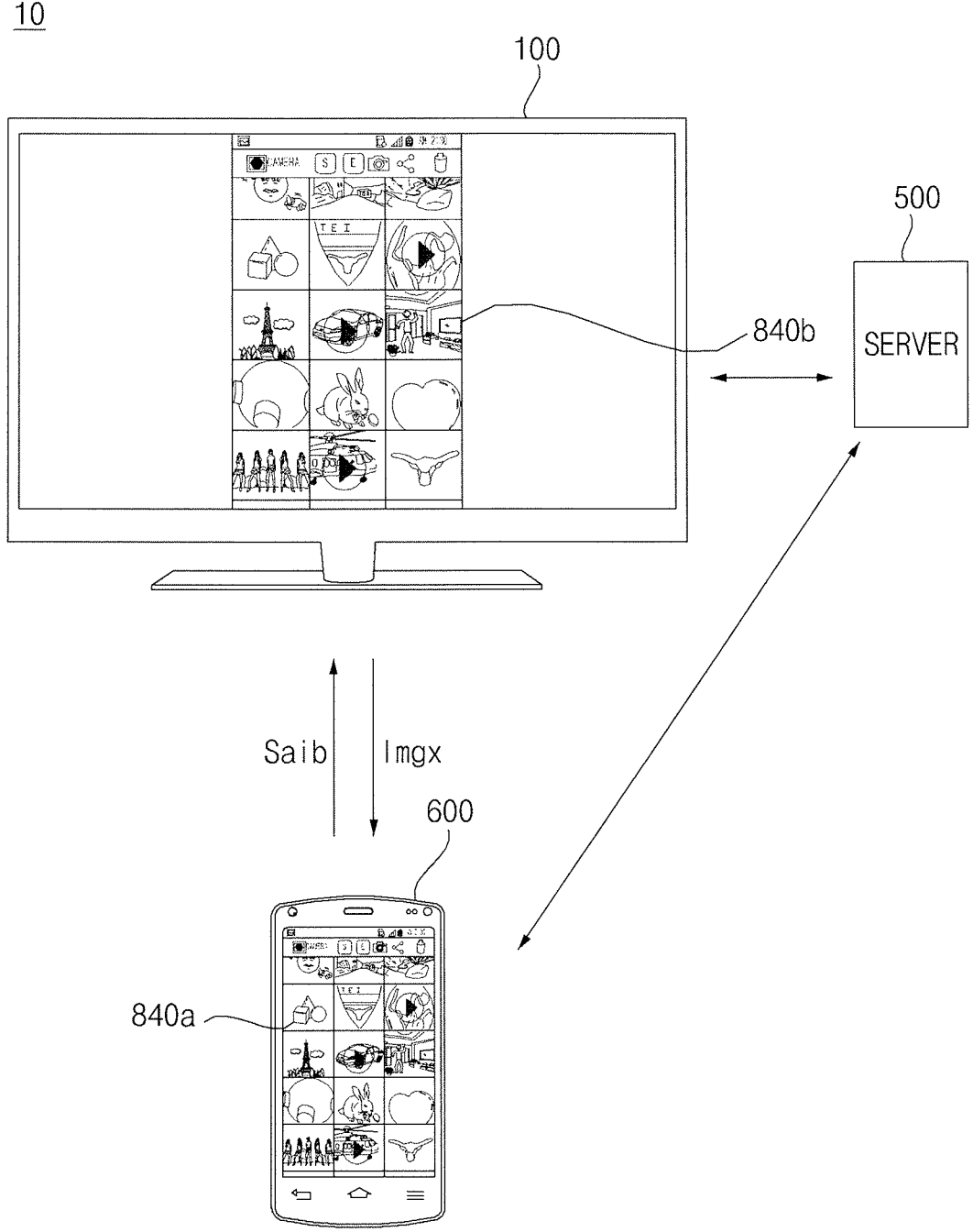

Then, in receiving a mirroring image, the controller 170 of the image display apparatus 100 may perform a control operation to display, on the display 180, a screen window 840*b* of the gallery application which is being displayed as a screen window 840*a* and executed in the mobile terminal 600, as shown in FIG. 7C.

If a predetermined image item is selected on the displayed screen window 840*b* of the gallery application, the controller 170 of the image display apparatus 100 transmits selection information to the mobile terminal 600, as shown in FIG. 7C.

The controller 170 of the image display apparatus 100 may receive a mirroring image for the selected image item in response, and perform a control operation to display the mirroring image 1710 in a first area Ara of the display 180, as shown in FIG. 7D.

Typically, the size or resolution of the display 180 of the image display apparatus 100 is greater than the size or resolution of the display 680 of the mobile terminal 600. Accordingly, when the mirroring image is received, the controller 170 of the image display apparatus 100 may perform a control operation to scale up the mirroring image and display the scaled-up mirroring image.

If the screen display position of the mobile terminal 600 is a vertical view position, the display area of the image is limited on the display 180 of the image display apparatus 100, and blank areas Arb and Arc where the image is not displayed are produced.

In this embodiment, additional information related to the mirroring image is displayed in the blank areas.

Herein, the additional information may be automatically displayed in relation to the mirroring image, or optionally displayed according to the location of the pointer 205.

FIG. 7D illustrates disposing a second area Arb and a third area Arc corresponding to blank areas on the left and right sides of the first area Ara of the display 180 in which the mirroring image 1710 is displayed.

The controller 170 of the image display apparatus 100 may receive a pointing signal from the remote control device 200 via the user input interface unit 150, and perform a control operation to display the pointer 205 based on the pointing signal.

In the example of FIG. 7D, the pointer 205 is displayed in the first area Ara of the display 180 in which the mirroring image 1710 is display.

The controller 170 of the image display apparatus 100 may perform a control operation to display the pointer on the display based on the pointing signal. If the pointer is located in the second area corresponding to a blank area, the back key of the remote control device 200 operates, or the pointer 205 flicks to the left in displaying a mirroring image, the controller 170 of the image display apparatus 100 may perform a control operation to display additional information related to the mirroring image in the second area. If the pointer is located in the third area corresponding to a blank area in displaying the mirroring image, the controller 170 may perform a control operation to display additional information related to the mirroring image in the third area. More details will be described with reference to FIGS. 7E and 7F.

When the pointer 205 moves to the second area Arb which is a blank area, the controller 170 of the image display apparatus 100 may perform a control operation to display additional information related to the mirroring image 1710.

In the example of FIG. 7E, an image adjustment item 1722 is displayed in the second area Arb, which is a blank area, as the additional information.

The mirroring adjustment item may include items such as brightness, contrast, and temperature.

Figure 7F:
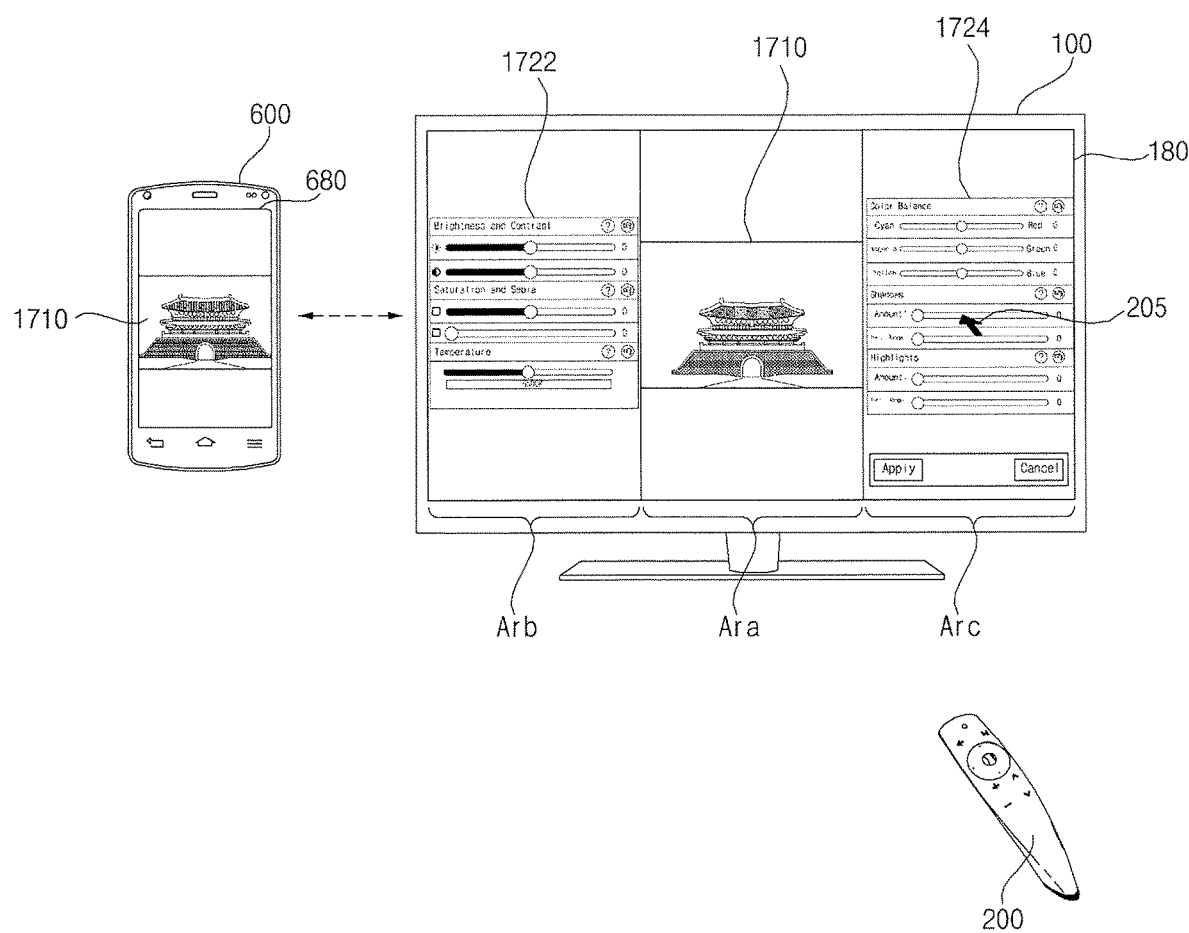

If the pointer moves from the second area Arb to the third area Arc in displaying a mirroring image, the controller 170 of the image display apparatus 100 may perform a control operation to display second additional information 1724 in the second area with the first additional information 1722 displayed in the second area Arb, as shown in FIG. 7F.

The second additional information 1724 may include items such as color balance, shadows and highlights as the image adjustment items for the mirroring image 1710.

In contrast with the example of FIG. 7F, if the pointer 205 moves from the second area Arb to the third area Arc in displaying the mirroring image 1710, the controller 170 of the image display apparatus 100 may control the additional information displayed in the second area Arb to disappear, and perform a control operation to display the additional information in the third area.

The additional information displayed in a blank area may include at least one of an image adjustment item for the mirroring image, a Share item for sharing the image, a previous image for the mirroring image, a next image for the mirroring image, an image list related to the mirroring image, an application item related to the mirroring image and detailed information about the mirroring image.

FIG. 8A illustrates display of the mirroring image 1710 in the display area Ara, as illustrated in FIG. 7D.

If the pointer 205 moves to the second area Arb which is a blank area, the controller 170 of the image display apparatus 100 may perform a control operation to display additional information 1810 related to the mirroring image 1710, as shown in FIG. 8B.

In FIG. 8B, the additional information displayed in the second area Arb may include a Share item for sharing images or an application item for sharing images.

When the pointer 205 moves to the third area Arc which is a blank area, the controller 170 of the image display apparatus 100 may perform a control operation to display additional information related to the mirroring image 1710, as shown in FIG. 8C.

In FIG. 8C, the controller 170 of the image display apparatus 100 may perform a control operation to display a previous image 1730 related to the mirroring image 1720 in the second area Arb and a next image 1740 related to the mirroring image 1720 in the third area Arc.

Further, the controller 170 of the image display apparatus 100 may transmit a request for transmission of a previous image or next image related to the mirroring image to the mobile terminal 600 according to the location of the pointer 205. Then, the controller 170 may receive the previous image or next image related to the mirroring image from the mobile terminal 600.

Figure 8D:
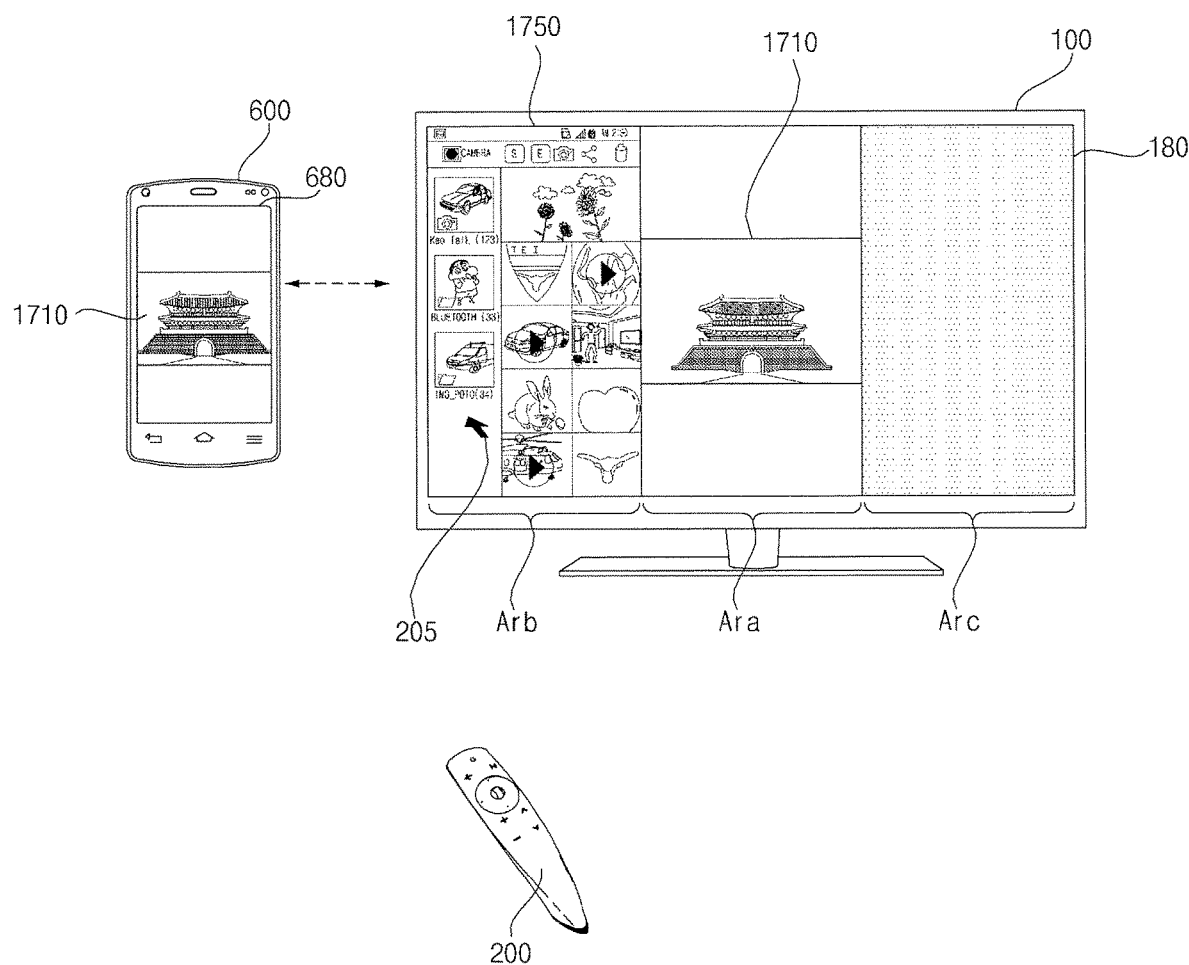

In FIG. 8D, the pointer 205 moves to the second area Arb which is a blank area, the controller 170 of the image display apparatus 100 may perform a control operation to display an image list 1750 related to the mirroring image 1710 as additional information related to the mirroring image 1710.

Further, the controller 170 of the image display apparatus 100 may transmit a request for transmission of the image list 1750 related to the mirroring image to the mobile terminal 600 according to the location of the pointer 205. Then, the controller 170 may receive the image list 1750 related to the mirroring image from the mobile terminal 600.

As the image list is displayed, an image desired by the user may be easily selected, and the selected image item may be transmitted to the mobile terminal 600. Thereby, the selected mirroring image may be easily received from the mobile terminal 600 and displayed.

In displaying additional information related to the mirroring image in a blank area, if the amount of data of the additional information is large or the size of the image indicating the additional information is greater than that of the blank area, the controller 170 of the image display apparatus 100 may perform a control operation to move and display the mirroring image or to display the mirroring image with the image reduced in size.

Figure 8E:
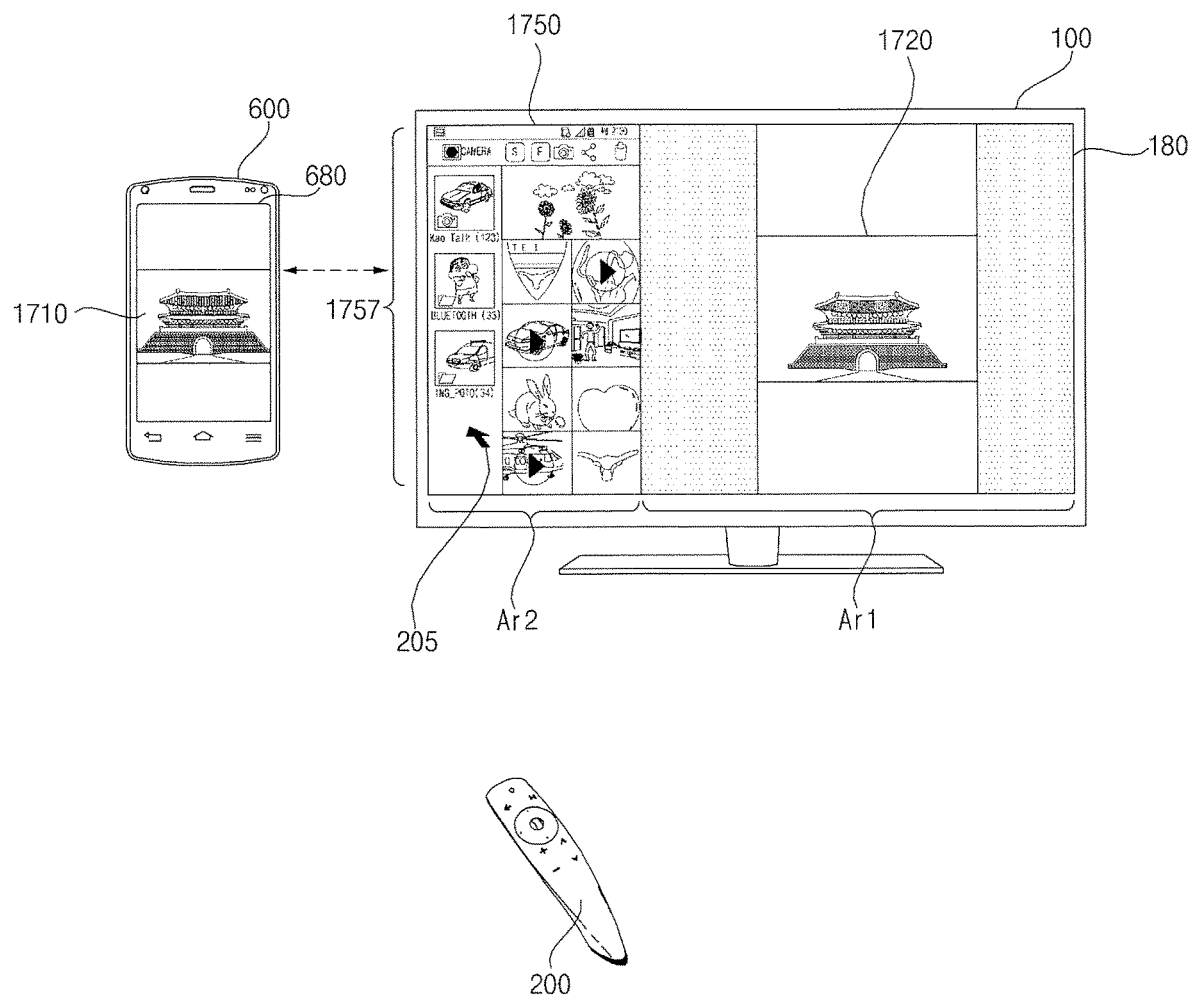

FIG. 8E illustrates where a mirroring image is moved to the right side such that the mirroring image 1720 is displayed in area Ar1, and the image list 1750 is displayed in area Ar2 as additional information related to the mirroring image.

Figure 8F:
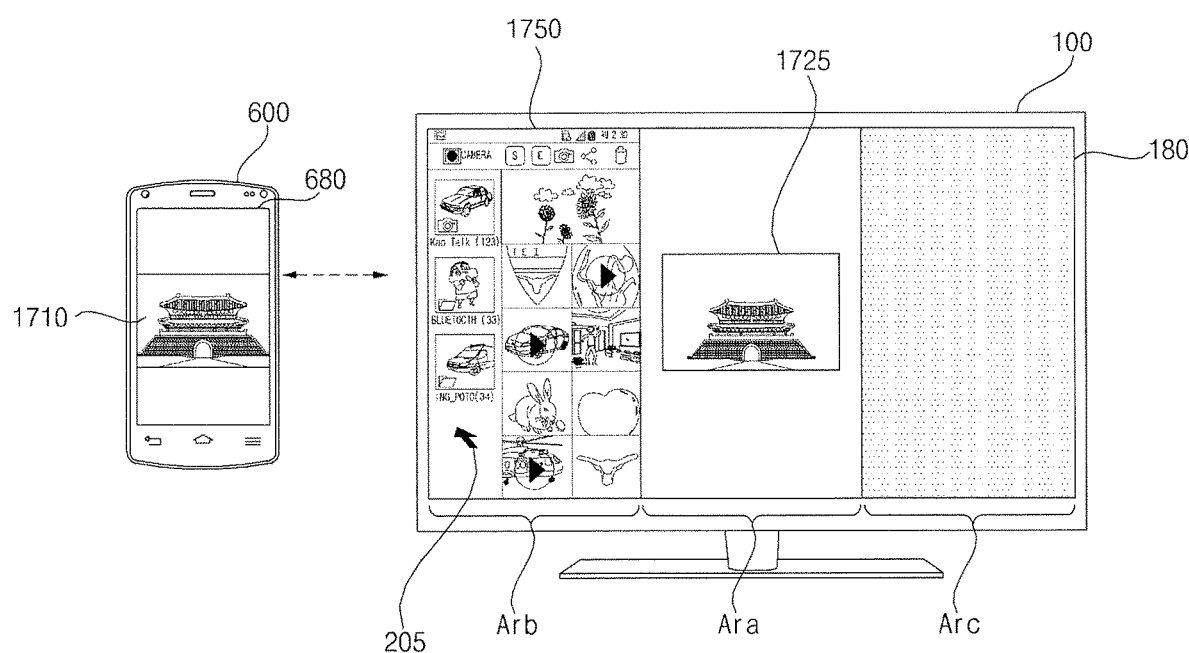

FIG. 8F illustrates where a mirroring image 1725 which is the mirroring image 1720 reduced in size is displayed in the area Ara without change in the position of the displayed mirroring image, while the mirroring image list 1750 is displayed in the second area Arb which is a blank area.

If the mirroring image is a home screen window of the mobile terminal, the controller 170 of the image display apparatus 100 may perform a control operation to display a second home screen window or third home screen window in the blank area. This operation will be described with reference to FIGS. 9A to 9C.

FIG. 9A illustrates where a main home screen window 1910 of the mobile terminal 600 is displayed in the display area Ara as a mirroring image 1920.

If the pointer 205 moves to the second area Arb which is a blank area, the back key of the remote control device 200 operates, or the pointer 205 flicks to the left, the controller 170 of the image display apparatus 100 may perform a control operation to display a second home screen window 1922 related to the main home screen window 1910 of the mobile terminal 600 as additional information related to the mirroring image 1920, as shown in FIG. 9B.

Further, the controller 170 of the image display apparatus 100 may transmit a request for transmission of the second home screen window related to the mirroring image to the mobile terminal 600 according to the location of the pointer 205. Then, the controller 170 may receive the second home screen window related to the mirroring image from the mobile terminal 600.

As the main home screen window 1920 and the second home screen window 1922 are displayed simultaneously, an application may be easily selected through the image display apparatus 100, contrary to the display 680 of the mobile terminal 600 which is restricted, and the mirroring image for the selected application may be readily received from the mobile terminal 600 and displayed. Thereby, user convenience may be enhanced.

If the pointer 205 moves to the third area Arc which is a blank area, or the pointer 205 flicks to the right, the controller 170 of the image display apparatus 100 may perform a control operation to display, in the third area Arc, the third home screen window 1924 related to the main home screen window 1920 of the mobile terminal 600 as additional information related to the mirroring image 1920, as shown in FIG. 9C.

The second home screen window may be a previous home screen window of the main home screen window, and the third home screen window may be the next home screen window of the main home screen window.

If the pointer 205 moves to the third area Arc which is a blank area, the controller 170 of the image display apparatus 100 may perform a control operation such that the third home screen window 1924 is displayed in the third area Arc while the second home screen window 1922 remains displayed in the second area Arb which is an blank area, as shown in FIG. 9C.

In contrast with FIG. 9C, the controller 170 of the image display apparatus 100 may perform a control operation such that the second home screen window 1922 is not displayed in the second area Arb which is a blank area, while the main home screen window 1920 is displayed in the display area Ara, and the third home screen window 1924 is displayed in the third area.

Figure 10A:
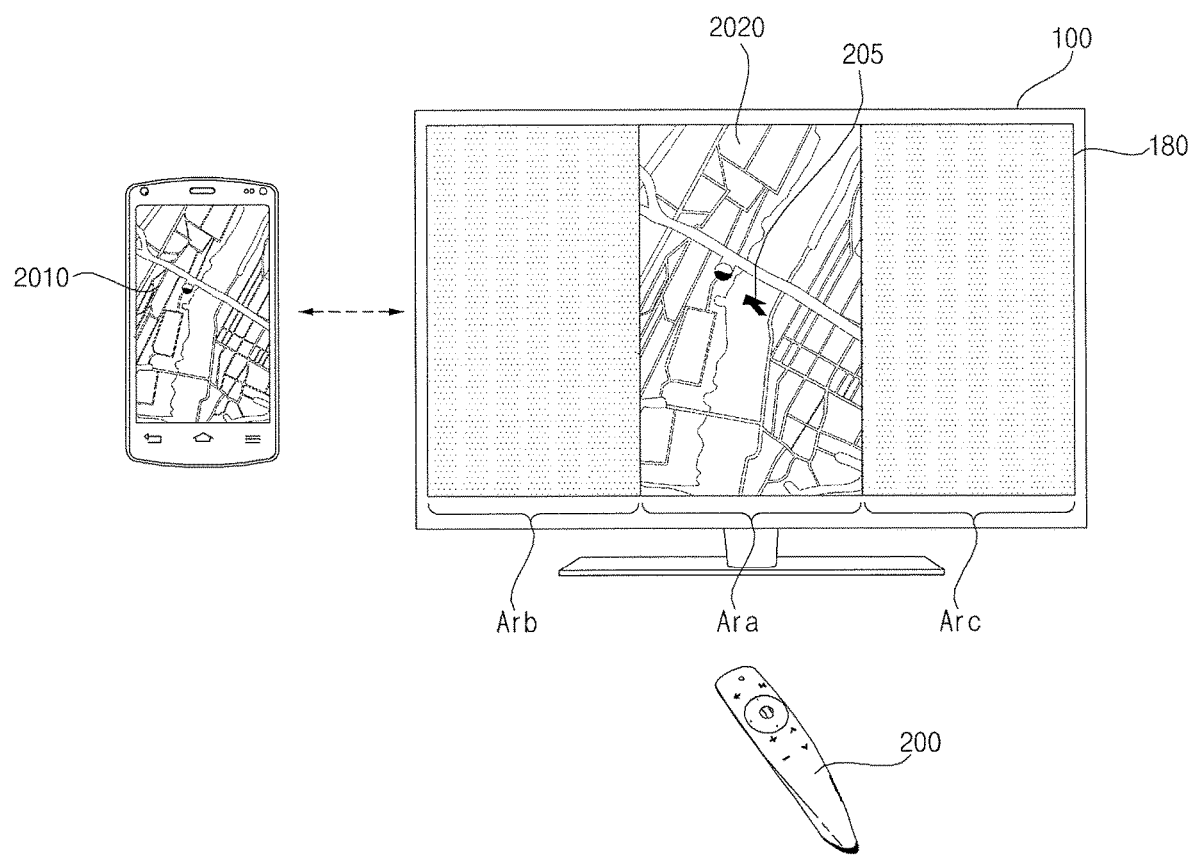

If the displayed mirroring image is a map image 2020 associated with map image 2010 as shown in FIG. 10A, the controller 170 of the image display apparatus 100 may perform a control operation to display additional information according to the location of the pointer 205.

Figure 10B:
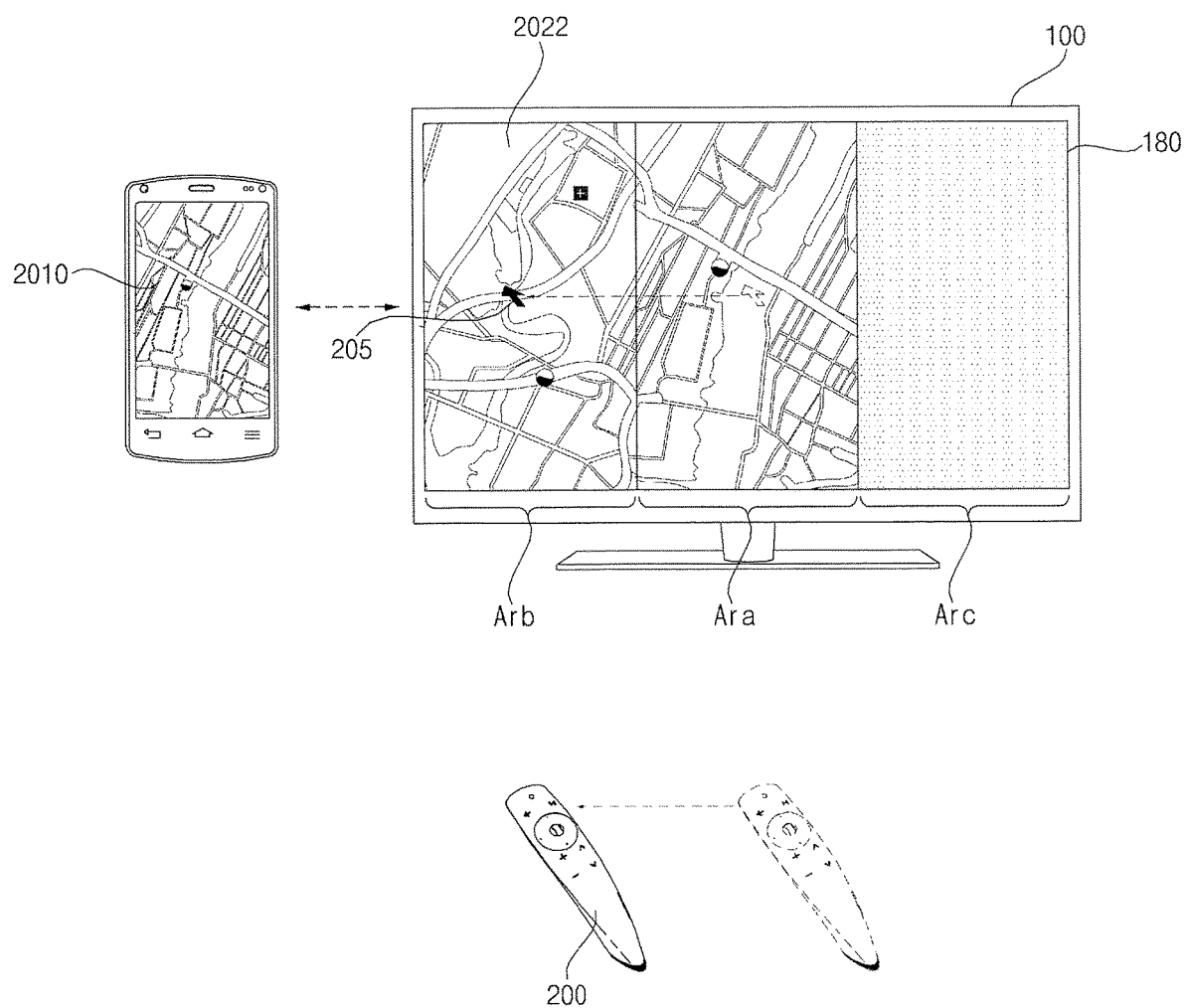

Particularly, if the pointer 205 moves to the second area Arb which is a blank area, the back key of the remote control device 200 operates, or the pointer 205 flicks to the left, the controller 170 of the image display apparatus 100 may perform a control operation to display an additional map image 2022 in the second region Arb which is a blank area as additional information related to the mirroring image 2020, as shown in FIG. 10B.

Herein, the additional map image may be received from the mobile terminal 600 or may be separately created based on data received from the server 500 to which the image display apparatus 100 is connected.

Figure 10C:
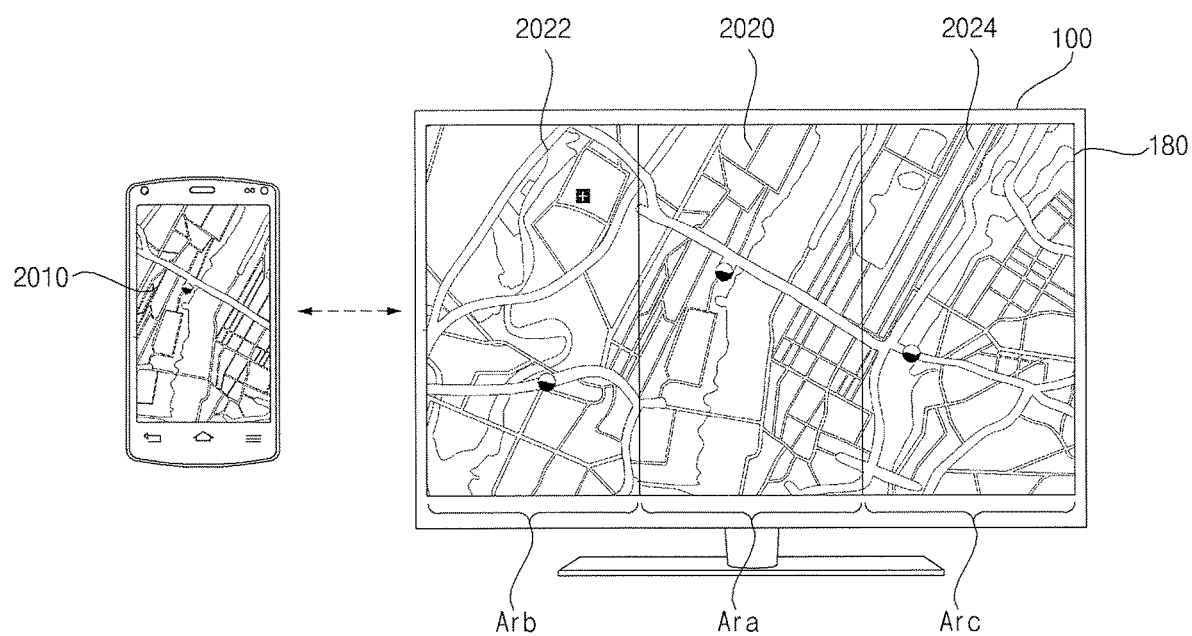

If the pointer 205 moves to the third area Arc which is a blank area or the pointer 205 flicks to the right, the controller 170 of the image display apparatus 100 may perform a control operation to display an additional map image 2024 in the third area Arc as additional information related to the mirroring image 2020, as shown in FIG. 10C.

Herein, the controller 170 of the image display apparatus 100 may perform a control operation to display the map image in the display area Ara, the additional map image 2022 in the second area Arb and the additional map image 2024 in the third area Arc.

In contrast with the example of FIG. 10C, the controller 170 of the image display apparatus 100 may perform a control operation to display the map image in the display area Ara and the additional map image 2024 in the third area Arc. That is, the controller 170 of the image display apparatus 100 may perform a control operation not to display the additional map image 2022 in the second area Arb.

Figure 10D:
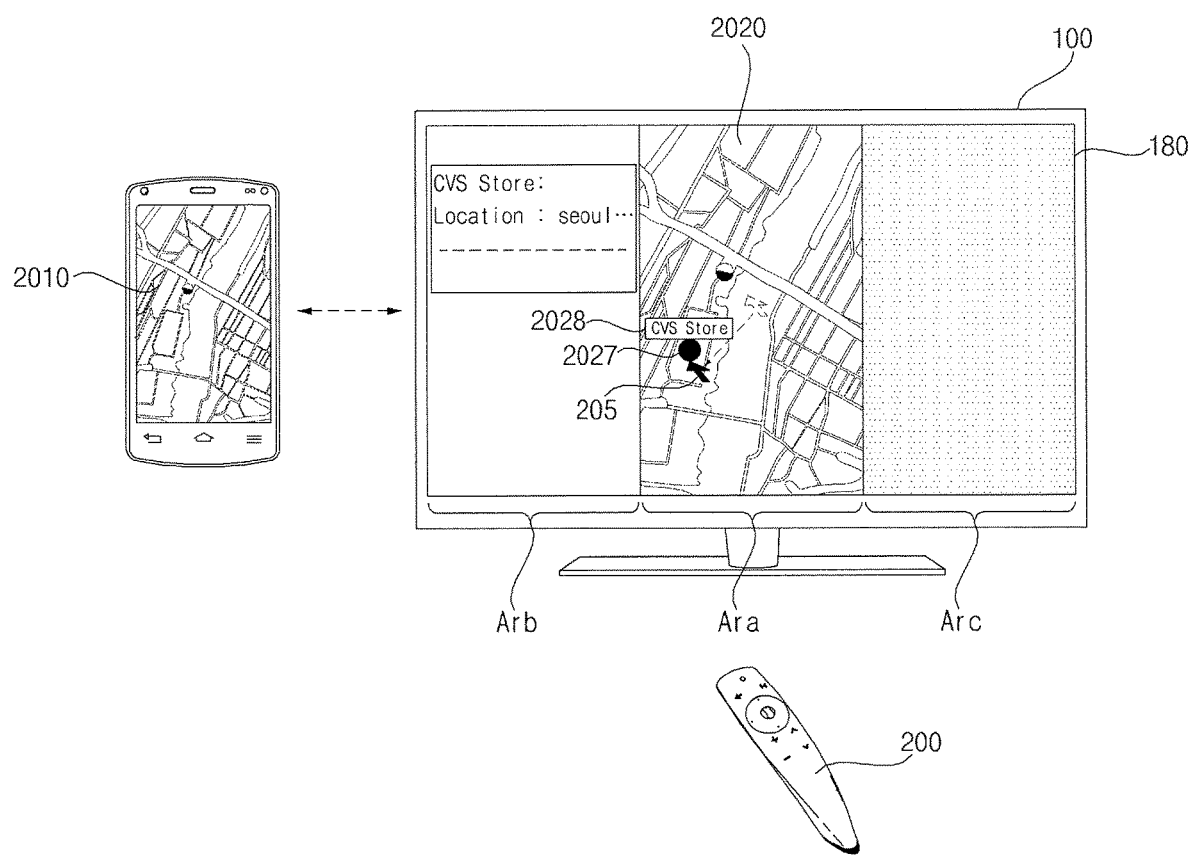

In addition, if the pointer 205 is located in the display area Ara, the controller 170 of the image display apparatus 100 may perform a control operation such that detailed information which is not displayed on the mobile terminal 600 is displayed in the mirroring image 2020, as shown in FIG. 10D.

For example, the controller 170 of the image display apparatus 100 may analyze the mirroring image, collect data of detailed information which may be displayed in the mirroring image, and perform a control operation to generate and display an object or OSD based on the data of the detailed information.

For example, as shown in FIG. 10D, if the pointer 205 is located in the display area Ara, the controller 170 of the image display apparatus 100 may perform a control operation to display location information 2027 or shop name information 2028 in the map image as additional information or detailed information.

In particular, the controller 170 of the image display apparatus 100 may perform a control operation to display detailed information related to items in which the user is interested.

In the example of the figure, the shop location information 2027 and the shop name information 2028 are displayed as items in which the user is interested.

Figure 10E:
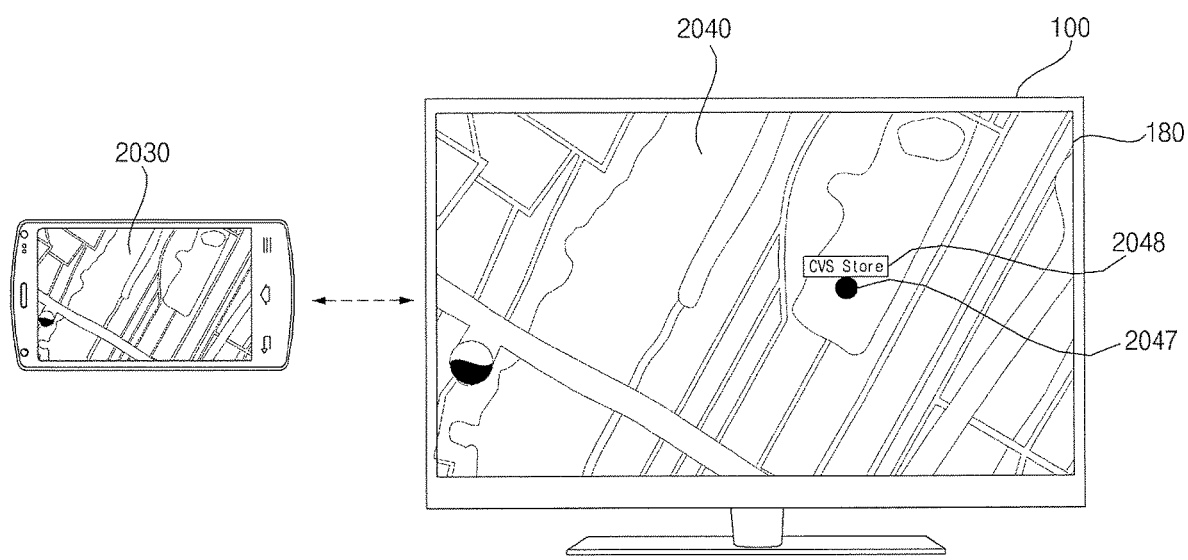

FIG. 10E, which is similar to FIG. 10D, illustrates mirroring according to horizontal display which corresponds to a display position of the mobile terminal 600.

In performing mirroring, the image display apparatus 100 receives an image and displays the same according to the display position of the mobile terminal 600.

In FIG. 10E, the mobile terminal 600 is in the horizontal display position, and a map image 2030 is displayed thereon.

The controller 170 of the image display apparatus 100 may perform a control operation to display a map image 2040 on the display 180 as a mirroring image.

Similar to FIG. 10D, the controller 170 of the image display apparatus 100 may perform a control operation to display additional information or detailed information on the map image 2040.

If the display mode of the mobile terminal 600 is the horizontal display mode, the controller 170 of the image display apparatus 100 may perform a control operation to display additional information or detailed information, regardless of the pointer 205.

In the figure, the location information 2047 or shop name information 2048 is displayed in the map image 2040 as the additional information or detailed information. Thereby, more detailed information may be viewed through the image display apparatus 100 which has a larger display 180.

If the mirroring image is the home screen window or idle screen window of the mobile terminal, the controller 170 of the image display apparatus 100 may perform a control operation to display at least one of an object corresponding to a camera manipulation button attached to the mobile terminal, an object corresponding to a power button, an object corresponding to a volume adjustment button and an object corresponding to a zooming adjustment button in a blank area.

If the mirroring image is the home screen window or idle screen window of the mobile terminal, the controller 170 of the image display apparatus 100 may perform a control operation to display at least one of an object indicating a first connector for connection with an external device and an object indicating a second connector for connection with an additional detachable memory in the blank area.

Providing a button object or connector object of a mobile terminal as additional information will be described with reference to FIGS. 11A to 11K.

Figure 11A:
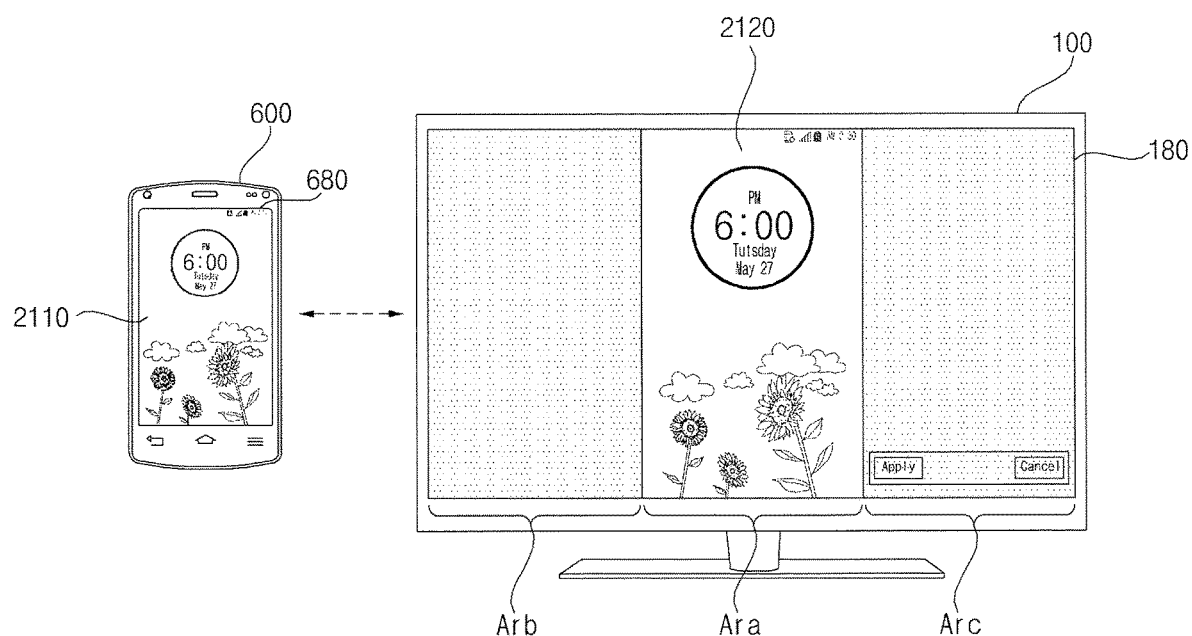

In the example of FIG. 11A, an idle screen window 2120 is displayed in a display area Ara of the display 180 of the image display apparatus 100 as a mirroring image of idle screen window 2110.

In the example of FIG. 11B, if the pointer 205 of the remote control device 200 is located in the third area Arc which is a blank area, the controller 170 of the image display apparatus 100 may perform a control operation to display an object 2122 corresponding to a manipulation button for, for example, manipulation of a camera.

For example, the controller 170 of the image display apparatus 100 may determine the manufacturer and product name of the mobile terminal 600, using the device information about the mobile terminal received through pairing with the mobile terminal 600.

Then, the controller 170 of the image display apparatus 100 may connect to the server 500 to receive an image related to the mobile terminal 600.

Specifically, the controller 170 of the image display apparatus 100 may perform a control operation to receive an image of the mobile terminal including a manipulation button. Alternatively, the controller 170 of the image display apparatus 100 may perform a control operation to receive an image of the mobile terminal including an external terminal.

As another example, in performing pairing with the mobile terminal 600, the controller 170 of the image display apparatus 100 may receive an image including the device information about the mobile terminal and the manipulation button of the mobile terminal 600 or receive an image of the mobile terminal 600 including the external terminal.

Thereby, the controller 170 of the image display apparatus 100 may perform a control operation to create an object 2122 corresponding to the manipulation button enabling manipulation of a camera and display the object 2122, based on the received image including the manipulation button.

Alternatively, the controller 170 of the image display apparatus 100 may transmit, to the server 500, the device information about the mobile terminal 600 received in performing pairing with the mobile terminal 600, thereby receiving, from the server 500, a control menu related to the manipulation button and terminal of the mobile terminal.

Herein, the control menu may include an object related to a manipulation button of the mobile terminal or an object related to the external terminal of the mobile terminal.

Then, the controller 170 of the image display apparatus 100 may perform a control operation to display the object 2122 related to the manipulation button of the mobile terminal in the received control menu according to predetermined input.

When an object 2122 corresponding to the camera manipulation button is selected by the pointer 205, the controller 170 of the image display apparatus 100 may perform a control operation to transmit a camera manipulation button operation signal to the mobile terminal 600 such that a camera 621 operates in the mobile terminal 600. Thereby, the camera of the mobile terminal 600 may be manipulated through the image display apparatus 100.

Where the pointer 205 of the remote control device 200 is located in the third area Arc which is a blank area, the controller 170 of the image display apparatus 100 may perform a control operation to display objects corresponding to various buttons of the mobile terminal 600 in addition to the object 2122 corresponding to the camera manipulation button.

In FIG. 11C, compared to FIG. 11B, an object 2123 for a USB item, which is a first item for connection with an external device, a micro SD item, which is a second item for connection with an additional detachable memory, a speaker item, a microphone item, a flash item, a volume adjustment button item, a power button item and other types of button items may be additionally displayed in the third area Arc. Thereby, various manipulation operations of the mobile terminal 600 may be performed through the image display apparatus 100.

For example, when the USB item, which is the first item for connection with an external device, is selected using the pointer 205, the controller 170 of the image display apparatus 100 may perform a control operation through a USB terminal to display, on the display 180 of the image display apparatus 100, an image displayed on the mobile terminal 600 as a mirroring image. Thereby, content from the external device connected to the mobile terminal 600 may be conveniently viewed.

As another example, when the micro SD item which is the second item for connection with an additional detachable memory is selected using the pointer 205, the controller 170 of the image display apparatus 100 may perform a control operation through a micro SD terminal to display, on the display 180 of the image display apparatus 100, an image displayed on the mobile terminal 600 as a mirroring image. Thereby, content from the additional memory attached to the mobile terminal 600 may be conveniently viewed.

As another example, when the flash item is selected using the pointer 205, the controller 170 of the image display apparatus 100 may perform a control operation to transmit a control signal to turn on a flash device of the mobile terminal 600.

If the flash item is selected again using the pointer 205, the controller 170 of the image display apparatus 100 may perform a control operation to transmit a control signal to turn off the flash device of the mobile terminal 600.

Similarly, when the speaker item, microphone item, volume adjustment button item, or power button item is selected, the controller 170 of the image display apparatus 100 may perform a control operation to turn on/off the speaker, the microphone, or the power, or turn up/down the volume.

Figure 11D:
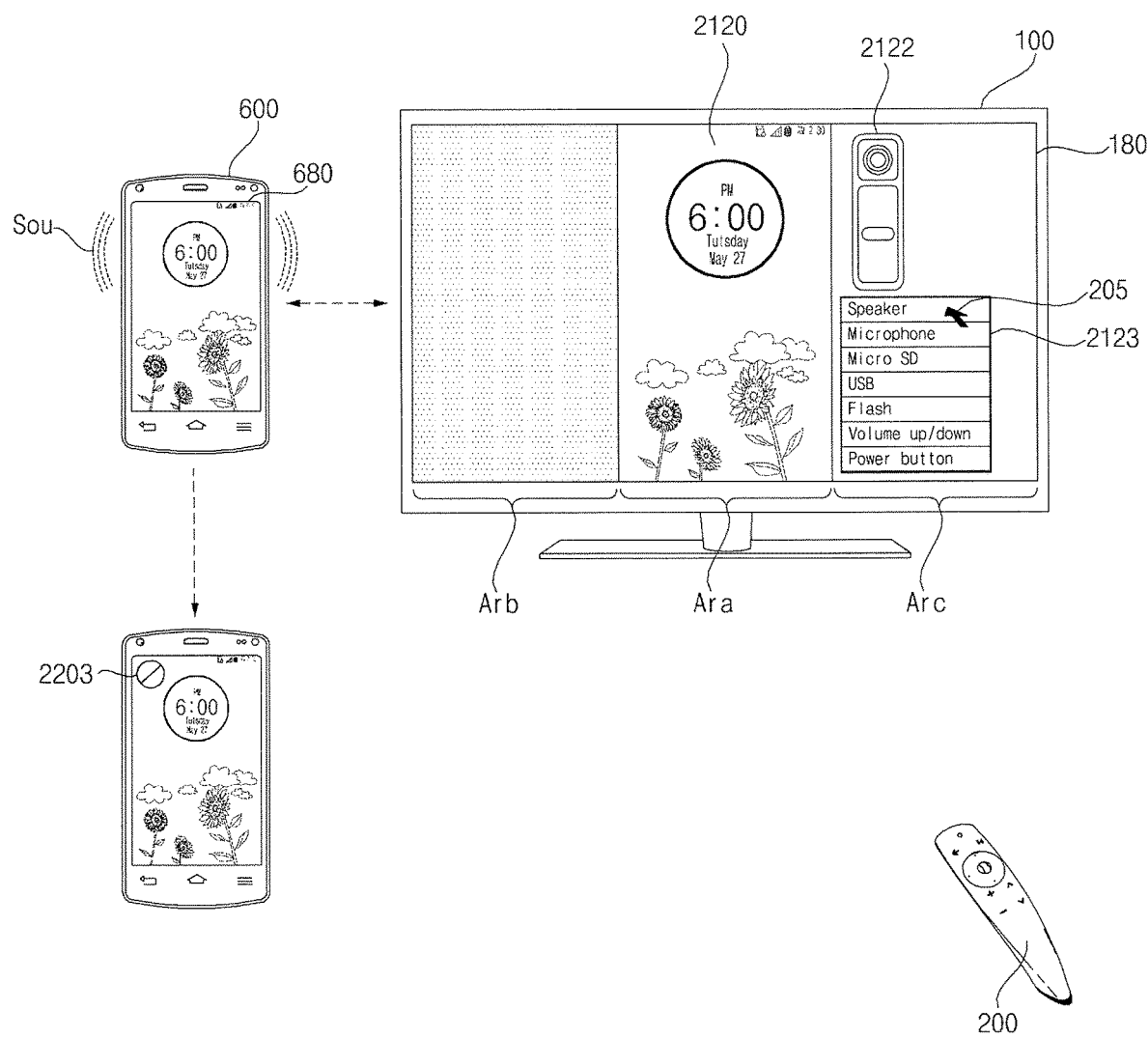

FIG. 11D illustrates where the speaker item in the object 2123 is selected by the pointer 205.

When the speaker item in the object 2123 is selected, the controller 170 of the image display apparatus 100 may perform a control operation such the sound Sou is not output from the speaker of the mobile terminal 600, as shown in FIG. 11D. Specifically, the controller 170 of the image display apparatus 100 may perform a control operation to transmit, to the mobile terminal 600, a control signal for causing the speaker of the mobile terminal 600 to be mute 2203.

Thereby, as shown FIG. 11D, sound is not output from the speaker of the mobile terminal 600.

If the speaker item in the object 2123 is selected, the controller 170 of the image display apparatus 100 may perform a control operation to toggle and alternately output sound between the image display apparatus 100 and the mobile terminal 600. This operation will be described with reference to FIGS. 11E and 11F.

Figure 11F:
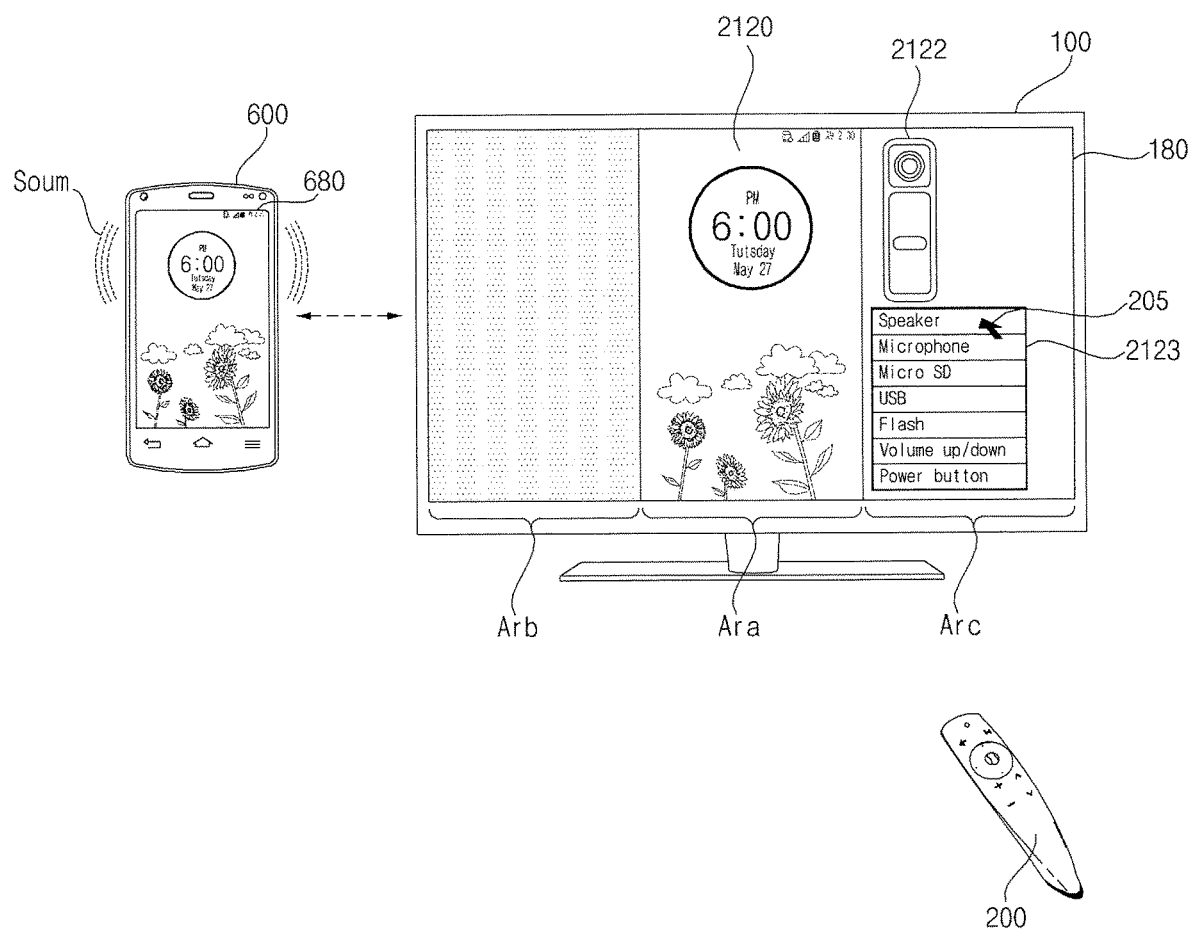

To distinguish the example of FIGS. 11E and 11F from the above example, when the speaker item in the object 2123 is selected through a long press, the speaker of the mobile terminal 600 may be controlled to be turned on/off as shown in FIG. 11D. When the speaker item in the object 2123 is selected through short press, sound output may be controlled to be toggled between the mobile terminal 600 and the image display apparatus 100.

FIG. 11E illustrates where sound Sout is output through the speaker of the image display apparatus 100 rather than through the mobile terminal 600 when the speaker item in the object 2123 is selected by the pointer 205.

When the speaker item in the object 2123 is selected, the controller 170 of the image display apparatus 100 may perform a control operation to transmit a control signal to the mobile terminal 600 such that a sound signal is not output from the mobile terminal 600, and perform a control operation to receive an audio signal reproduced in the mobile terminal 600 such that the audio signal is output from the speaker of the image display apparatus 100.

FIG. 11F illustrates where sound Sout is output through the speaker of the mobile terminal 600 rather than through the image display apparatus 100 when the speaker item in the object 2123 is selected again by the pointer 205.

When the speaker item in the object 2123 is selected again, the controller 170 of the image display apparatus 100 may perform a control operation to transmit a control signal to the mobile terminal 600 such that a sound signal is output from the mobile terminal 600 and sound is not output from the speaker of the image display apparatus 100.

When the pointer 205 located in the blank area is shifted to the display area Ara of the mirroring image, the controller 170 of the image display apparatus 100 may perform a control operation such that an object corresponding to additional information displayed in the blank area is shifted and displayed.

Figure 11G:
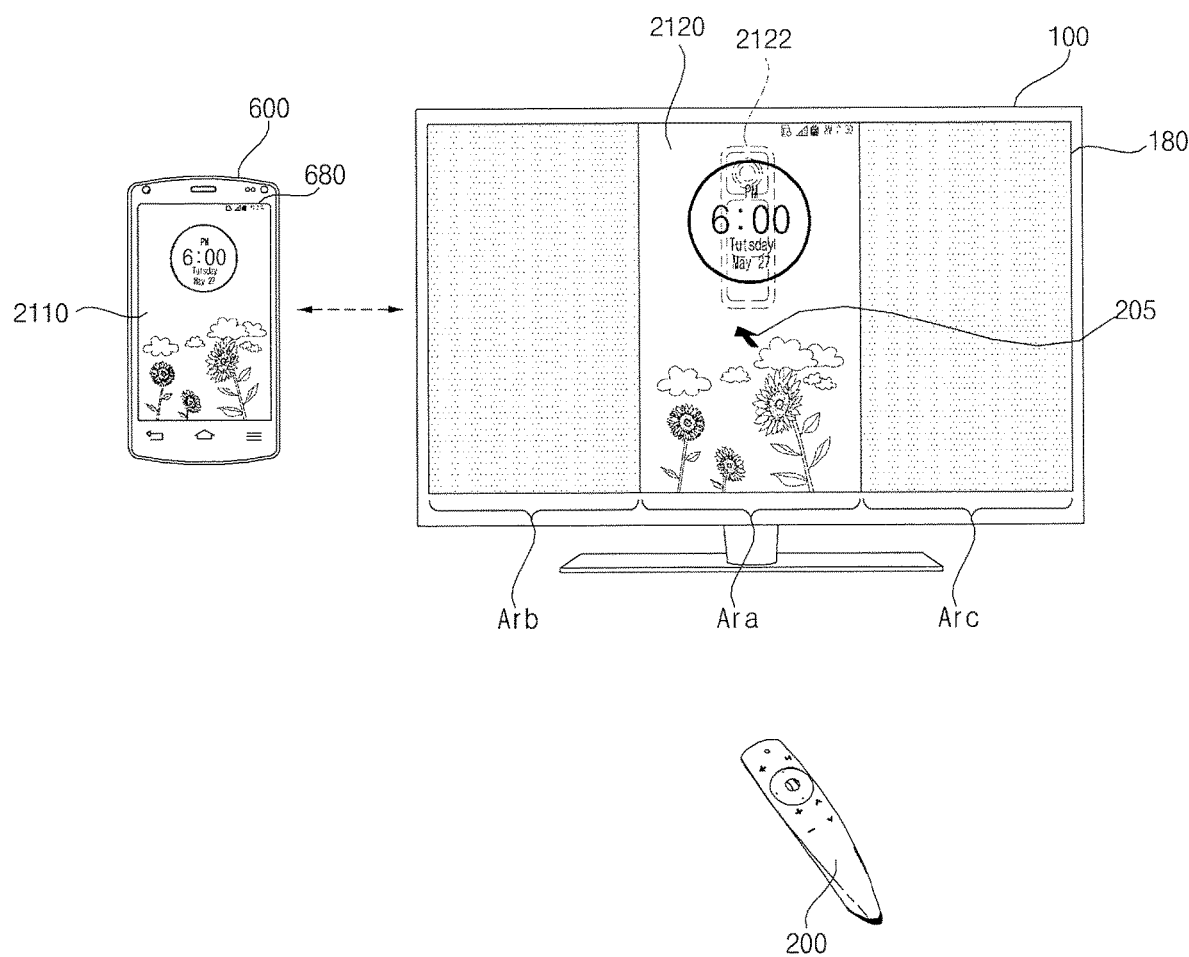

FIG. 11G illustrates displaying the object 2122 corresponding to the camera manipulation button on a mirroring image 2120 in an overlaying manner as the pointer 205 moves from the blank area to the display area Ara for the mirroring image.

The controller 170 of the display apparatus 100 may perform a control operation to display the object 2122 corresponding to the camera manipulation button at the actual location of the camera manipulation button. In this instance, to distinguish the object 2122 from the mirroring image 2120, the controller 170 of the image display apparatus 100 may perform a control operation to highlight the object 2122 or make the object 2122 transparent. Thereby, the effect obtained when the camera manipulation button is actually manipulated may be achieved.

In contrast with FIG. 11G, if the pointer 205 is located at the display area Ara for the mirroring image, the controller 170 of the display apparatus 100 may perform a control operation to display objects corresponding to various terminals disposed on the mobile terminal 600, as shown in FIG. 11H.

FIG. 11H illustrates where a power charge terminal object 2135, volume adjustment button objects 2133 and 2134, a camera object 2132, an earphone jack terminal object 2131, an object 2136 indicating an LED, and other objects are displayed on the mirroring image 2120. Thereby, the effect as obtained when the mobile terminal 600 is actually manipulated may be achieved.

Operations of some of the objects of FIG. 11H may be controlled using the pointer 205.

For example, when the volume adjustment button objects 2133 and 2134 are selected using the pointer 205, the controller 170 of the image display apparatus 100 may transmit a volume adjustment signal to the mobile terminal 600. Thereby, the mobile terminal 600 may be easily controlled.

As another example, when the earphone jack terminal object 2131 is selected using the pointer 205, the controller 170 of the image display apparatus 100 may perform a control operation to establish Bluetooth connection with the mobile terminal 600, as shown in FIG. 11H.

Specifically, when the earphone jack terminal object 2131 is selected, the controller 170 of the image display apparatus 100 may perform a control operation to display a screen window 2210 for Bluetooth connection with the mobile terminal 600 in an area Arc separate from the area for the mirroring image 2120, as shown in FIG. 11I.

When a connection item 2212 in the screen window 2210 for Bluetooth connection is selected, the controller 170 of the image display apparatus 100 may transmit a pairing signal for Bluetooth connection to the mobile terminal 600, and receive a pairing response signal from the mobile terminal 600. The pairing signal or pairing response signal may include frequency hopping information for Bluetooth connection.

When Bluetooth connection is completed, the controller 170 of the image display apparatus 100 may perform a control operation to display an object 2214 indicating completion of connection with the mobile terminal or an object 2216 indicating display of a music playback screen window, as shown in FIG. 11J.

In particular, when the object 2216 indicating display of the music playback screen window is selected by the pointer, the controller 170 of the image display apparatus 100 may perform a control operation to transmit a control signal for execution of the music playback application to the mobile terminal 600.

Thereby, the mobile terminal 600 may execute the music playback application, and display a music playback application screen window 2220a, as shown in FIG. 11K.

The controller 170 of the image display apparatus 100 may receive the music playback application screen window 2220a displayed in the mobile terminal 600 according to mirroring, and perform a control operation to display a music playback application screen window 2220 in the area Ara as a mirroring screen window, as shown in FIG. 11K.

As shown in FIG. 11K, the music playback application screen window 2220 may include an object 2224 indicating a file list, a playback time and other playback information items and a Pause/Play object 2226.

When the first music item 2222 in the file list is selected by the pointer 205, the controller 170 of the image display apparatus 100 performs a control operation to play back the first music item 2222. That is, the controller 170 of the image display apparatus 100 performs a control operation to transmit a control signal for playback of the first music item 2222 to the mobile terminal 600.

Thereby, the mobile terminal 600 may play the first music item 2222, and transmit a reproduced audio signal to the image display apparatus 100. Herein, because the Bluetooth connection is established, the mobile terminal 600 may not output sound for the first music item 2222 through the speaker thereof.

The controller 170 of the image display apparatus 100 may receive an audio signal corresponding to a first music item which is played back, and perform a control operation to output sound Sout3 corresponding to the audio signal through the speaker. Thereby, a music file stored in the mobile terminal 600 may be conveniently played back through the image display apparatus 100 such that the music can be listened to. In particular, sound with a quality higher than the quality of sound provided by the mobile terminal 600 may be listened to through the speaker of the image display apparatus 100.

Hereinafter, a description will be given of operations of an image display apparatus and mobile terminal for mirroring.

Figure 12:
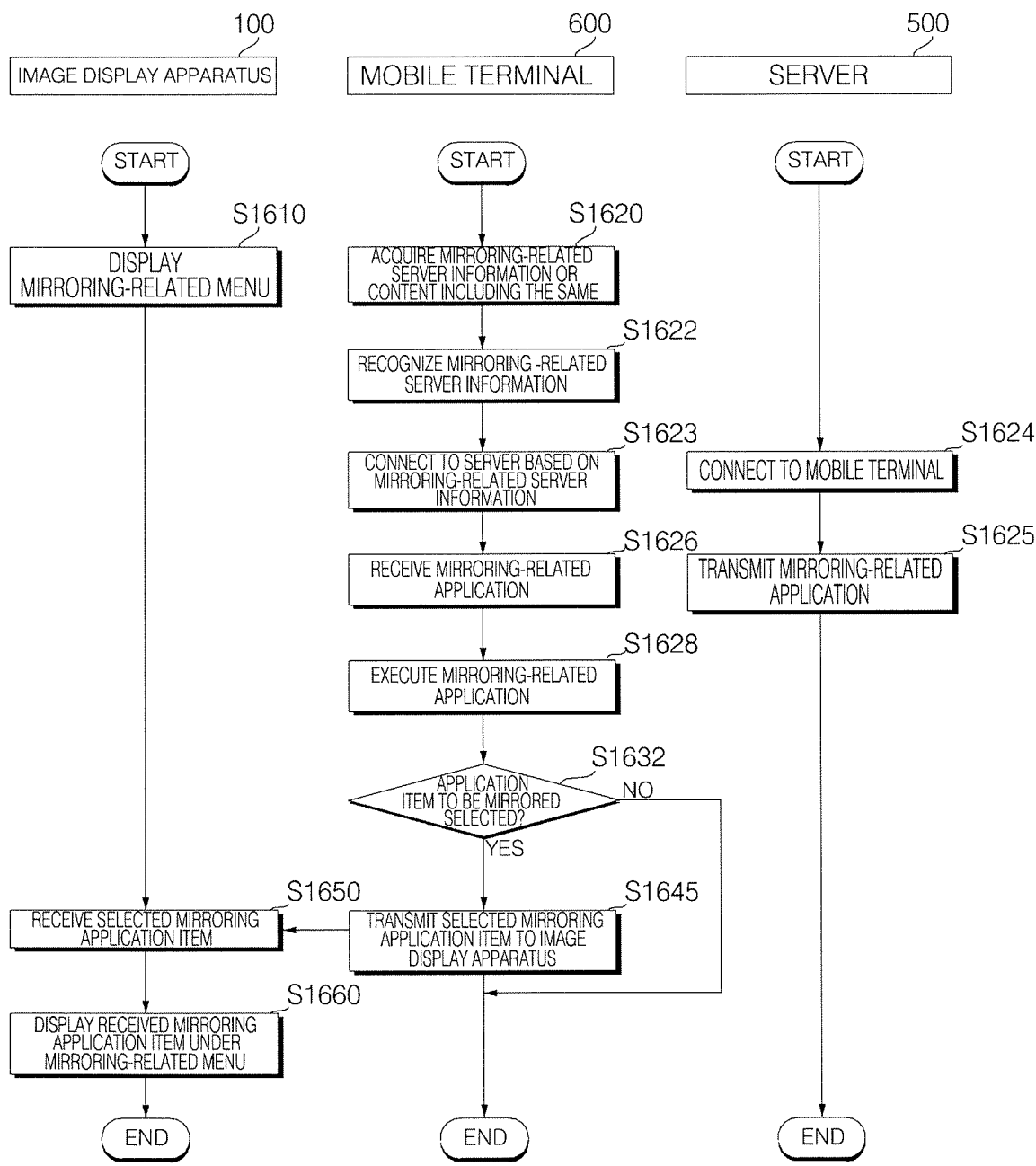
FIG. 12 is a flowchart illustrating operation of an image display apparatus and mobile terminal according to another embodiment of the present invention.

FIG. 12 is a flowchart illustrating operation of an image display apparatus and mobile terminal according to another embodiment of the present invention, and FIGS. 13A to 15T illustrate the operation method of FIG. 12.

Referring to FIG. 12, the controller 170 of the image display apparatus 100 may perform a control operation based on user input to display mirroring-related server information or content related to the server information (S1610).

For example, when an input is provided through a specific key of the remote control device 200, the controller 170 of the image display apparatus 100 may perform a control operation to display a mirroring-related menu including content related to mirroring-related server information or content related to the server information.

For example, the content related to the server information may include a code image including the server information. More specifically, the content may include a QR code image including the server information.

As another example, the content related to the server information may be output as predetermined sound.

Next, the controller 670 of the mobile terminal 600 may acquire the mirroring-related server information or the content related to the server information displayed on the image display apparatus 100 (S1620). Then, the controller 670 of the mobile terminal 600 may recognize the mirroring-related server information (S1625).

For example, the mobile terminal 600 may capture a code image displayed on the image display apparatus 100 through the camera 621 of the mobile terminal 600. Then, the controller 670 of the mobile terminal 600 may extract server information from the captured code image and recognize the extracted server information (S1622).

As another example, the mobile terminal 600 may extract server information from sound received through the microphone 623 and recognize the extracted server information.

Next, the controller 670 of the mobile terminal 600 may control the mobile terminal 600 to be connected to the corresponding server based on the recognized mirroring-related server information (S1623). The server 500 may be connected with the mobile terminal 600 in response (S1624).

For example, the server 500 may be a server operated by the manufacturer of the image display apparatus 100. The server 500 may be a server corresponding to mirroring-related server information installed when the image display apparatus 100 was manufactured.

The user of the mobile terminal 600 may easily access the server 500 through the content related to the mirroring-related server information or content related to the server information displayed on the image display apparatus 100.

The server 500 may transmit a mirroring-related application to the mobile terminal 600 when connected with the mobile terminal 600 (S1625).

The controller 670 of the mobile terminal 600 may receive the mirroring-related application from the server 500 through the communication unit 610 (S1626), and install the mirroring-related application. Then, the controller 170 may execute the mirroring-related application (S1628).

Thereby, the mirroring-related application may be easily installed on and executed by the mobile terminal 600.

Next, the controller 670 of the mobile terminal 600 may determine whether an application item for which mirroring is to be performed selected (S1632). When the application item for which mirroring is to be performed is selected, the controller 670 may perform a control operation to transmit the selected application item to the image display apparatus 100 (S1645).

For example, the controller 670 of the mobile terminal 600 may select an application item for which mirroring is to be performed with the image display apparatus 100 among two or more applications installed in the mobile terminal 600, through the mirroring-related application.

At least one of application items may be selected, and the controller 670 of the mobile terminal 600 may transmit information about the selected application item to the image display apparatus 100.

In particular, the controller 670 of the mobile terminal 600 may transmit name information, application image information, user information, and application version information about the selected application item to the image display apparatus 100.

Next, the controller 170 of the image display apparatus 100 may receive the selected mirroring application item from the mobile terminal 600 via the network interface unit 135 or 145 (S1650).

Then, the controller 170 of the image display apparatus 100 may install the received mirroring application item in the image display apparatus 100, and particularly, performs a control operation to display the received mirroring application item in a mirroring-related menu (S1660). Thereby, the mirroring application item from the mobile terminal may be easily installed in and displayed on the image display apparatus 100.

Hereinafter, the operation method of FIG. 12 will be described with reference to FIGS. 13A to 15T.

Figure 13A:
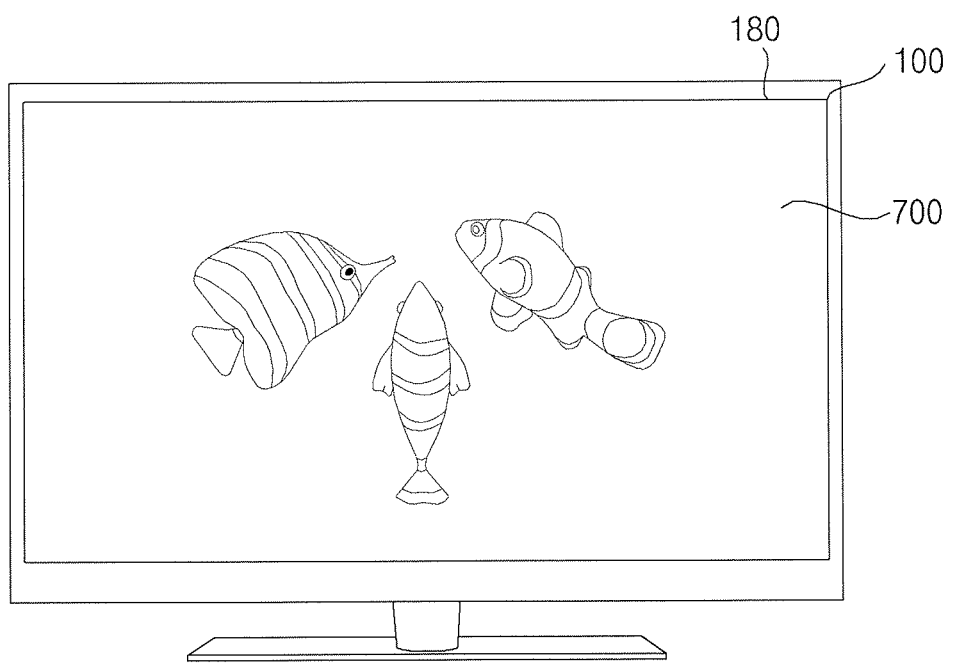

The controller 170 of the image display apparatus 100 may perform a control operation to display, on the display 180, a broadcast image 700 based on a broadcast signal received by a broadcast receiver 105, as shown in FIG. 13A.

Figure 13B:
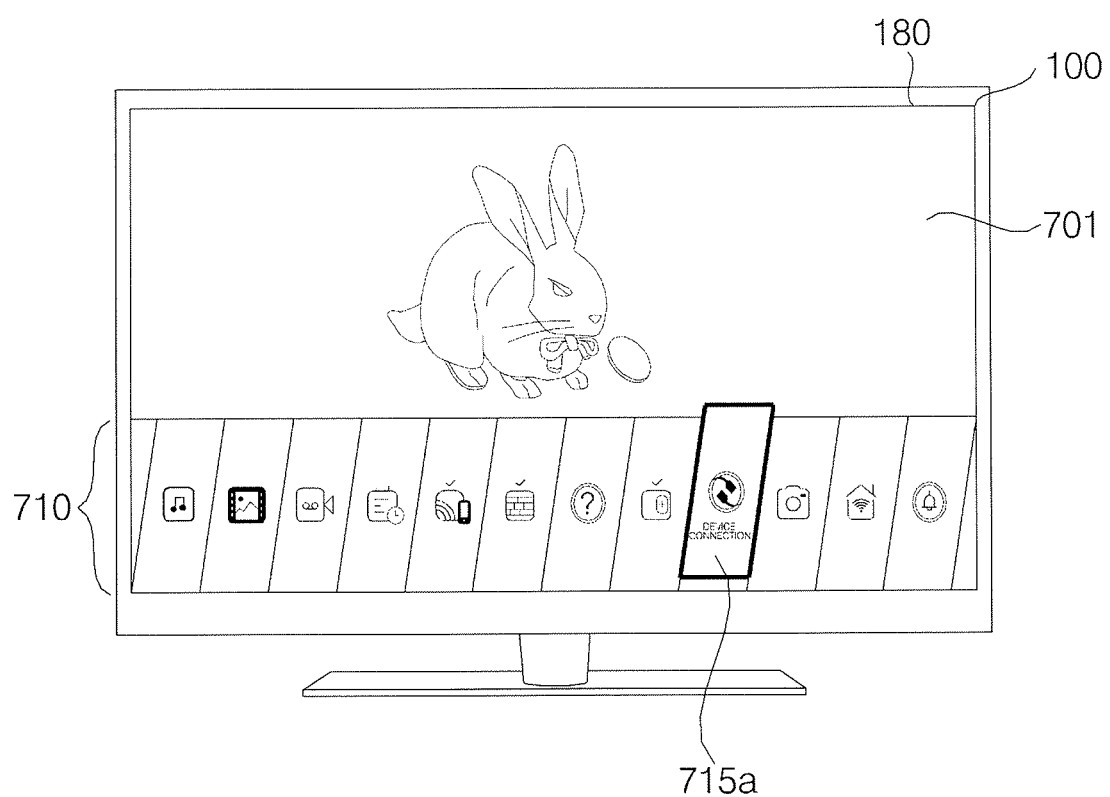

Herein, when an input is provided through of a specific key of the remote control device 200 or a predetermined item in a displayed menu is selected, the controller 170 of the image display apparatus 100 may perform a control operation to display a broadcast image 701 corresponding to a broadcast signal and an application list 710, as shown in FIG. 13B.

The controller 170 of the image display apparatus 100 may perform a control operation to display the application list 710 and the broadcast image 701 in an overlapping manner, as shown in FIG. 13B.

The application list 710 may include various application items including a device connection application item 715a. Additionally, the application list 710 may include an additional view item for viewing an additional application.

The device connection application item 715a may be referred to as a mirroring application item.

When the device connection application item 715a is focused on by the pointer of the remote control device 200, the controller 170 of the image display apparatus 100 may control the device connection application item 715a to be highlighted in contrast with the other items when the device connection application item 715a is displayed, as shown in FIG. 13B.

In the example of the figure, the size of the device connection application item 715a is increased over the other application items.

Figure 13C:
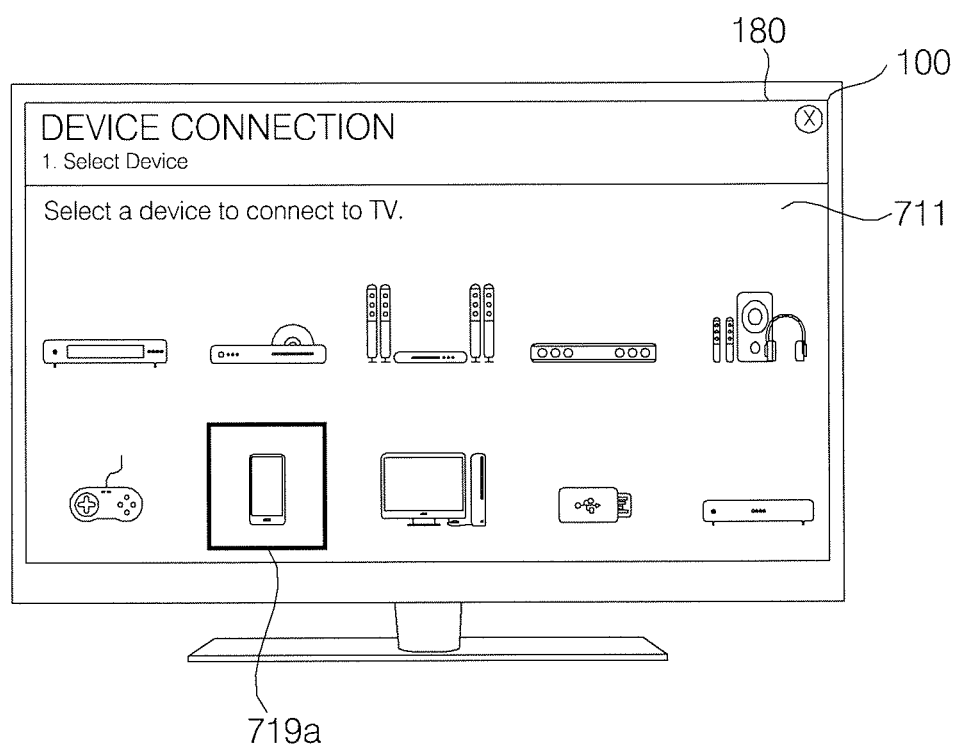

If the device connection application item 715a is selected by the pointer of the remote control device 200, the controller 170 of the image display apparatus 100 may perform a control operation to display a device list screen window 711 including two or more device items for mirroring connection on the display 180, as shown in FIG. 13C.

In the example of FIG. 13C, the displayed image 701 is caused to disappear, and the device list screen window 711 is displayed. Alternatively, the device list screen window 711 may be displayed on the displayed image 701 in an overlaying manner.

The device list screen window 711 may include a set-top box item, a Blu-ray/DVD player item, a home theater item, a sound bar item, a speaker/headphone item, a game console item, a mobile terminal item, a computer item, an external storage device item such as a USB item, and other device items.

Figure 13D:
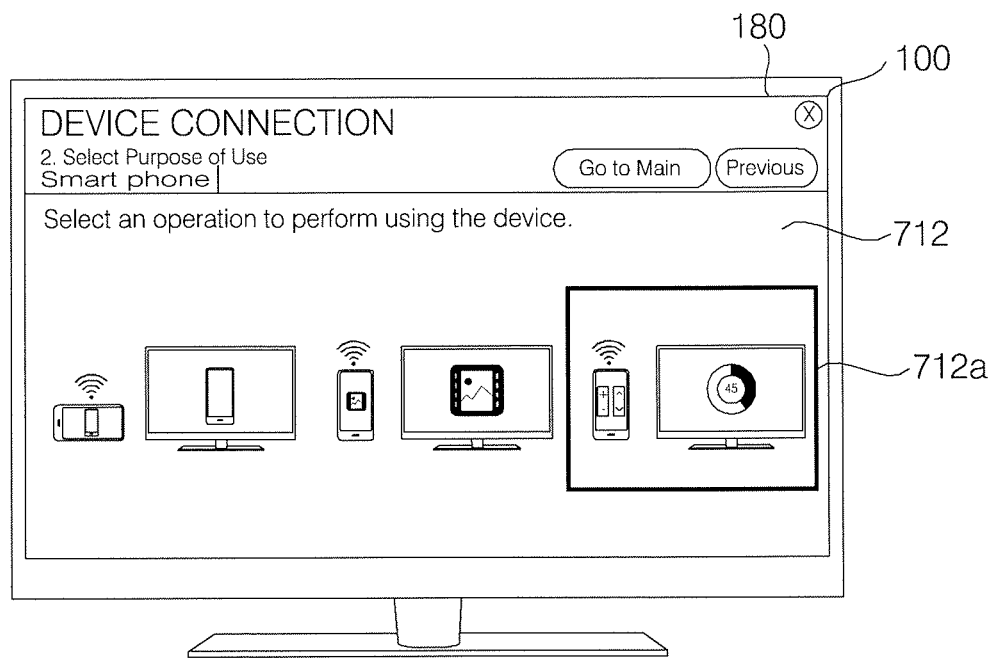

When the mobile terminal item 719a in the device list screen window 711 is selected by, for example, the pointer of the remote control device 200, the controller 170 of the image display apparatus 100 may perform a control operation to display, on the display 180, a device control list screen window 712 including two or more items to be controlled through the mobile terminal, as shown in FIG. 13D.

The device control list screen window 712 may include a remote control item from remotely controlling the image display apparatus 100 using the mobile terminal 600, a Share Content item for sharing content between the mobile terminal 600 and the image display apparatus 100, and a mirroring item for mirroring between the mobile terminal 600 and the image display apparatus 100.

Figure 13E:
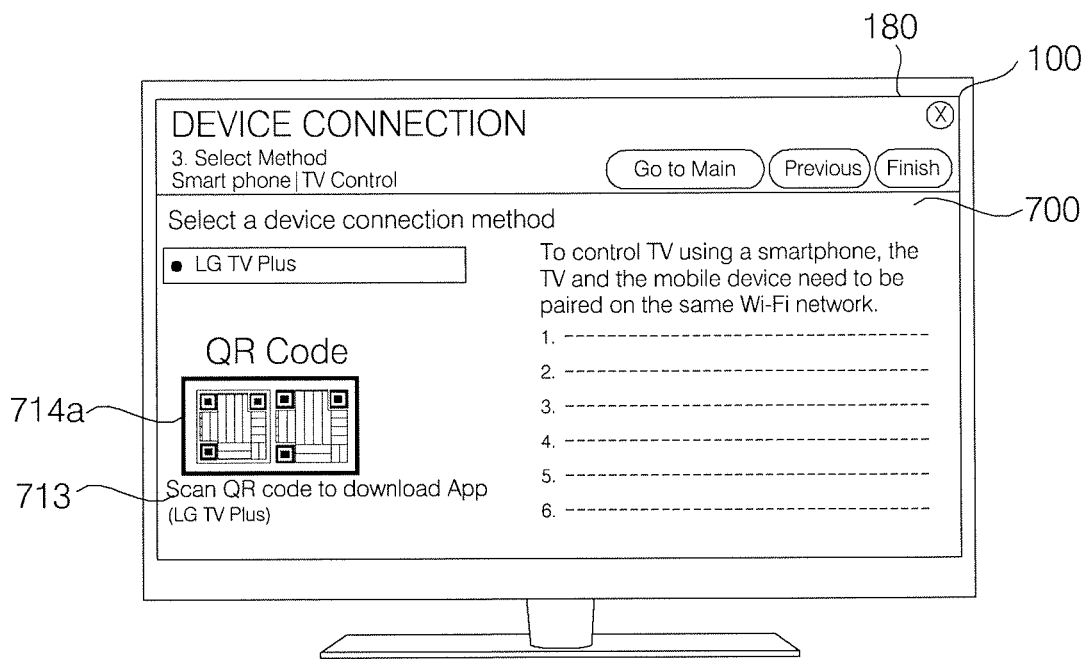

When a mirroring item 712a in the device control list screen window 712 is selected by, for example, the pointer of the remote control device 200, the controller 170 of the image display apparatus 100 may perform a control operation to display the device control list screen window 712 including two or more items to be controlled through the mobile terminal and a device connection method screen window 700 indicating a device connection method, as shown in FIG. 13E.

The device connection method screen window 700 may include a code image 714a including server information and relevant information 713.

Figure 13F:
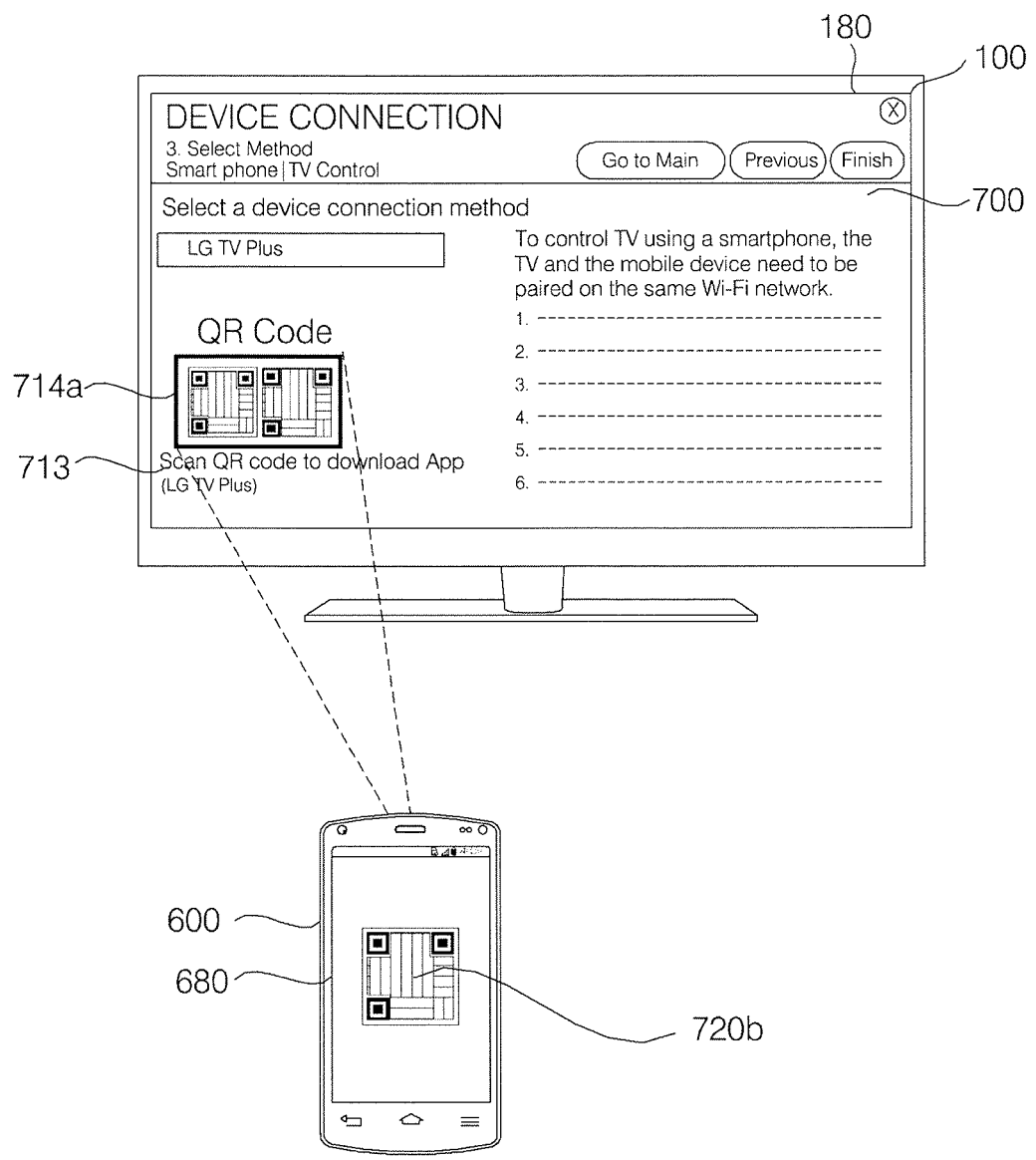

For example, the code image 714a including the server information may include a QR code image including the server information, as shown in FIG. 13F.

While the code image 714a including the server information is displayed on the image display apparatus 100, the camera 621 of the mobile terminal 600 may capture the code image 714a including the server information, as shown in FIG. 13F.

Then, the controller 670 of the mobile terminal 600 may receive and recognize the captured image 720b. In this instance, the controller 670 of the mobile terminal 600 may perform a control operation to display the image 720b related to the captured server information on the display 180.

The controller 670 of the mobile terminal 600 may extract server information from the captured image 720b.

Then, the controller 670 of the mobile terminal 600 may control connection to the server 500 based on the extracted server information 725.

For example, the controller 670 of the mobile terminal 600 may transmit a connection request signal Sreg1 to the server 500 to connect to the server 500, and receive a connection response signal Sreg1 from the server 500, as shown in FIG. 13G.

Figure 13H:
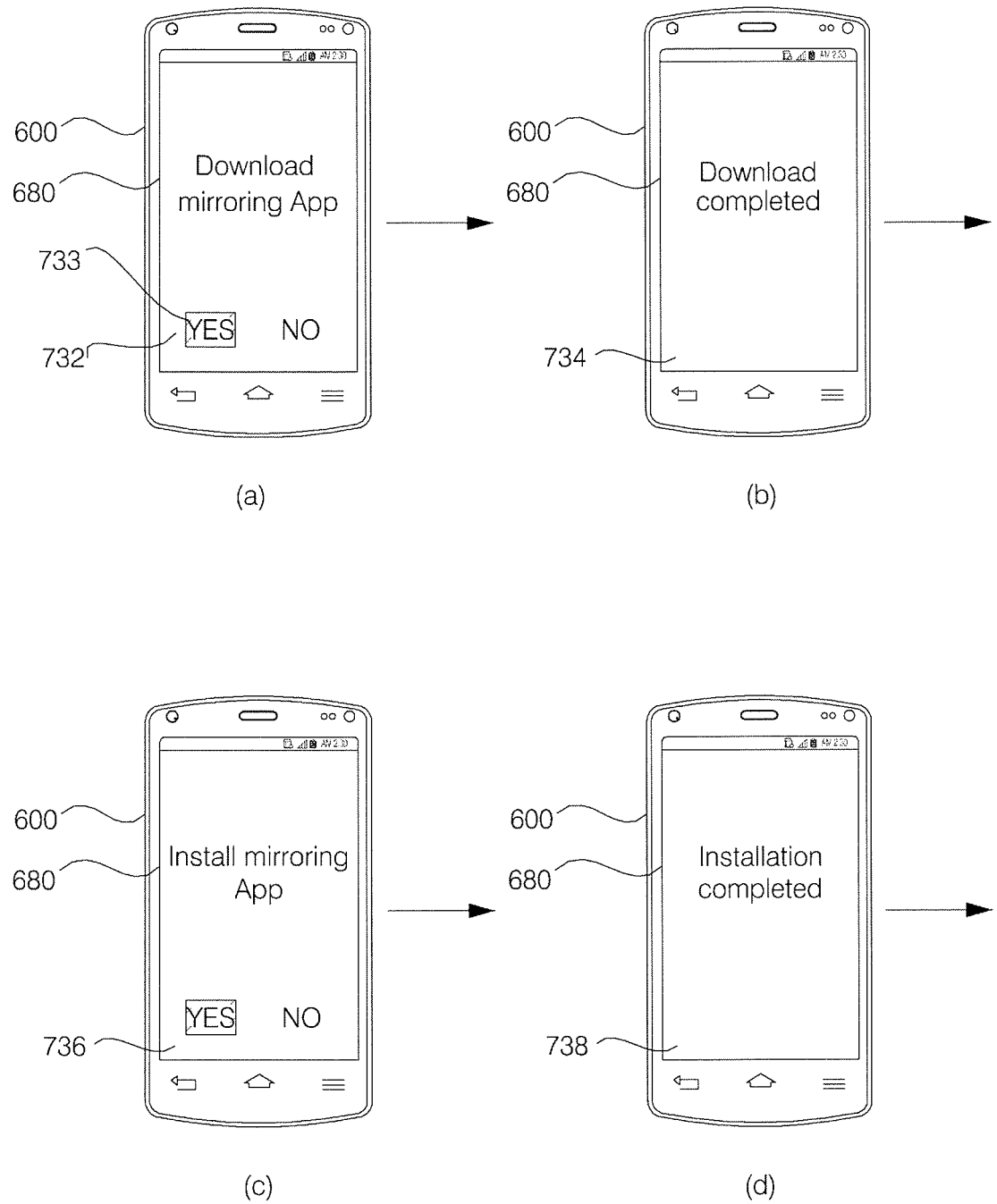

Next, the controller 670 of the mobile terminal 600 may receive a mirroring-related application from the server 500, as shown in FIG. 13H.

More specifically, the controller 670 of the mobile terminal 600 may perform a control operation to display a screen window 732 for downloading a mirroring application, as shown in (a) of FIG. 13H.

In this instance, when the download item 732 is selected by, for example, touch input from the user, the controller 670 of the mobile terminal 600 may download a mirroring application. When downloading is completed, the controller 670 of the mobile terminal 600 may perform a control operation to display a download complete screen window 734, as shown in (b) of FIG. 13H.

Next, the controller 670 of the mobile terminal 600 may install the downloaded mirroring setting application. In this instance, the controller 670 of the mobile terminal 600 may perform a control operation to display an installation screen window 736 as shown in (c) of FIG. 13H.

When the installation is completed, the controller 670 of the mobile terminal 600 may perform a control operation to display an installation completed screen window 738 as shown in (d) of FIG. 13H.

Next, the controller 670 of the mobile terminal 600 may execute the installed mirroring setting application.

This operation will be described with reference to FIGS. 14A to 14K or FIGS. 15A to 15T.

Figure 14A:
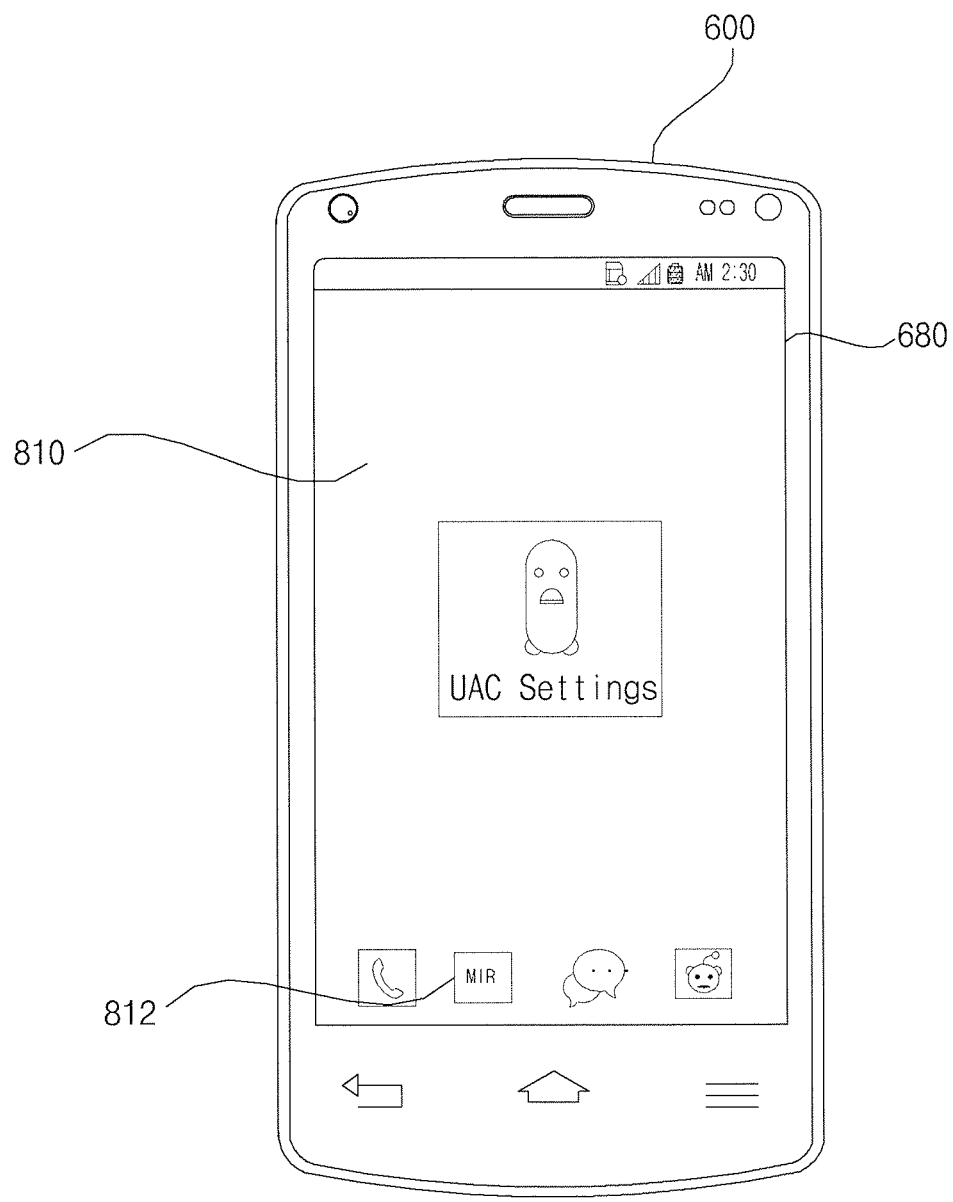

FIG. 14A illustrates an idle screen window 810 or home screen window 810 of the mobile terminal 600. The idle screen window 810 or the home screen window 810 may be displayed on the display 680. Two or more application items may be displayed at the lower end of the screen window. In the figure, the mirroring application item 812 is displayed among two or more application items.

When the mirroring application item 812 is selected in the idle screen window 810 or home screen window 810 of the mobile terminal 600 of FIG. 14A, or downloading of the mirroring application of FIG. 13H is completed, the mirroring application may be automatically executed.

Figure 14B:
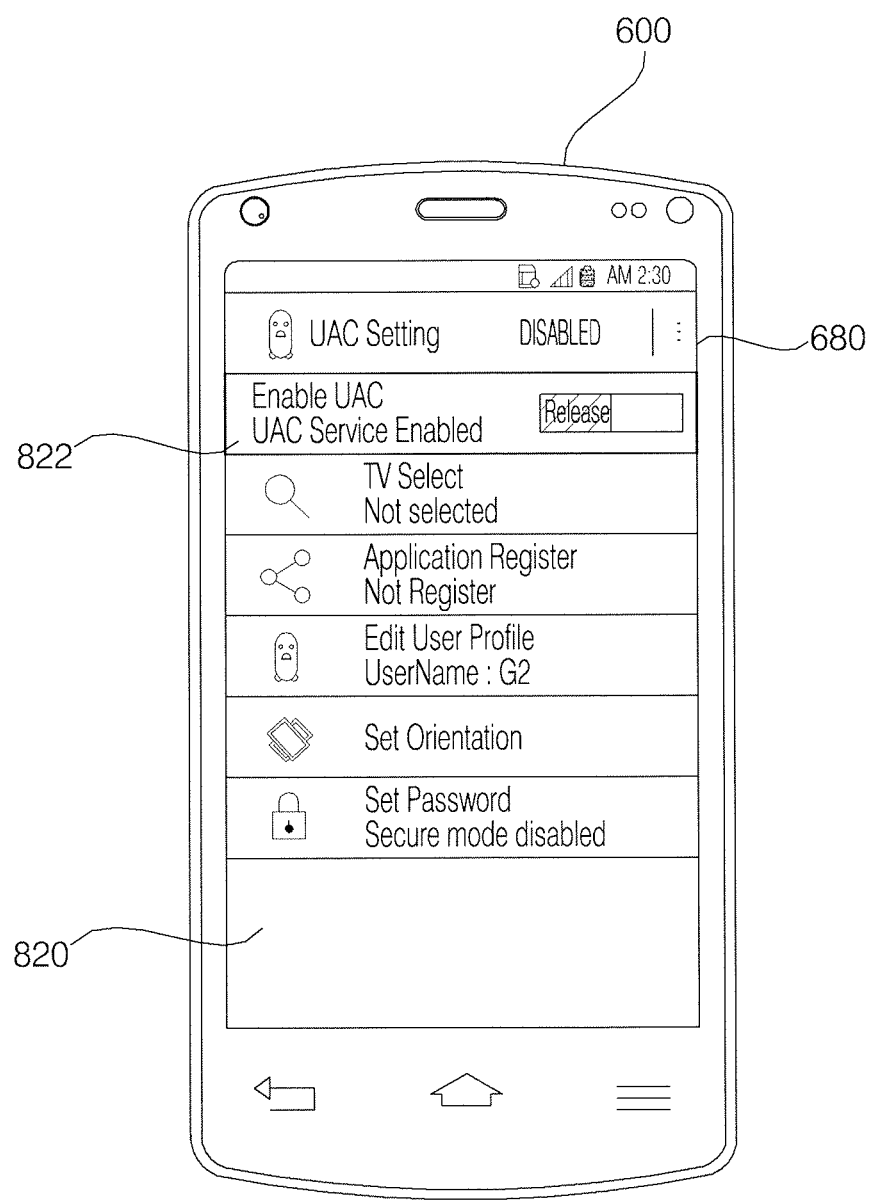

In executing the mirroring application, the controller 670 of the mobile terminal 600 may perform a control operation to display a mirroring setting application screen window 820, as shown in FIG. 14B.

The mirroring setting application screen window 820 may include a Enable item 822, a TV Select item 824, an Application Register item 826, an Edit User Profile item 823, a Set Orientation item 813, and a Set Password item 814.

Figure 14C:
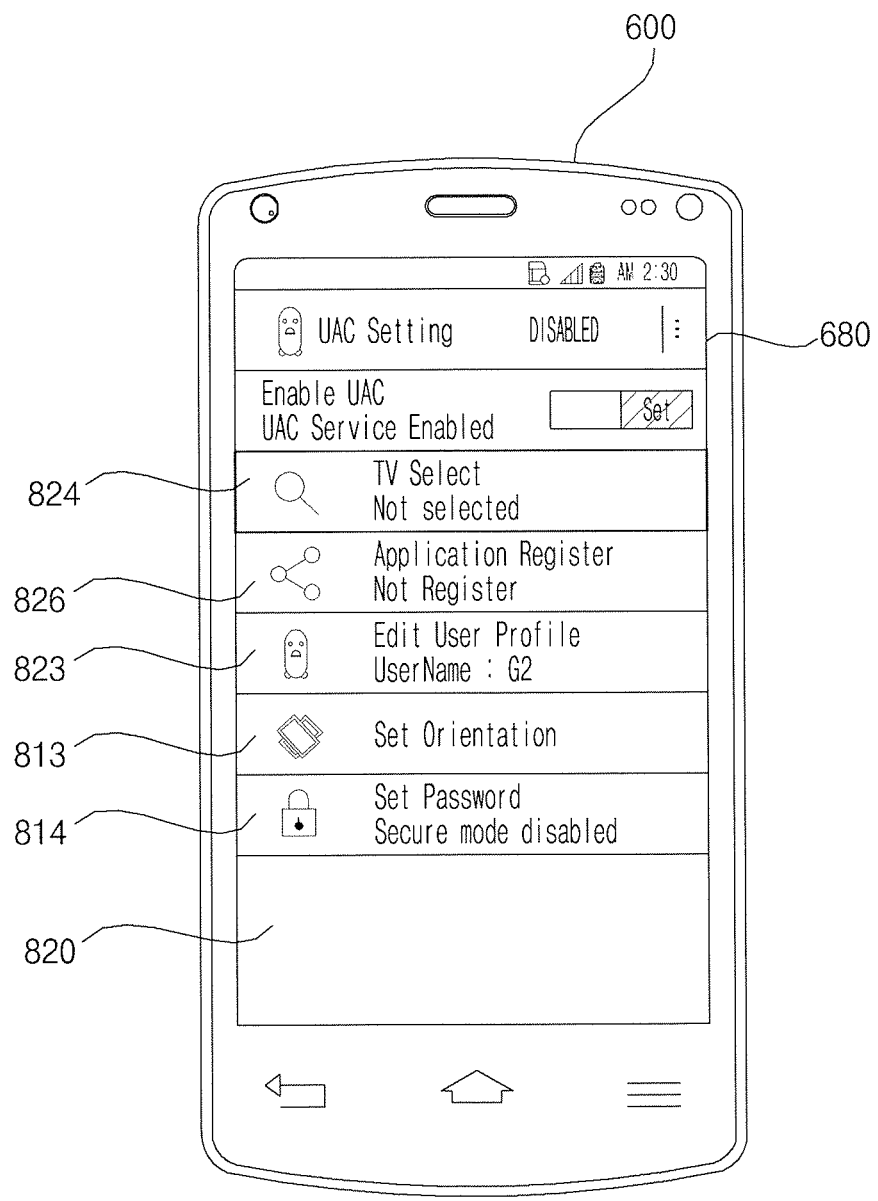

When the Enable item 822 is selected and activated, the controller 670 of the mobile terminal 600 may perform a control operation to activate and display the TV Select item 824, the Application Register item 826, the Edit User Profile item 823, the Set Orientation item 813, and the Set Password item 814, as shown in FIG. 14C. Thereby, various kinds of settings may be implemented.

Figure 14D:
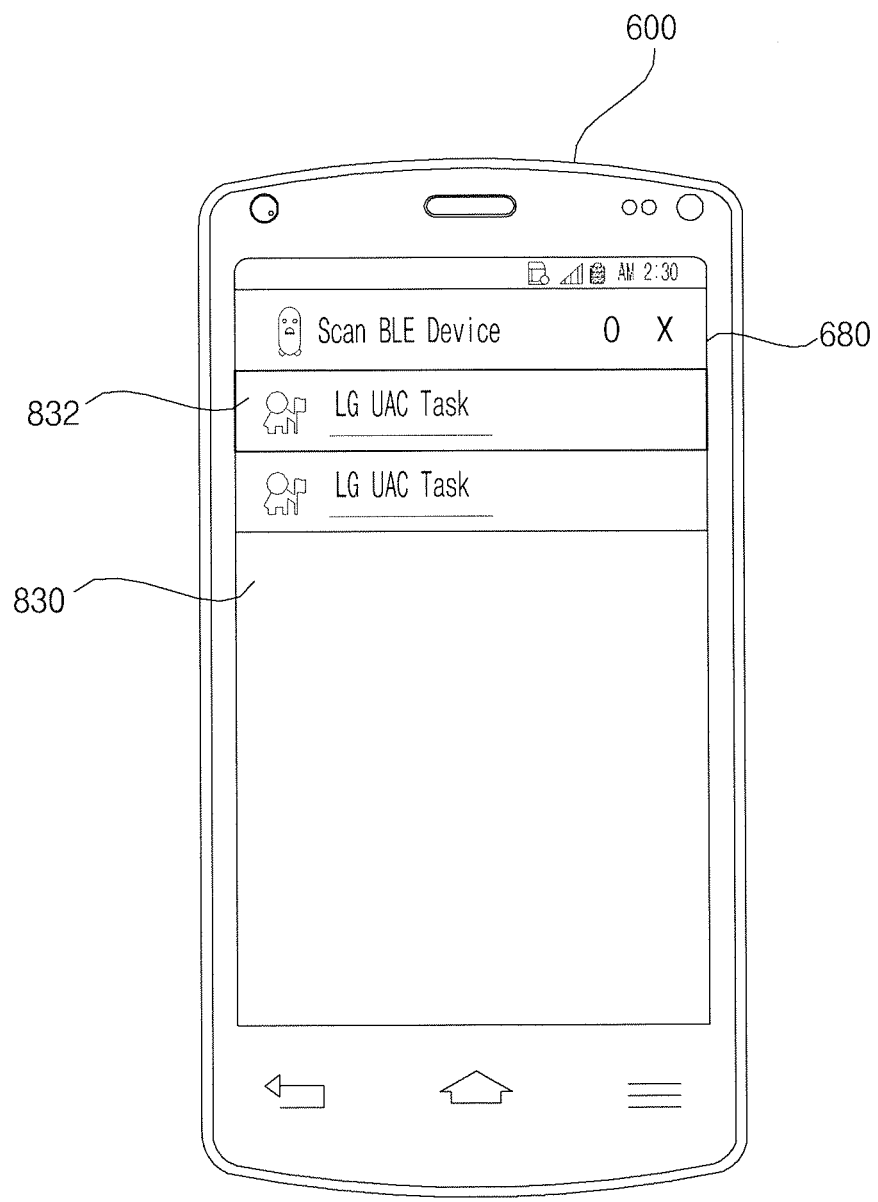

When the TV Select item 824 is selected, the controller 670 of the mobile terminal 600 may search for a TV around the mobile terminal 600. When the search is terminated, the controller 670 may perform a control operation to display a TV list screen window 830 including at least one TV item, as shown in FIG. 14D. In the illustrated example, two TV items are listed.

Figure 14E:
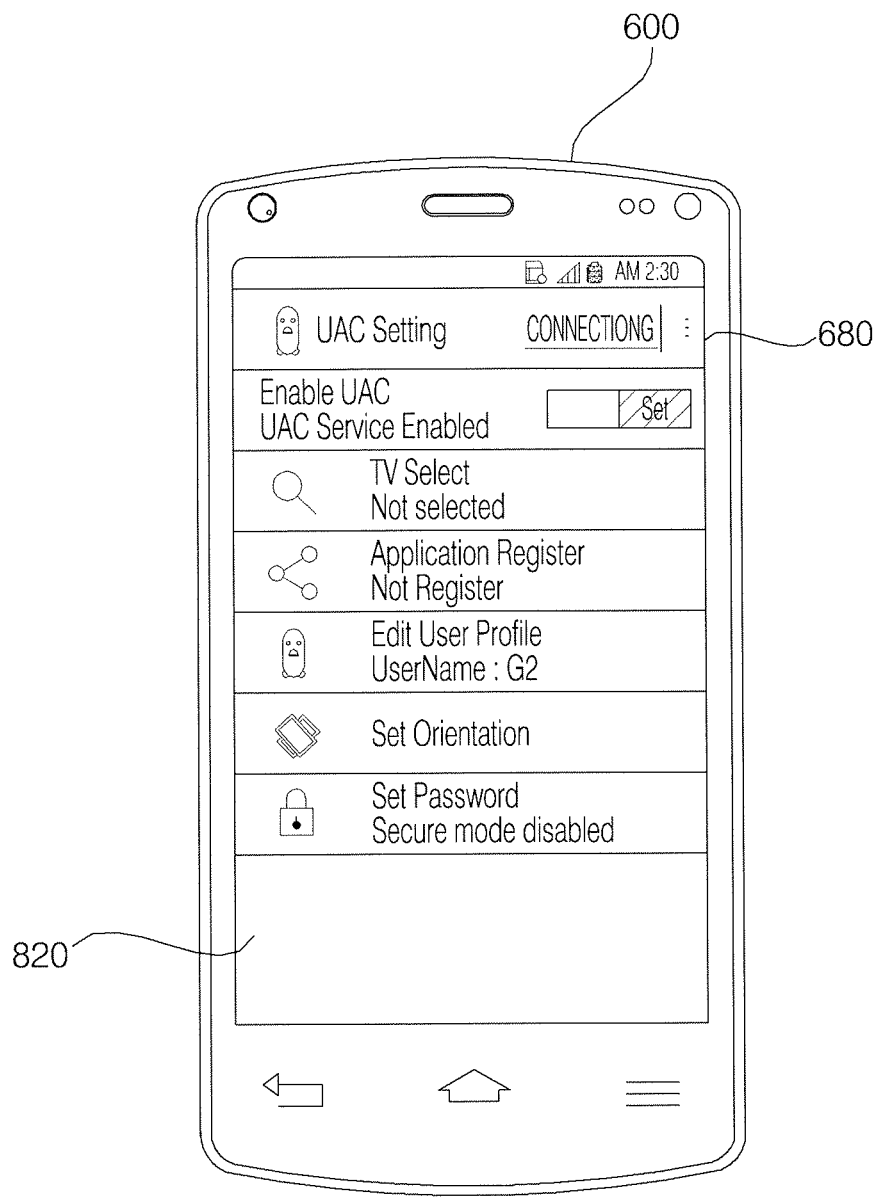

When a first TV item 832 of the two TV items is selected, the controller 670 of the mobile terminal 600 may complete setting for mirroring with the selected first TV item 832. After the setting is completed, the controller 670 of the mobile terminal 600 may perform a control operation to display the mirroring setting application screen window 820 again, as shown in FIG. 14E.

Figure 14F:
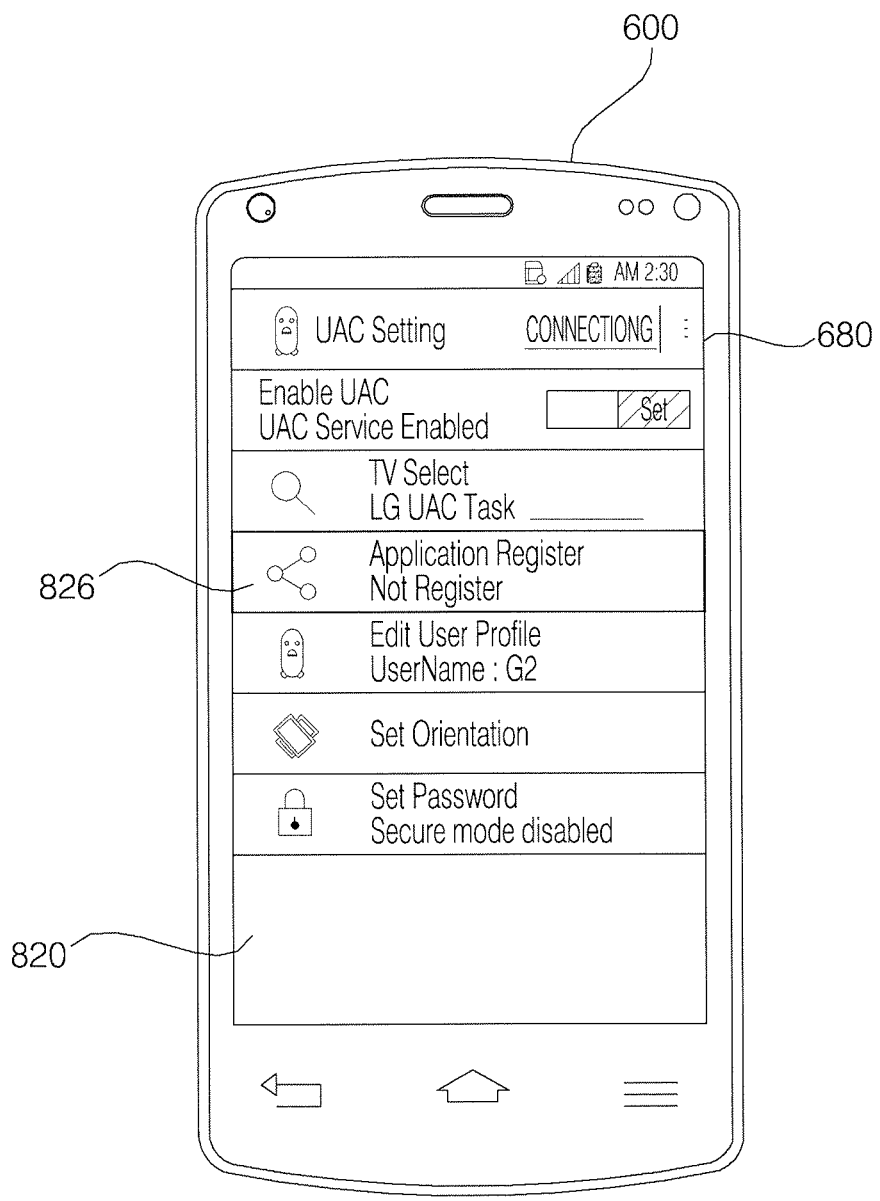
Figure 14G:
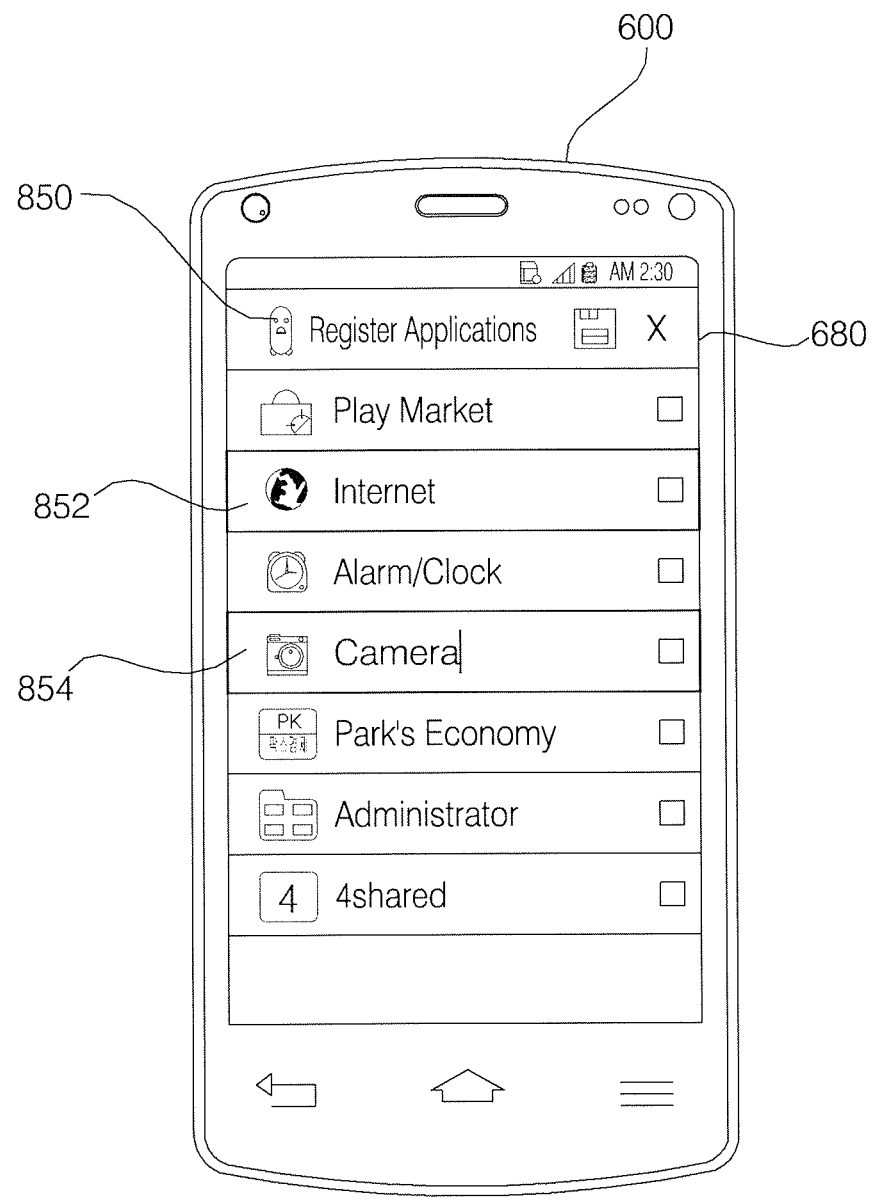

Next, when the Application Register item 826 is selected in the mirroring setting application screen window 820 displayed as shown in FIG. 14F, the controller 670 of the mobile terminal 600 may perform a control operation to display an application list 850 including application items installed in the mobile terminal 600, as shown in FIG. 14G.

Figure 14H:
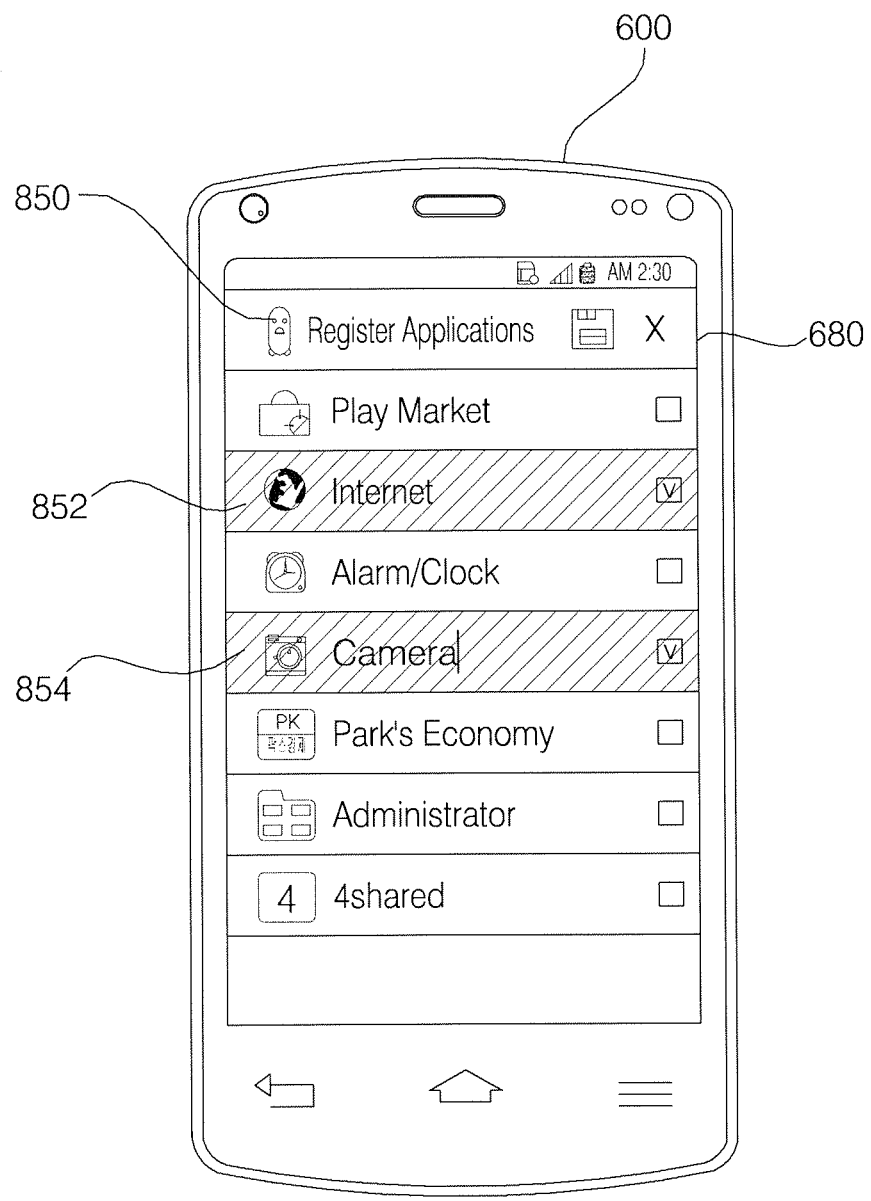

For example, when an Internet application item 852 and a camera application item 854 are selected from among two or more application items in the application list 850, the controller 670 of the mobile terminal 600 may perform a control operation to highlight the Internet application item 852 and the camera application item 854, as shown in FIG. 14H.

Figure 14I:
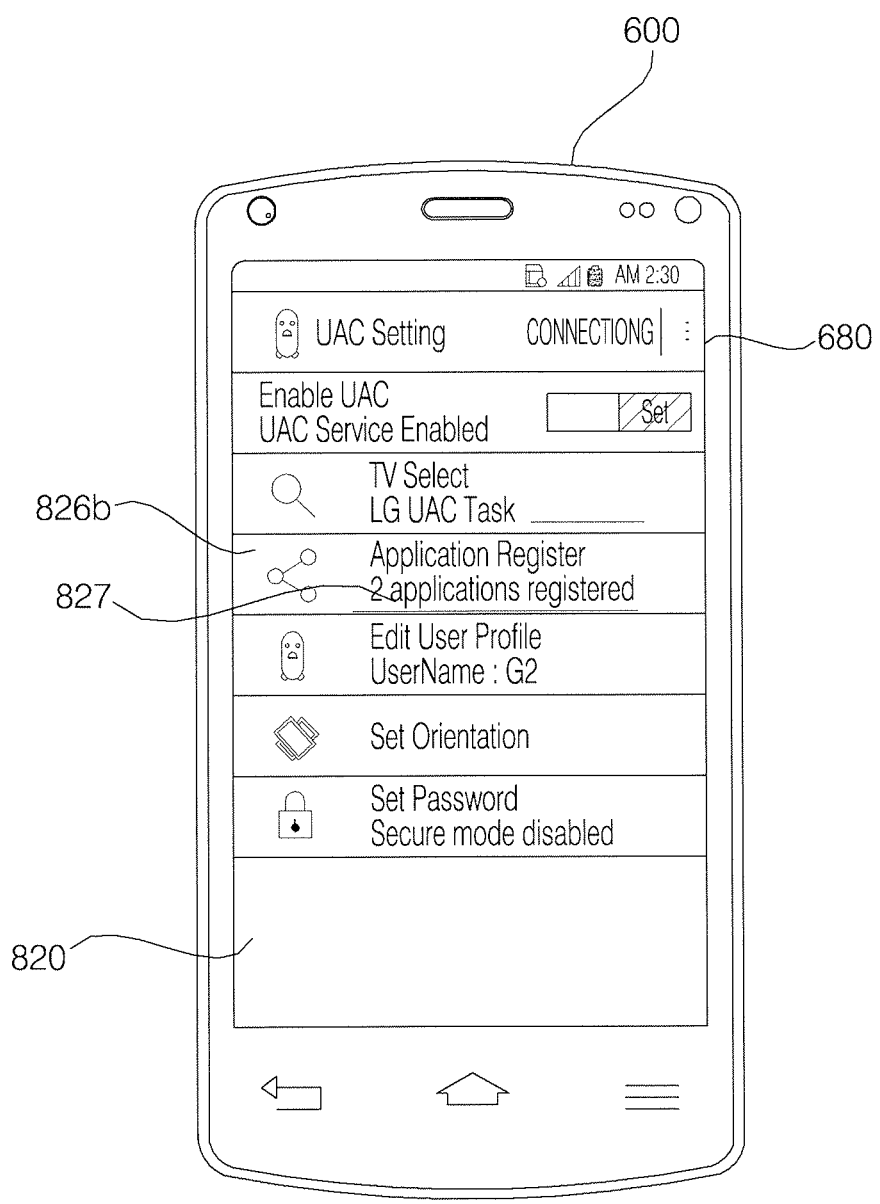

Then, when a Save item is selected, for example, the controller 670 of the mobile terminal 600 may perform a control operation to display the mirroring setting application screen window 820 again as shown in FIG. 14I. Herein, the Application Register item 826*b* may include information 827 related to the two selected applications.

Figure 14J:
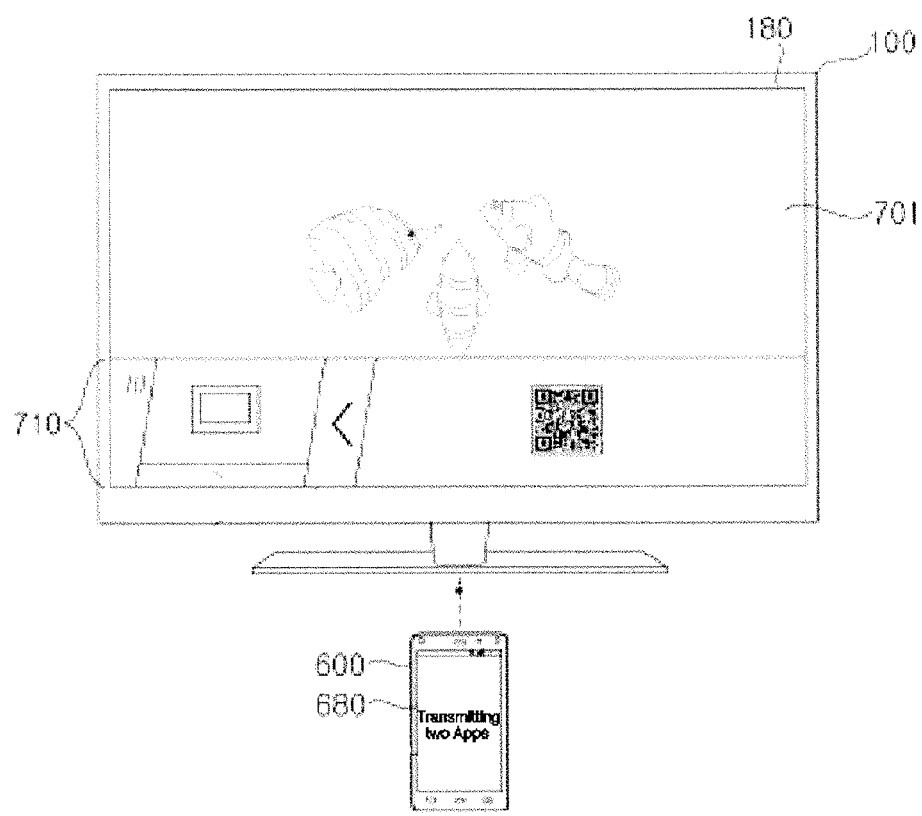

Next, the controller 670 of the mobile terminal 600 may perform a control operation to transmit information related to the two selected application items to the image display apparatus 100 as shown in FIG. 14J. In this instance, the controller 670 of the mobile terminal 600 may perform a control operation to display the transmitted information about the applications on the display 680.

The image display apparatus 100 may receive, through the interface unit 130 or 135, the information related to the two applications for which mirroring is to be performed.

Figure 14K:
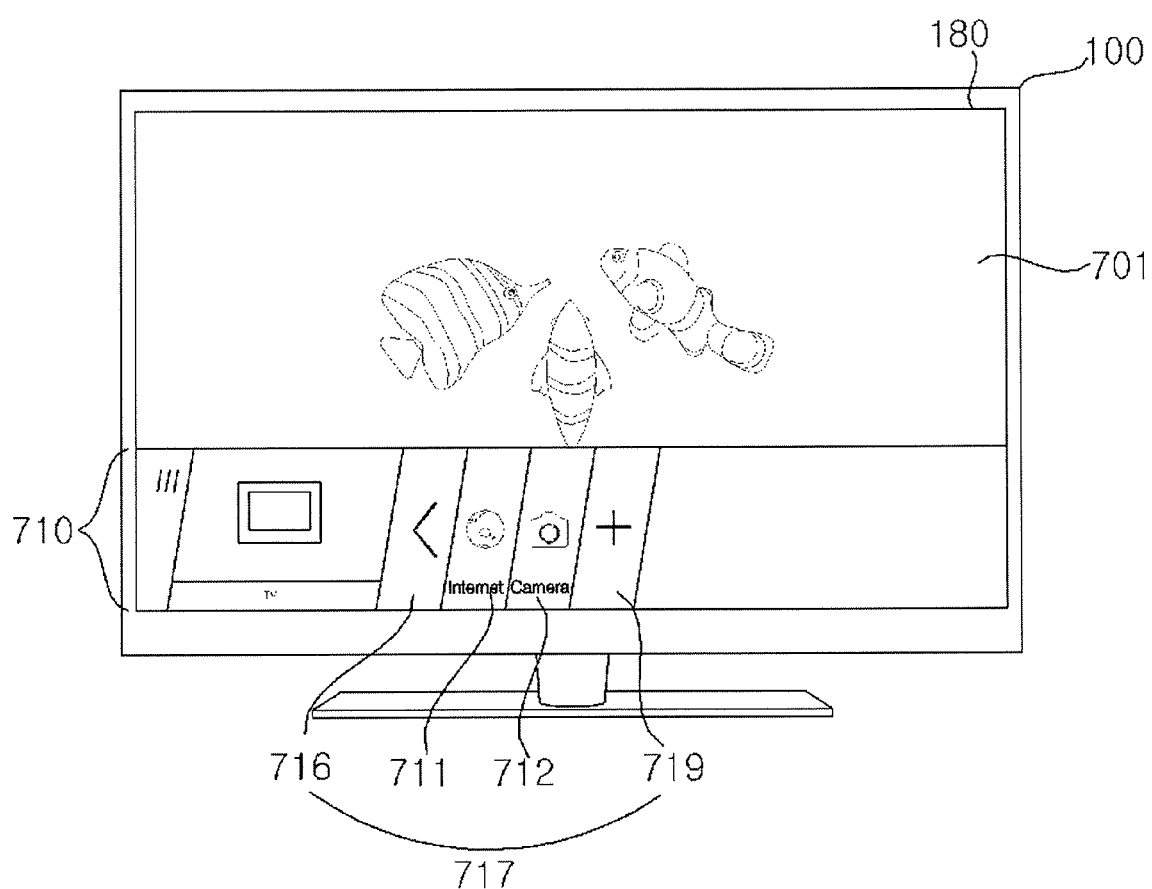

The controller 170 of the image display apparatus 100 may perform a control operation to install the received mirroring application items on the image display apparatus 100. In particular, the controller 170 of the image display apparatus 100 may perform a control operation to display the mirroring application items 711, 712, 716, 719 in the mirroring-related menu 717, as shown in FIG. 14K.

The controller 170 of the image display apparatus 100 may select a first mirroring application item 711 of the mirroring application items 711, 712, 716, 719 displayed in the mirroring-related menu 717.

For example, the controller 170 may select the first mirroring application item 711 using an arrow key and an OK key of the remote control device 200.

As another example, a pointer may be displayed based on a pointing signal included in an RF signal of the remote control device 200, and the first mirroring application item may be selected by the pointer.

When the first mirroring application item is selected from among the mirroring application items displayed in the mirroring-related menu 717, the controller 170 of the image display apparatus 100 may perform a control operation to transmit, to the mobile terminal 600, pairing information or information for request for execution of the first mirroring application, to receive a first mirroring application execution image from the mobile terminal 600 through the network interface unit 135 or 135, and to display the received first mirroring application execution image on the display 180.

Figure 15A:
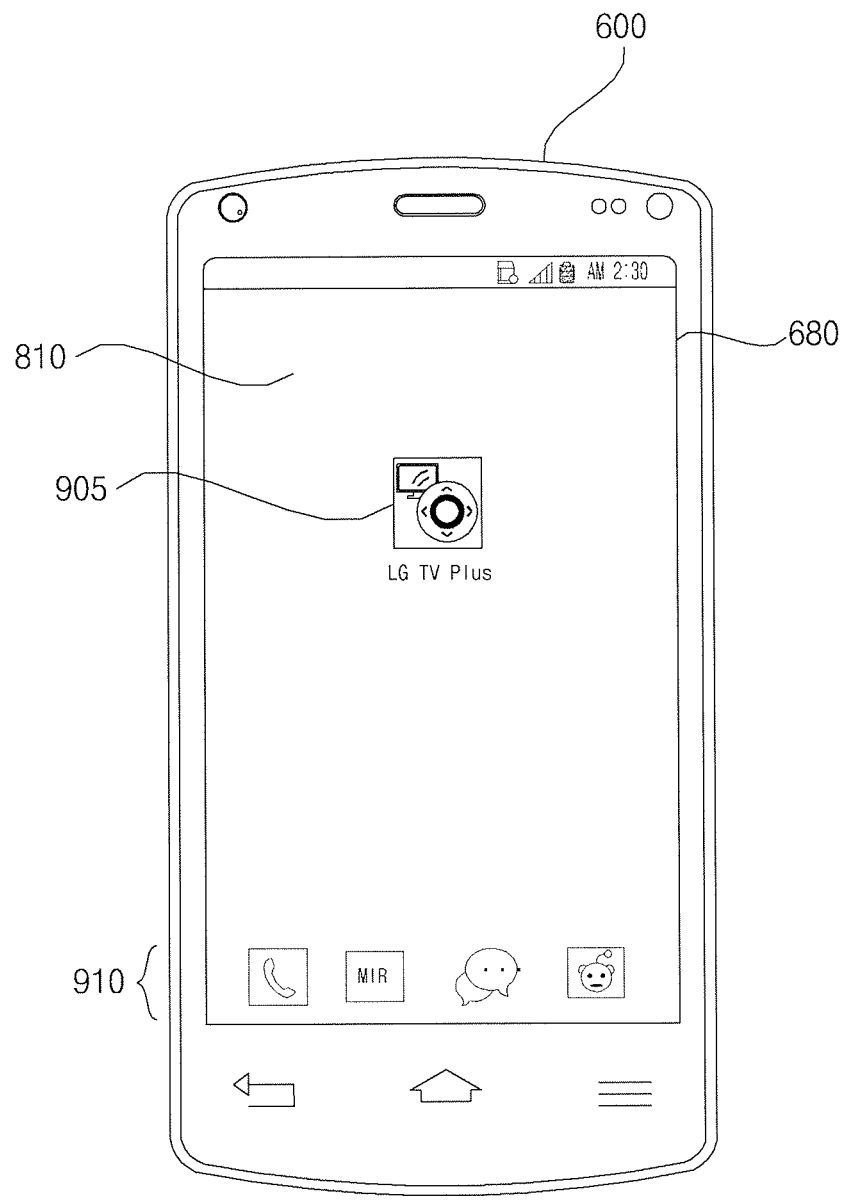
Figure 15B:
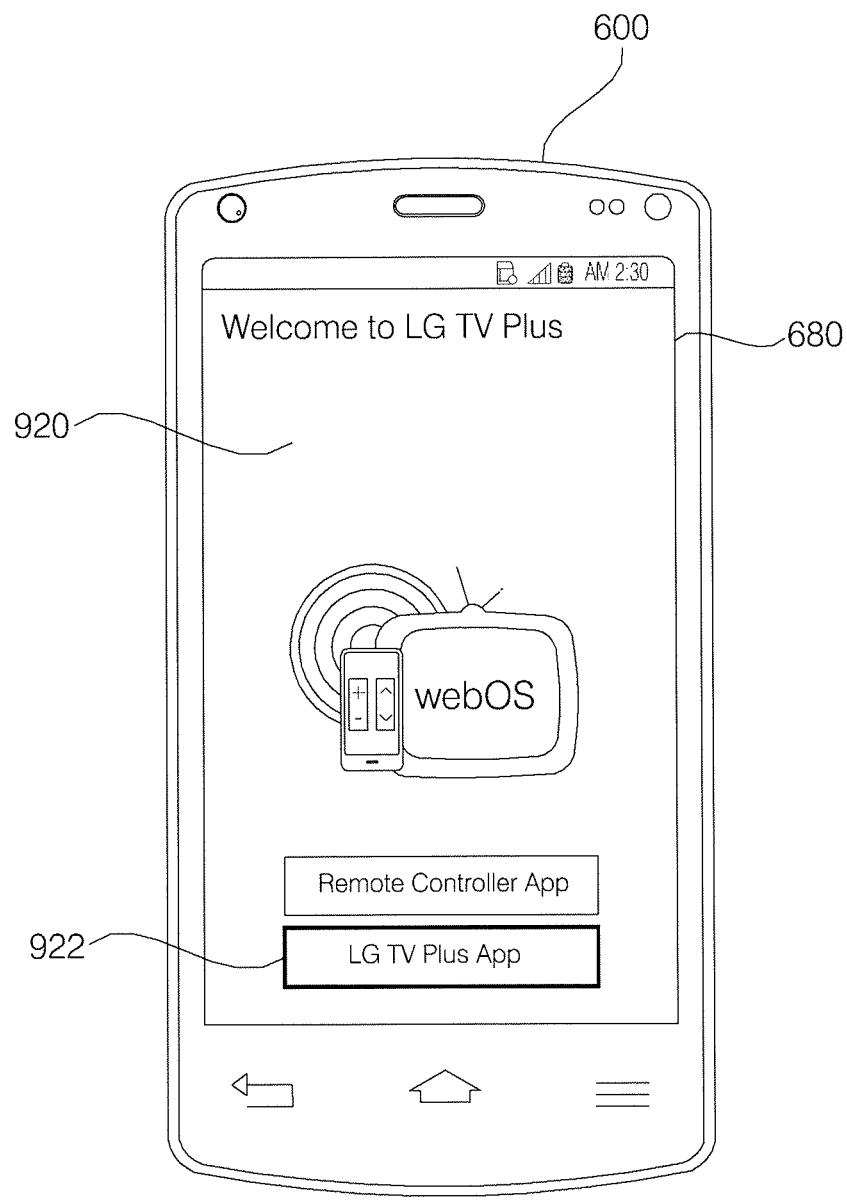
Figure 15C:
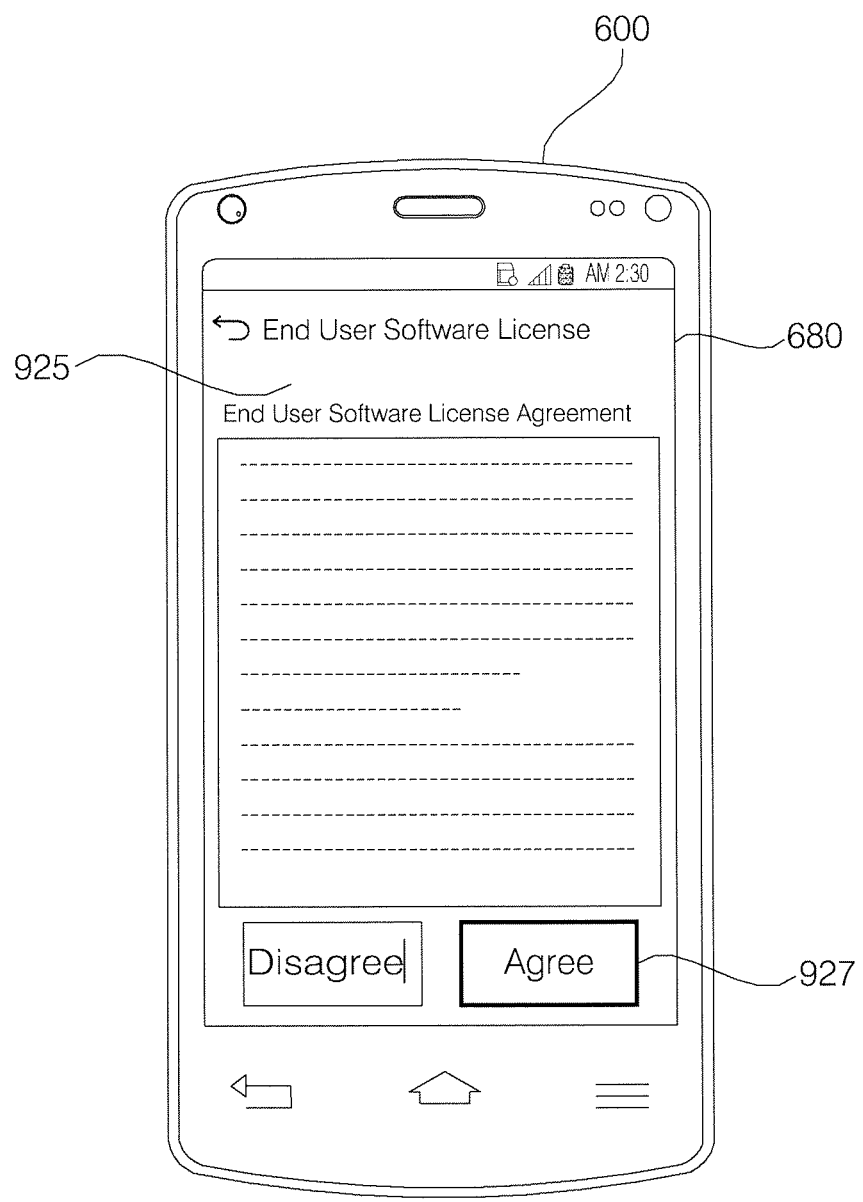
Figure 15D:
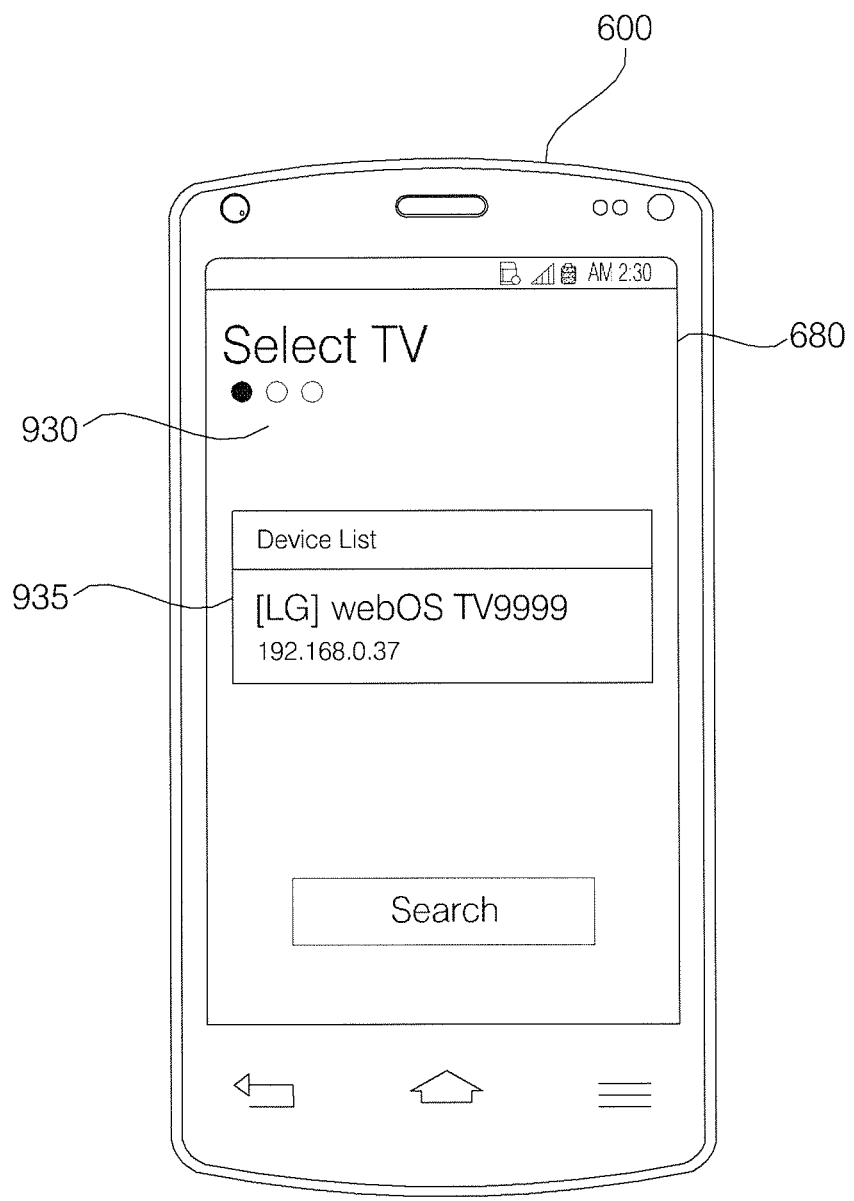
Figure 15E:
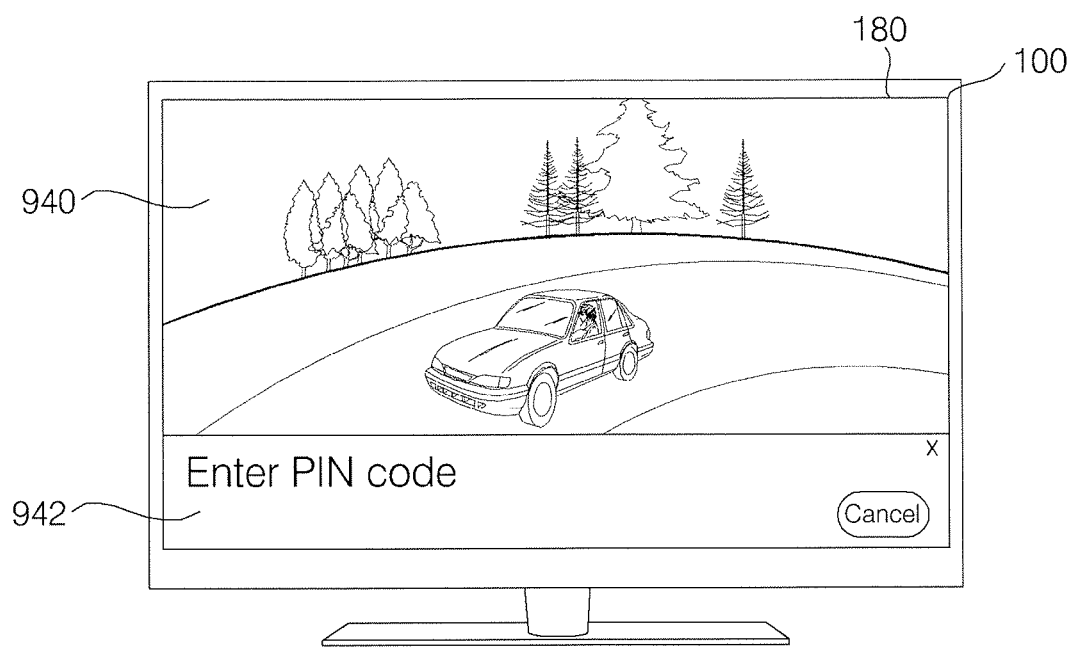
Figure 15F:
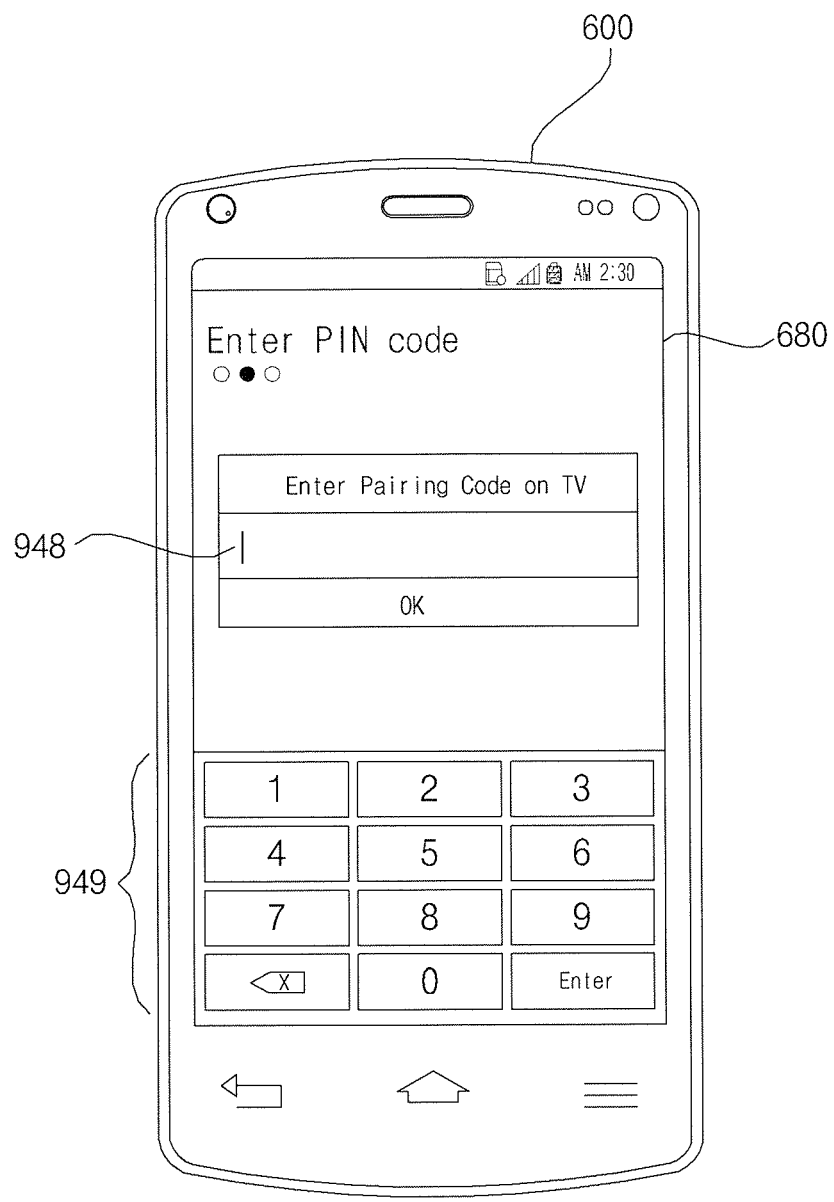
Figure 15G:
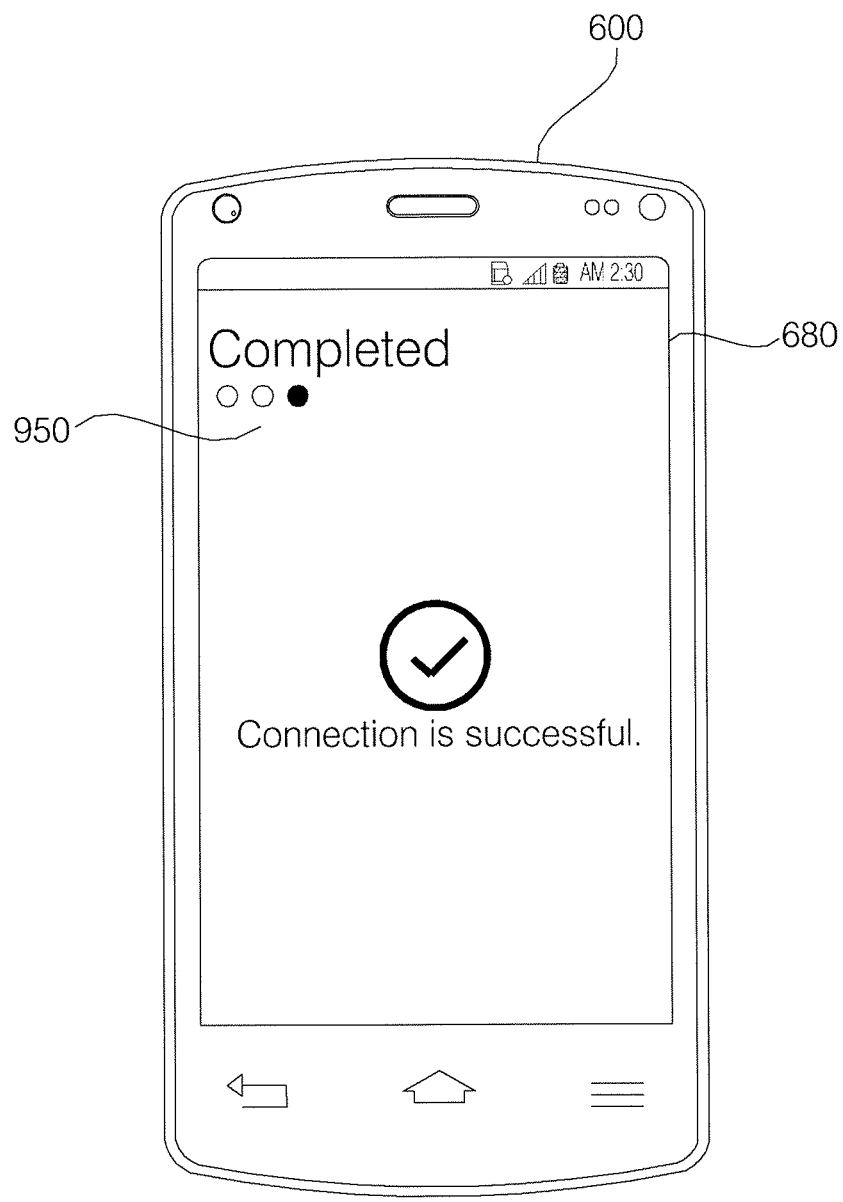
Figure 15H:
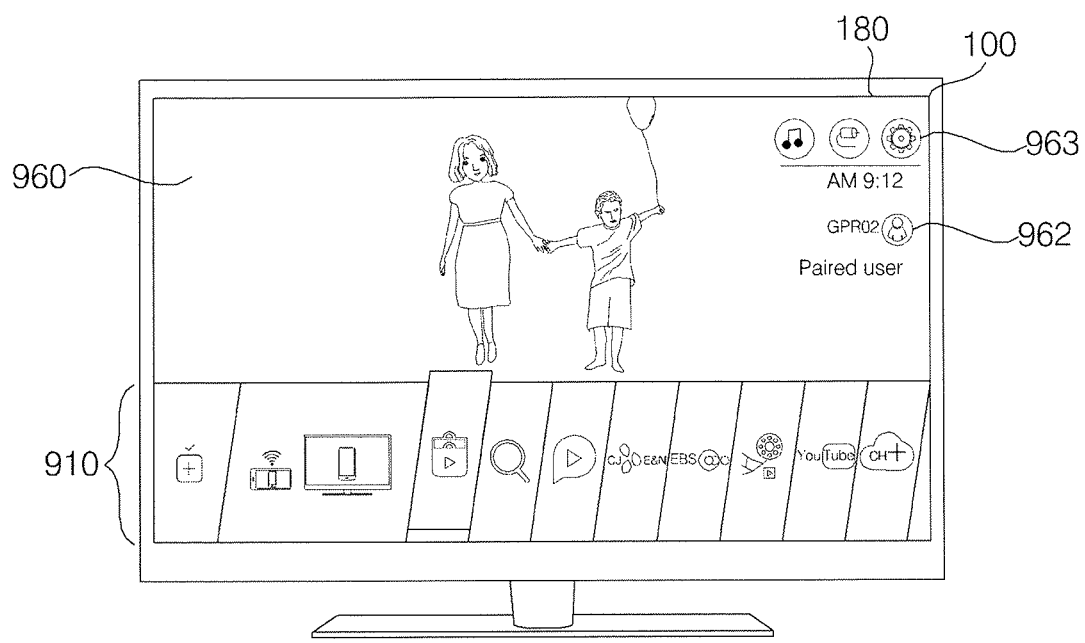
Figure 15I:
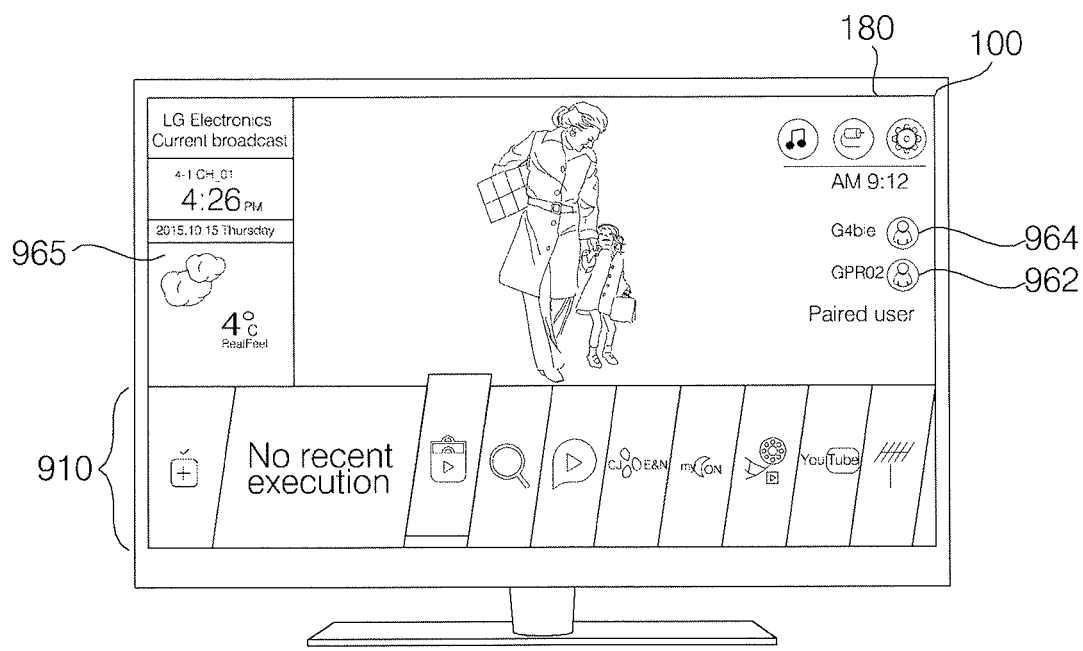
Figure 15J:
Figure 15K:
Figure 15L:
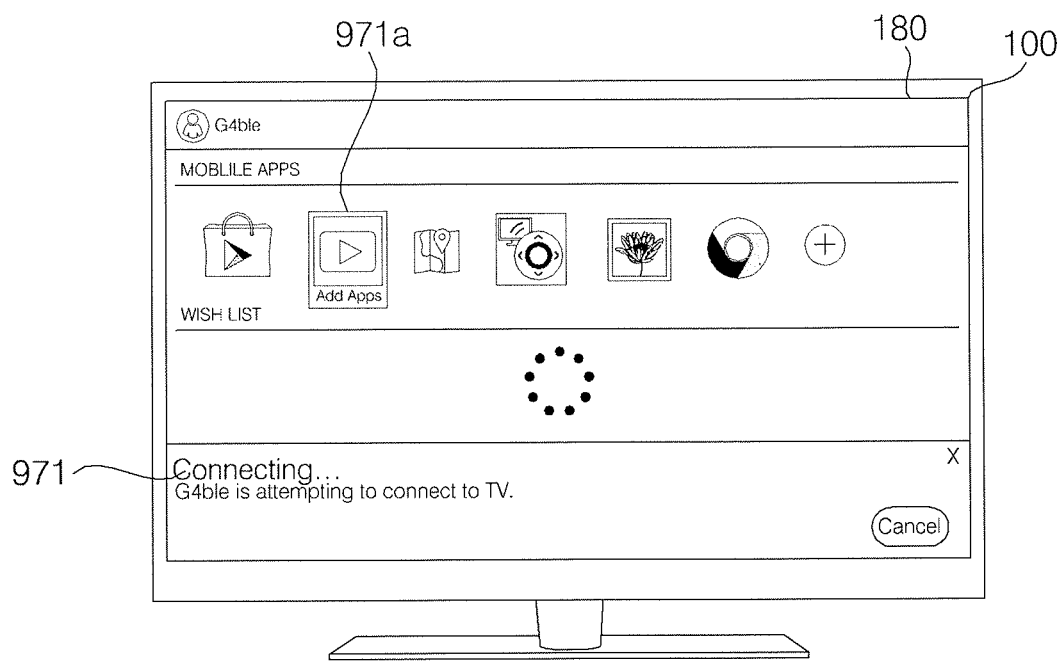
Figure 15M:
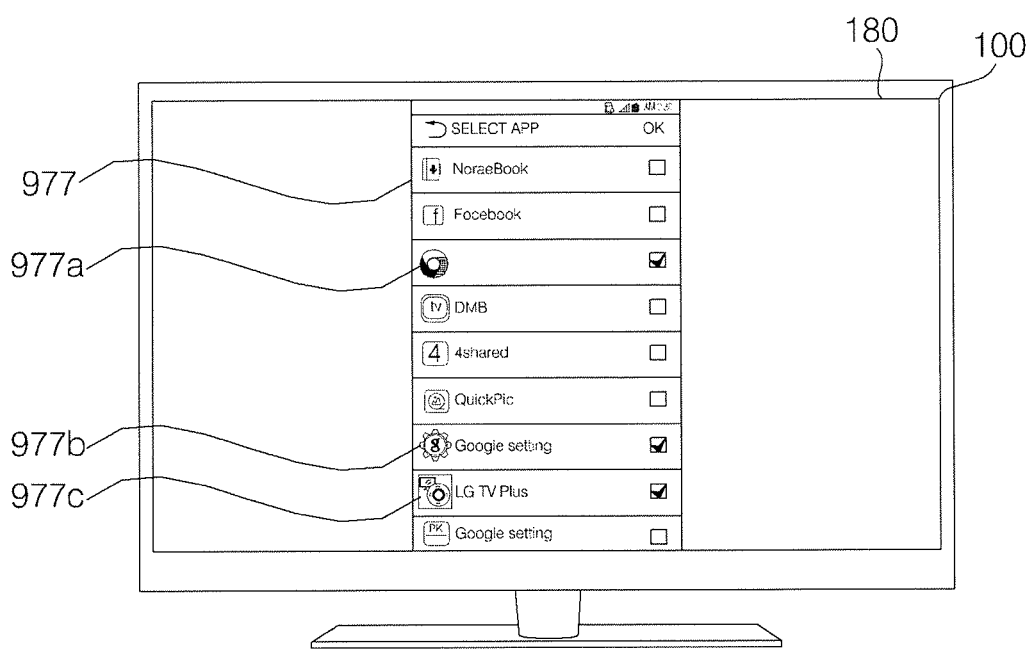
Figure 15N:
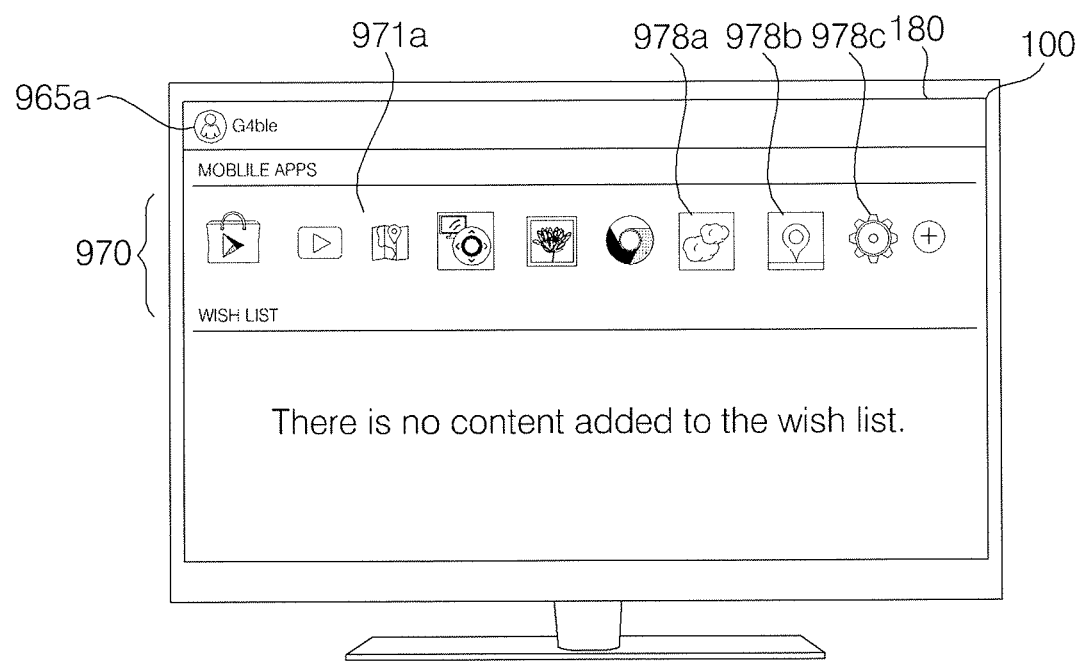
Figure 15O:
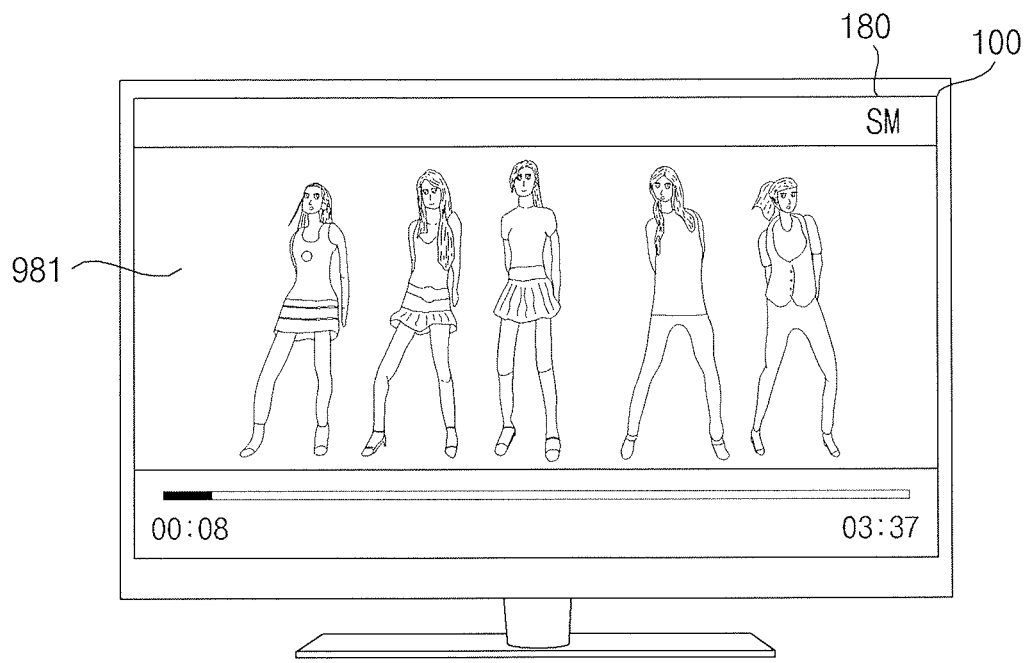
Figure 15P:
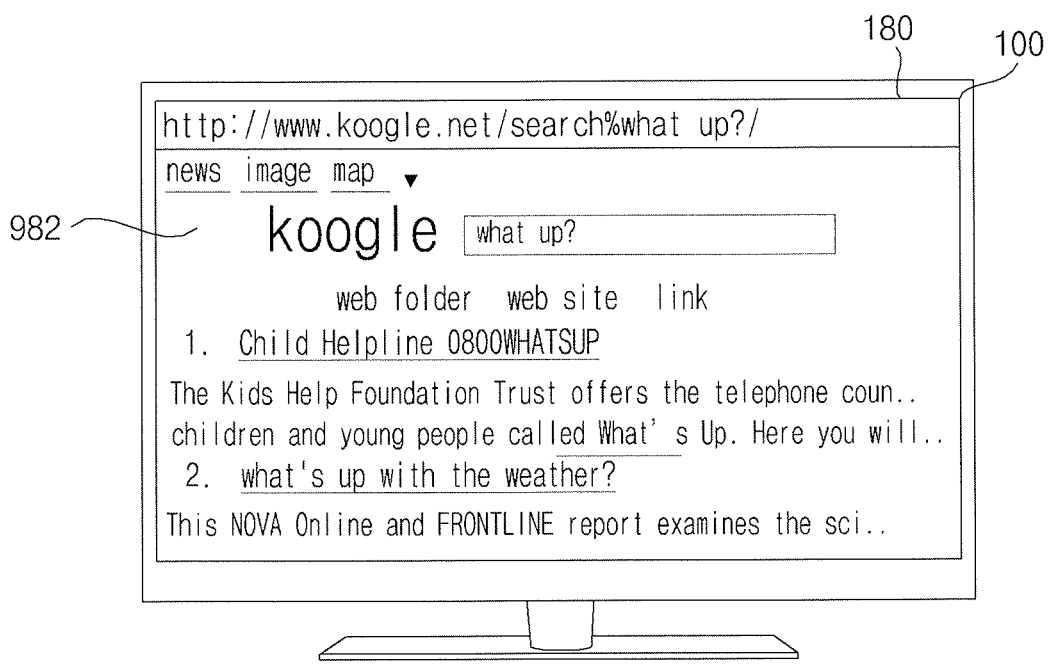
Figure 15Q:
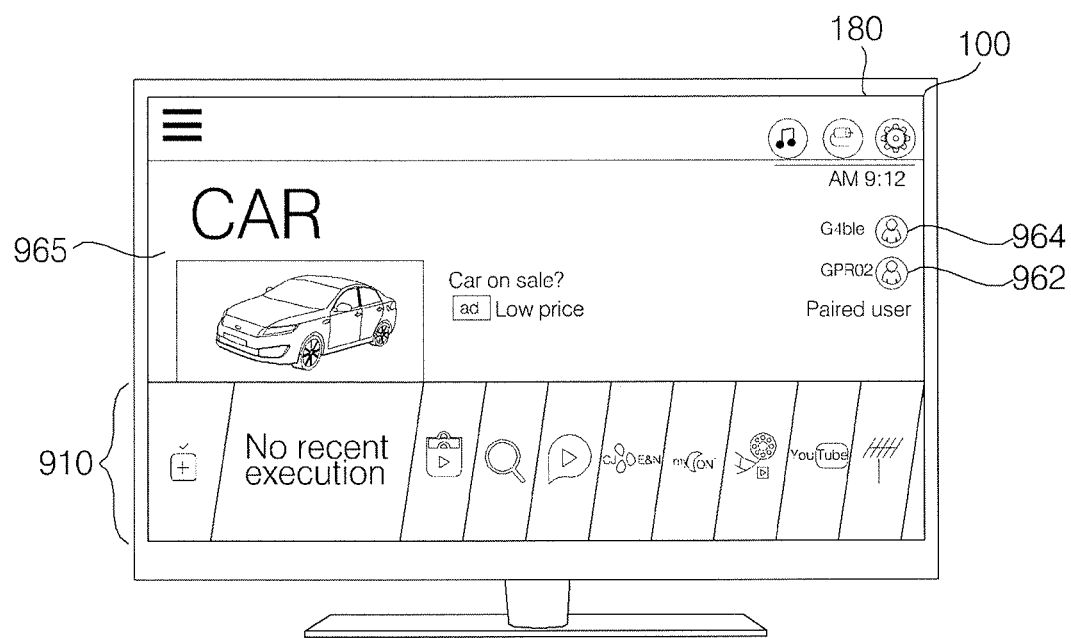
Figure 15R:
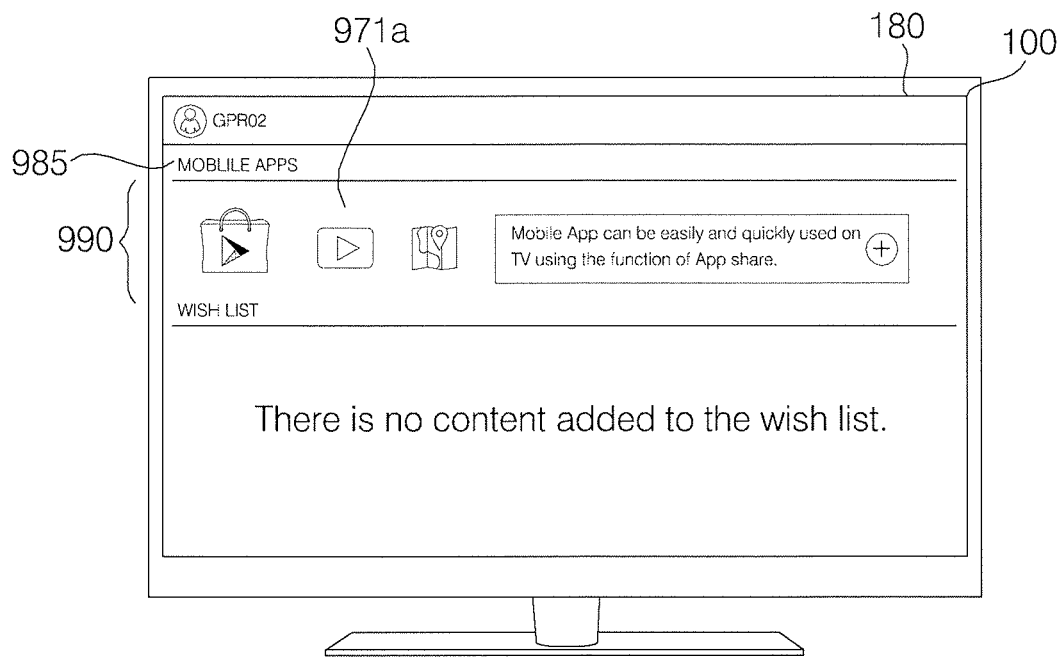
Figure 15S:
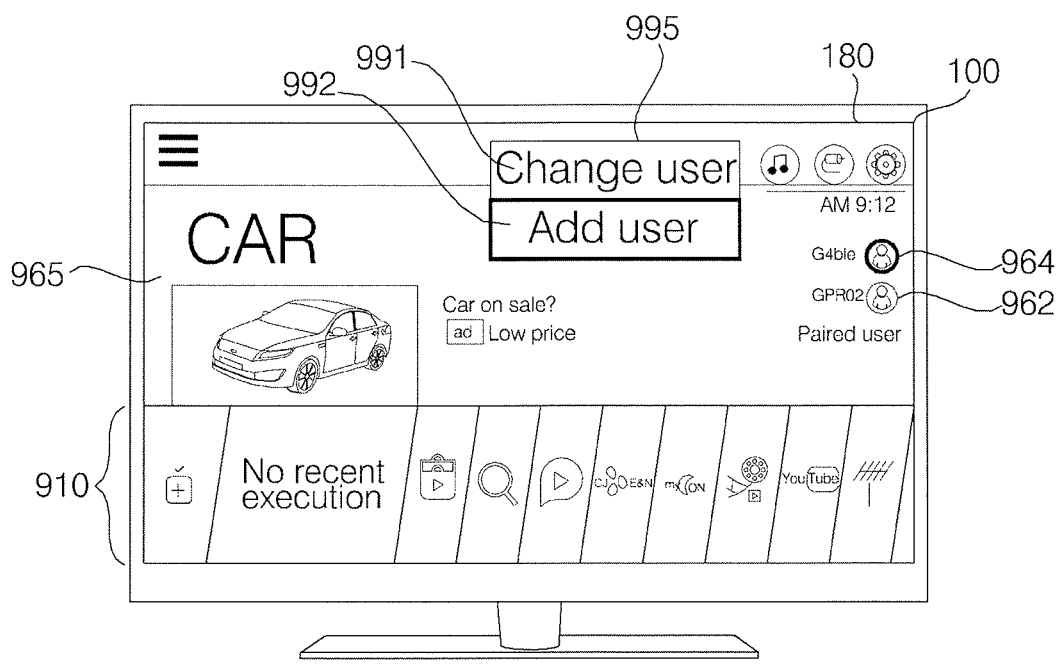
Figure 15T:
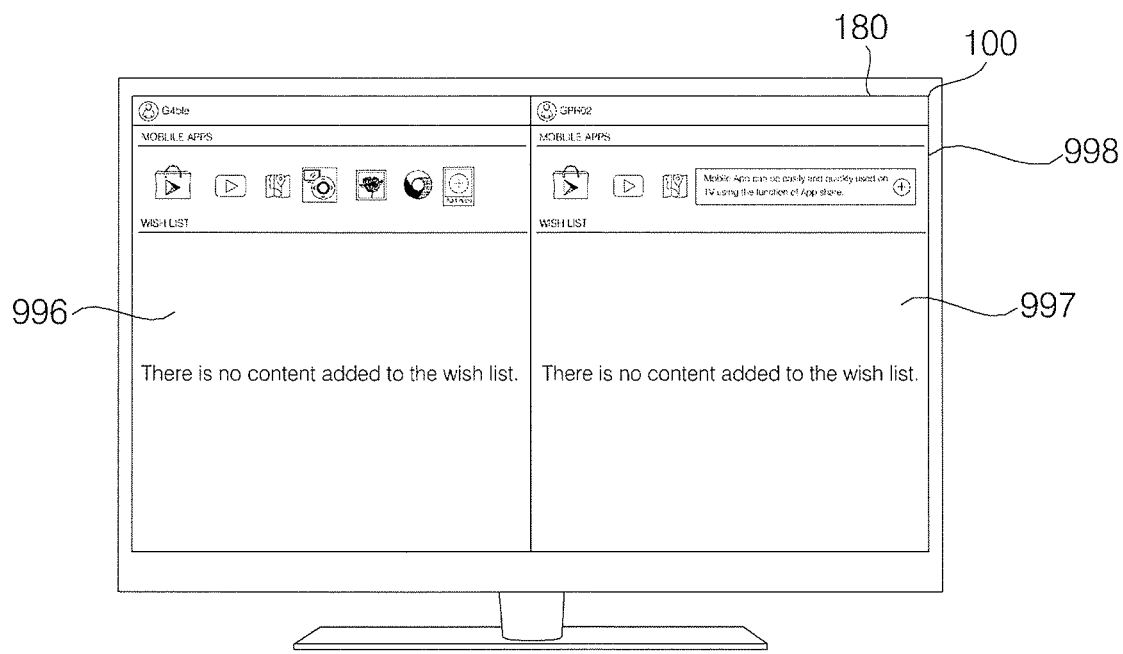

FIGS. 15A to 15T illustrate a method for executing a mirroring application different from the mirroring applications of FIGS. 14A to 14K.

FIG. 15A illustrates the idle screen window 810 or home screen window 810 of the mobile terminal 600. The idle screen window 810 or the home screen window 810 may be displayed on the display 680. Two or more application items 910 may be displayed at the lower end of the screen.

In FIG. 15A, a TV-related application item 905 is displayed in the home screen window 810 of the mobile terminal 600. The TV-related application may be referred to as an image display apparatus-related application.

The TV-related application item 905 may be installed as illustrated in FIGS. 13A to 13H. The TV-related application may conceptually include a TV remote control application and a mirroring application.

When the TV-related application item 905 is executed for the first time, the controller 670 of the mobile terminal 600 may perform a control operation to display the TV-related application item 920 as shown in FIG. 15B.

The TV-related application item may include a remote control item and a mirroring item 922.

When the mirroring item 922 is selected, the controller 670 of the mobile terminal 600 may perform a control operation to display a screen window 925 for installation of a mirroring application as shown in FIG. 15C.

When the "Agree" item 927 in the screen window 925 for installation of the mirroring application is selected, the controller 670 of the mobile terminal 600 may connect to the server 500 to request transmission of the mirroring application, download the mirroring application from the server 500 and install the same.

If an execution input is provided automatically or separately after installation of the mirroring application is completed, the controller 670 of the mobile terminal 600 may perform a control operation to display a mirroring application setting screen window 930 as shown in FIG. 15D.

In particular, the mirroring application setting screen window 930 may include a list 935 including an image display apparatus item for an image display apparatus which is in the same AP device or located around the mobile terminal 600.

While it is illustrated in the figure that only one image display apparatus item is displayed, it is also possible to display image display apparatus items for two or more image display apparatuses located around the mobile terminal.

When an image display apparatus item in the list 935 is selected, the controller 670 of the mobile terminal 600 may perform a control operation to transmit a relevant signal for the selected image display apparatus.

For example, the controller 670 of the mobile terminal 600 may perform a control operation to transmit a signal for display of code information related to the mirroring application.

The controller 170 of the image display apparatus 100 may receive, through the network interface unit 135, a signal for display of the code information related to the mirroring application, and perform a control operation to display the code information 942 on the display 180.

The displayed code information may be a random code generated by the controller 170 of the image display apparatus 100.

In this instance, the controller 170 of the image display apparatus 100 may perform a control operation to display the code information 942 in addition to the displayed image 940, as shown in FIG. 15E.

When an image display apparatus item in the list 935 is selected, the controller 670 of the mobile terminal 600 may perform a control operation to display, on the display 680 of the mobile terminal 600, an input window 948 for the code information displayed on the image display apparatus and a keyboard 949, as shown in FIG. 15F.

If a code corresponding to the code information displayed on the image display apparatus is input through the keyboard 949, the controller 670 of the mobile terminal 600 may perform a control operation to transmit the code information to the image display apparatus 100. Then, the controller 670 of the mobile terminal 600 may receive the authentication complete information from the image display apparatus 100.

After authentication is completed, the controller 670 of the mobile terminal 600 may perform a control operation to display an authentication complete screen window 950, as shown in FIG. 15G.

Through the steps of FIG. 15A to 15G, setting for mirroring between the mobile terminal 600 and the image display apparatus 100 may be completed.

When setting for mirroring between the mobile terminal 600 and the image display apparatus 100 is completed in the mobile terminal 600 through the steps of FIG. 15A to 15G, information related to a server connected with the mobile terminal 600 may be transmitted to the image display apparatus 100, and thus a mirroring application may be received by and installed on the image display apparatus 100.

Alternatively, the steps of FIG. 15A to 15G may be performed in the mobile terminal 600 with the mirroring application pre-installed on the image display apparatus 100.

Once setting for mirroring between the mobile terminal 600 and the image display apparatus 100 is completed through the steps of FIG. 15A to 15G, the mobile terminal 600 and the image display apparatus 100 will remain connected to each other.

When the mobile terminal 600 and the image display apparatus 100 are wirelessly connected to each other, the controller 170 of the image display apparatus 100 may perform a control operation to display an object 962 indicating the paired mobile terminal on the display 180.

In particular, the controller 170 of the image display apparatus 100 may perform a control operation to display the object 962 indicating the paired mobile terminal on the displayed image 960. Thereby, while viewing the image 960 of the image display apparatus 100, the user of the mobile terminal or another user may recognize that the mobile terminal is paired and connected with the image display apparatus.

The object 962 indicating the paired mobile terminal may include name information and image information. The image information may be edited through user selection of the paired mobile terminal. The name information may also be edited through user selection of the paired mobile terminal.

FIG. 15H illustrates display of an application list 910 and a setting object 963 in addition to the image 960 and the object 962 indicating the paired mobile terminal.

I Where two or more mobile terminals is paired and connected with the image display apparatus, the controller 170 of the image display apparatus 100 may perform a control operation to display objects 962 and 964 indicating the two or more mobile terminals as shown in FIG. 15I.

FIG. 15I illustrates an object 962 indicating the paired mobile terminal and a second object 964 indicating a second paired mobile terminal on an image 965.

If the number of displayed objects is greater than an allowed number of objects, the controller 170 of the display apparatus 100 may perform a control operation to delete objects from the oldest object and display objects corresponding to the most recently connected mobile terminals.

In FIG. 15H or 15I, when the object 962 indicating a paired mobile terminal is selected, the controller 170 of the display apparatus 100 may perform a control operation to display an application list 970 and a wish list 975 related to the paired mobile terminal, as shown in FIG. 15J.

The application list 970 related to the paired mobile terminal may include an application item which can be subjected to mirroring between the mobile terminal 600 and the image display apparatus 100 and an Add item 966.

In the figure, an App Store item, a moving image playback item, a map item, an image viewer item and an Internet item are provided as examples of application items which can be subjected to mirroring.

If the Add item 966 is selected in the application list 970 related to the paired mobile terminal as shown in FIG. 15K, the controller 170 of the image display apparatus 100 may perform a control operation to display a list 977 of applications to be added as shown in FIG. 15I.

The list 977 of applications to be added may be a mirrored image identical to the image displayed on the mobile terminal 600.

That is, when the Add item 966 is selected in the application list 970 related to the paired mobile terminal as shown in FIG. 15K, the controller 170 of the image display apparatus 100 may transmit an application list execution request to the mobile terminal 600. Then, the controller 170 of the image display apparatus 100 may perform a control operation to receive and display a list of applications which are being executed on the mobile terminal 600.

When predetermined items 977a, 977b and 977c are selected, by, for example, the remote control device 200, in the list 977 of applications to be added which is displayed in FIG. 15M, the controller 170 of the image display apparatus 100 may transmit information related to the selected items to the mobile terminal 600, receive applications related to the selected items from the mobile terminal 600 or the server 500, and install the same.

Thereby, the controller 170 of the image display apparatus 100 may perform a control operation to display a new application list 970 including the added application items 978a, 978b and 978c, as shown in FIG. 15N.

When a moving image playback item 971a is selected in the application list 970 as shown in FIG. 15L, the controller 170 of the image display apparatus 100 may perforin a control operation to display an object 971 indicating that connection to the mobile terminal is being executed, and attempt to connect to the mobile terminal 600.

That is, the controller 170 of the image display apparatus 100 may transmit, to the mobile terminal 600, an application execution request related to the moving image playback item. Then, when the application related to the moving image playback item of the mobile terminal 600 is executed, the controller 170 of the image display apparatus 100 may perform a control operation to implement mirroring.

Then, when mirroring connection is completed, the controller 170 of the image display apparatus 100 may perform a control operation to display, on the display 180, a screen window 981 of a moving image playback application which is being executed in the mobile terminal 600, as shown in FIG. 15O.

When the Internet item of FIG. 15N is selected, the controller 170 of the image display apparatus 100 may perform a control operation to display, on the display 180, an Internet screen window 982 displayed on the mobile terminal 600, as shown in FIG. 15P.

When the second object 964 indicating the second paired mobile terminal is selected with the object 962 and the second object 964 displayed as shown in FIG. 15Q, the controller 170 of the image display apparatus 100 may perform a control operation to display an application list 990 related to the second paired mobile terminal as shown in FIG. 15R.

Although FIGS. 15Q and 15R illustrate change of users, addition of a user may also be implemented using a screen division technique.

When the second object 964 indicating the second paired mobile terminal is selected by the back key after the controller 170 of the image display apparatus 100 displays the application list 970 related to the paired mobile terminal according to selection of the object 962 indicating the paired mobile terminal through the steps of FIGS. 15I and 15J, the controller 170 of the image display apparatus 100 may perform a control operation to display a Change User object 991 and an Add User object 992, as shown in FIG. 15S.

If the Change User object 991 is selected, the controller 170 of the image display apparatus 100 may perform a control operation to display an application list 990 related to the second paired mobile terminal as shown in FIG. 15R.

When the Add User object 992 is selected, the controller 170 of the image display apparatus 100 may perform a control operation to display an application list 996 related to the paired mobile terminal and an application list 997 related to the second paired mobile terminal on the display 180, as shown in FIG. 15T.

That is, as shown in FIG. 15T, the screen may be divided to display the application list 996 related to the paired mobile terminal and the application list 997 related to the second paired mobile terminal together on the display 180. Thereby, mirroring may be implemented using two or more mobile terminals.

The name information and image information about the object indicating the paired mobile terminal may be edited through the mobile terminal 600.

FIG. 16 is a flowchart illustrating operation of an image display apparatus and mobile terminal according to another embodiment of the present invention, and FIGS. 17A to 17H illustrate the operation method of FIG. 16.

Referring to FIG. 16, after being turned on, the controller 170 of the image display apparatus 100 may periodically transmit a pairing signal.

If the mobile terminal 600 approaches the image display apparatus 100 within a predetermined distance, the mobile terminal 600 may receive the pairing signal (S1503). Then, when the mobile terminal 600 is within the predetermined distance from the image display apparatus 100, the mobile terminal 600 may transmit a pairing response signal in response to reception of the pairing signal.

Thereby, the image display apparatus 100 may receive the pairing response signal and perform pairing based on the pairing response signal (S1505).

The pairing signal may include device information about the image display apparatus 100, network information, and frequency channel information for wireless communication.

The pairing response signal may include device information about the mobile terminal 600, network information, and frequency channel information for wireless communication.

The controller 170 of the image display apparatus 100 may perform a control operation to display a mirroring-related menu when pairing with the mobile terminal 600 is completed (S1510).

The mirroring-related menu may be the mirroring-related menu 717 as shown in FIG. 14K.

In addition, the mirroring-related menu may be an object indicating the paired mobile terminal as shown in FIG. 15H. Hereinafter, description will be given focusing on the object 962 indicating the paired mobile terminal.

FIG. 17A illustrates where the distance between the image display apparatus 100 in the mobile terminal 600 is Da at which pairing cannot be performed.

In this instance, the controller 170 of the image display apparatus 100 controls a menu related to the mobile terminal not to be displayed. In FIG. 17A, only the image 960 and the application list 910 are displayed.

FIG. 17B illustrates where the distance between the image display apparatus 100 and the mobile terminal 600 is Db at which pairing can be performed.

In this instance, the controller 170 of the image display apparatus 100 receives a pairing signal or a pairing response signal from the mobile terminal 600 as described above (S1503), and performs pairing based on the signal.

Figure 17C:
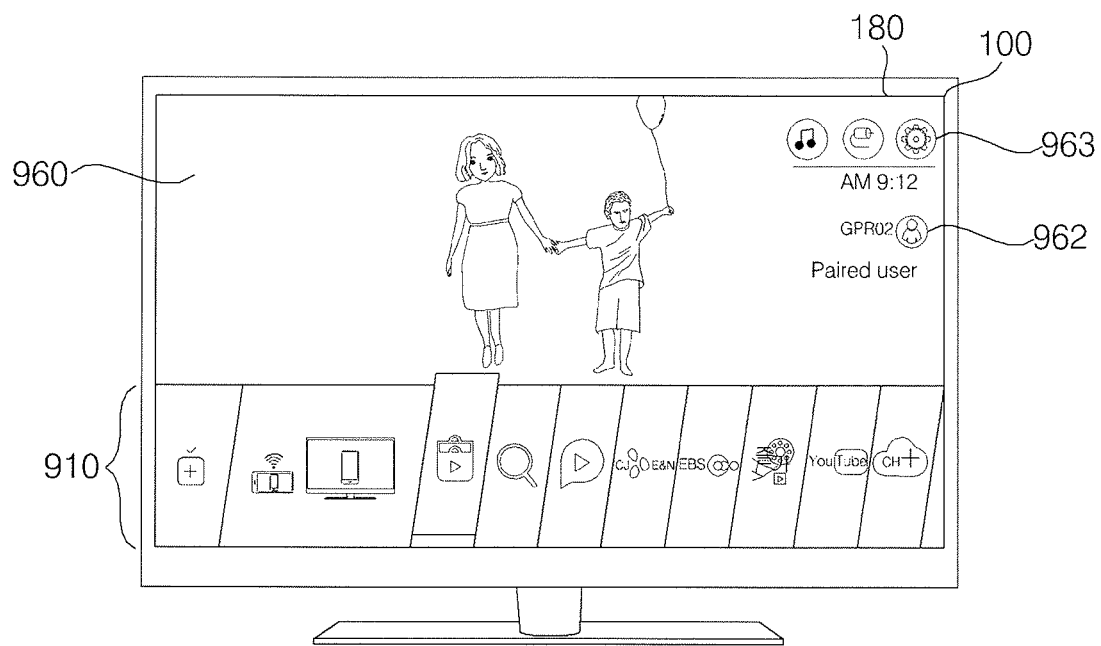

When pairing is completed, the controller 170 of the image display apparatus 100 may perform a control operation to display an object 962 indicating the paired mobile terminal in addition to the image 960 and the application list 910, as shown in FIG. 17C. Thereby, it may be recognized that connection is being performed as pairing with the mobile terminal is completed When a first user item is selected in the menu (S1520), namely when the object 962 indicating the paired mobile terminal is selected, the controller 170 of the image display apparatus 100 may perform a control operation to display an application list 970 related to the paired mobile terminal and a wish list 975 (S1525), as showing FIG. 17D.

Next, when a first application is selected in the application list 970 related to the paired mobile terminal (S1530), the controller 170 of the image display apparatus 100 may perform a control operation to transmit a request for transmission of a screen window related to the first application to the mobile terminal 600 (S1535).

Thereby, the controller 670 of the mobile terminal 600 may receive the request for transmission of a screen window related to the first application through a communication unit (S1540), and perform a control operation to execute and display the first application on the display 680 and to transmit the screen window of the first application to the image display apparatus 100 (S1545).

The controller 170 of the image display apparatus 100 may receive the first application screen window via the network interface unit (S1550), and perform a control operation to display the moved mirroring image on the display 180 (S1560).

Figure 17D:
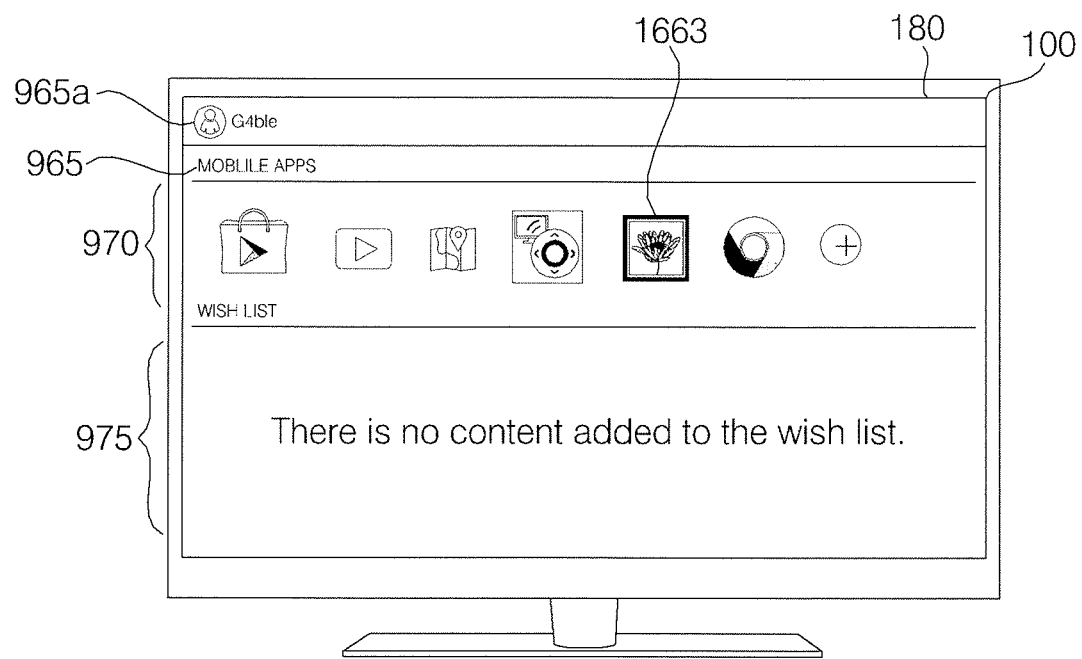

When the image viewer application is selected in the application list 970 related to the paired mobile terminal as shown in FIG. 17D, the controller 170 of the image display apparatus 100 may perform a control operation to receive the image of the image viewer application from the paired mobile terminal 600 and to display the image 701 of the image viewer application, as shown in FIG. 17E.

While it is illustrated in the figure that the image viewer application image 701 and the application list 710 are displayed together, the image viewer application image 701 may be displayed alone.

If another mobile terminal approaches the image display apparatus 100 within a predetermined distance with the paired mobile terminal 600 located within the predetermined distance, the controller 170 of the image display apparatus 100 may perform a control operation to implement additional pairing.

Figure 17F:
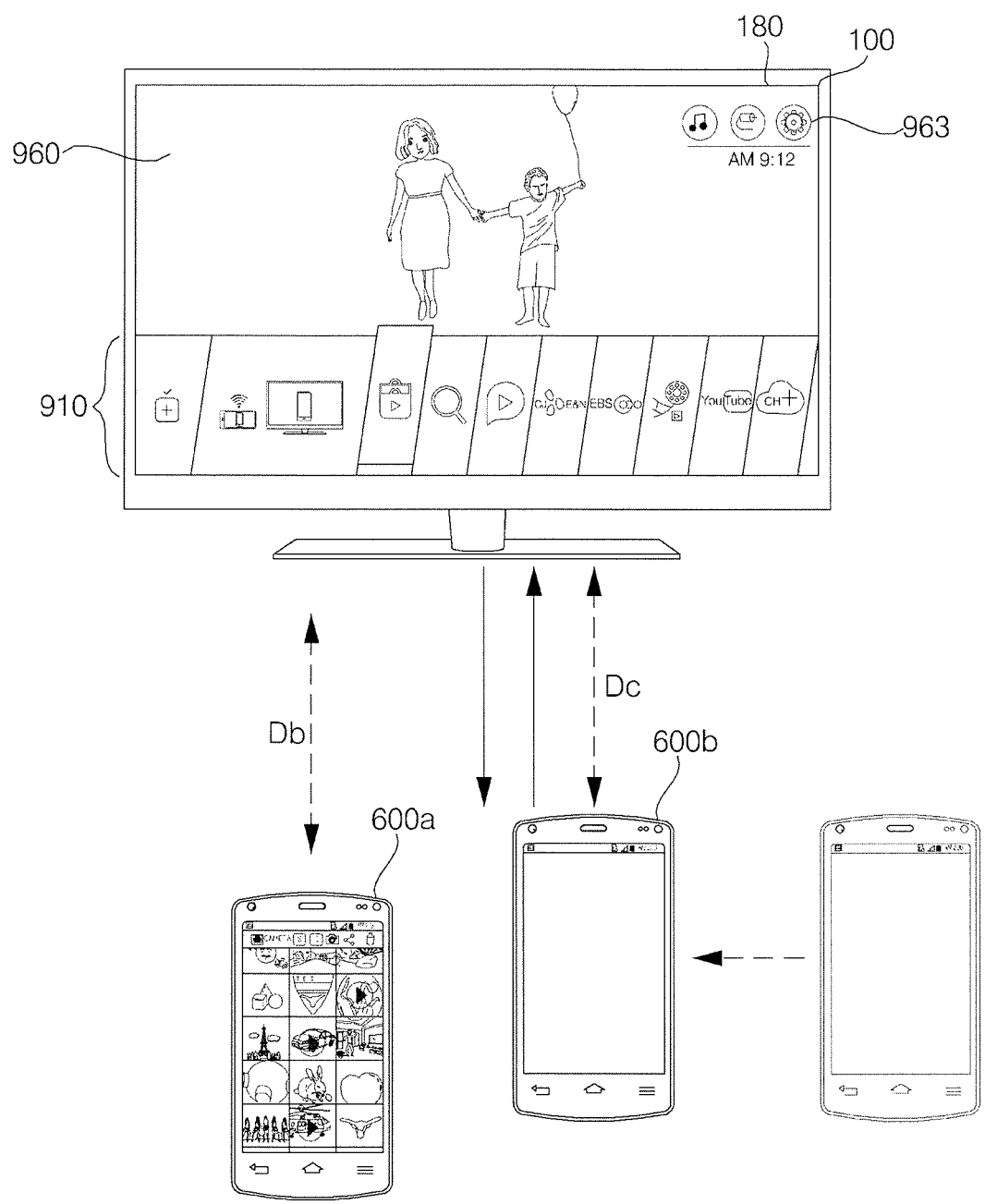

As shown in FIG. 17F, if a second mobile terminal 600b approaches the image display apparatus 100 within the predetermined distance and is located at distance Dc from the image display apparatus 100, the controller 170 of the image display apparatus 100 may perform a control operation to receive a pairing response signal from the second mobile terminal 600b and implement additional pairing.

Figure 17G:
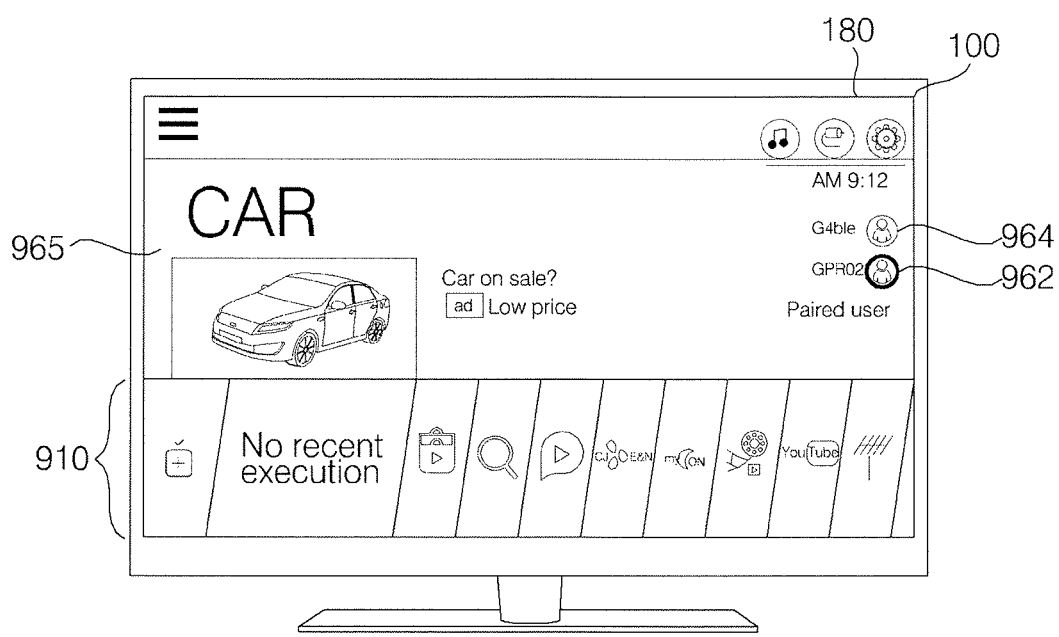

After the additional pairing is implemented, the controller 170 of the image display apparatus 100 may perform a control operation to display objects 962 and 964 indicating the two or more mobile terminals as shown in FIG. 17G.

FIG. 17G illustrates where the object 962 indicating the paired mobile terminal and a second object 964 indicating a second paired mobile terminal are displayed on an image 965.

Figure 17H:
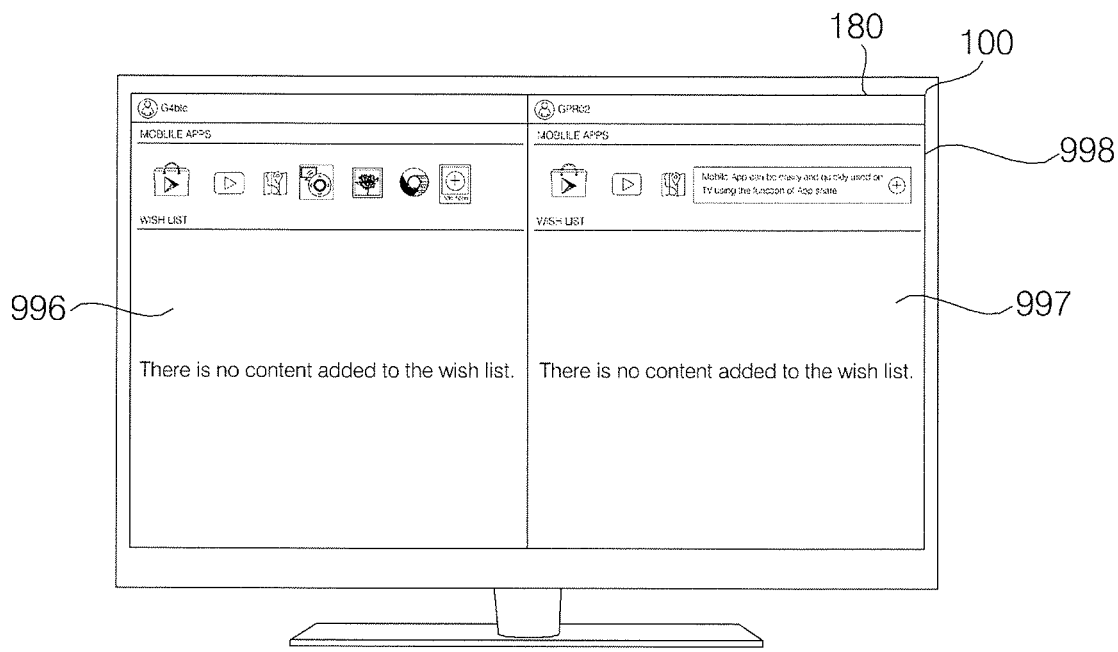

As shown in FIG. 17H, when the second object 964 indicating the second paired mobile terminal is selected between the objects 962 and 964, the controller 170 of the image display apparatus 100 may perform a control operation to display an application list 996 related to the paired mobile terminal and an application list 997 related to the second mobile terminal on the display 180 together.

Alternatively, the controller 170 of the image display apparatus 100 may perform a control operation to display only the application list related to the second paired mobile terminal.

An operation method for the image display apparatus or mobile terminal according to the present invention is implementable by code which can be read by the processor on a recording medium which can be read by a processor provided to autonomous driving apparatus or vehicle. The recording medium readable by the processor includes all kinds of recording devices for storing data which can be read by the processor. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner may be stored in the recording medium and executed.

As is apparent from the above description, according to an embodiment of the present invention, an image display apparatus includes a display, an interface unit to exchange data with a mobile terminal, and a controller to perform a control operation to display a mirroring image received from the mobile terminal and to perform a control operation to display additional information related to the mirroring image in a blank area other than the display area for display of the mirroring image. Thereby, in performing mirroring between the mobile terminal and the display apparatus, the mirroring image and various kinds of information may be viewed simultaneously.

In addition, the controller performs a control operation to display a pointer on the display based on a pointing signal of a remote control device, and if the pointer is located in the blank area when the mirroring image is displayed, the controller performs a control operation to display the additional information related to the mirroring image. Thereby, display of additional information based on the pointer is enabled. Accordingly, user convenience may be enhanced.

By displaying different information in the blank area according to movement of the pointer, various kinds of information may be provided to the user.

When additional information related to a mirroring image is displayed, the controller performs a control operation to move and display the mirroring image. Thereby, location of the mirroring image may be varied according to the amount of the additional information.

If the mirroring image is a home screen window or idle screen window of the mobile terminal, the controller performs a control operation to display at least one of an object corresponding to a camera manipulation button attached to a mobile terminal, an object corresponding to a power button, an object corresponding to a volume adjustment button and an object corresponding to a zooming adjustment button in the blank area. Thereby, remote control of the mobile terminal may be enabled.

If the mirroring image is the home screen window or idle screen window, the controller performs a control operation to display at least one of an object indicating a first connector for connection with an external device and an object indicating a second connector for connection with a detachable additional memory in the blank area. Thereby, external input to the mobile terminal may be easily viewed.

According to an embodiment of the present invention, an image display apparatus includes a display, an interface unit to exchange data with a mobile terminal, and a controller to perform a control operation to display a mirroring image received from the mobile terminal and to perform a control operation to display additional information related to the mirroring image in a display area for display of the mirroring image. Thereby, when mirroring is performed between the mobile terminal and the image display apparatus, the mirroring image and various kinds of information may be viewed simultaneously.

In addition, when an object indicating a paired mobile terminal is selected, a list of applications which can be subjected to mirroring is displayed. Thereby, mirroring with the mobile terminal may easily performed.

Further, when a mobile terminal approaches the image display apparatus within a predetermined distance allowing pairing, the image display apparatus performs pairing. Thereby, pairing may be easily performed.

Although embodiments of the present invention have been disclosed for illustrative purposes, those skilled in the art will appreciate that various modifications, additions and substitutions are possible, without departing from the scope and spirit of the invention as disclosed in the accompanying claims.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

What is claimed is:
1. An image display apparatus comprising:
a display;
an interface to exchange data with a mobile terminal; and
a controller electrically connected to the display and the interface,
wherein, when a first distance between the mobile terminal and the image display apparatus is a predetermined distance, pairing is performed with the mobile terminal,
wherein, when the pairing with the mobile terminal is completed, the display displays a first object indicating that the mobile terminal is paired with the image display apparatus,
wherein, when the first object is selected, the display displays an application list including a first application corresponding to the paired mobile terminal,
wherein, when the first application is selected, the interface wirelessly transmits a request for transmission of a mirroring image to the mobile terminal, and
wherein the display displays the mirroring image received from the mobile terminal and displays additional information related to the mirroring image in a blank area other than a display area for display of the mirroring image.
2. The image display apparatus according to claim 1, further comprising:
a second interface to receive a signal from a remote control device, wherein the display displays a pointer on the display, based on a pointing signal of the remote control device, and wherein, when the pointer is located in the display area displaying the mirroring image, the display displays the additional information related to the mirroring image in the blank area.

3. The image display apparatus according to claim 2, wherein, when the additional information related to the mirroring image is displayed, the mirroring image is moved to the blank area and the display displays the moved mirroring image in the blank area.

4. The image display apparatus according to claim 1, further comprising:
a second interface to receive a signal from a remote control device,
wherein the display displays a pointer based on a pointing signal of the remote control device,
wherein, when the pointer is located in a second area corresponding to the blank area, a back key of the remote control device operates, or the pointer flicks to the left in displaying the mirroring image, the display displays the additional information related to the mirroring image in the second area, and
wherein, when the pointer is located in a third area corresponding to the blank area, or the pointer flicks to the right in displaying the mirroring image, the display displays the additional information related to the mirroring image in the third area.

5. The image display apparatus according to claim 4, wherein, when the pointer located in the second area moves to the third area in displaying the mirroring image, the display displays second additional information in the third area with first additional information displayed in the second area.

6. The image display apparatus according to claim 4, wherein, when the pointer located in the second area moves to the third area in displaying the mirroring image, the additional information displayed in the second area disappears and the display displays the additional information in the third area.

7. The image display apparatus according to claim 1, wherein the additional information includes at least one of an image adjustment item for the mirroring image, a share item for sharing the image, a previous image for the mirroring image, a next image for the mirroring image, an image list related to the mirroring image, an application item related to the mirroring image, and detailed information about the mirroring image.

8. The image display apparatus according to claim 1, wherein, when the mirroring image is a home screen window or idle screen window of the mobile terminal, the display displays, in the blank area, at least one of an object corresponding to a camera manipulation button attached to the mobile terminal, an object corresponding to a power button, an object corresponding to a volume adjustment button and a zooming adjustment button.

9. The image display apparatus according to claim 1, wherein, when the mirroring image is a home screen window or idle screen window of the mobile terminal, the display displays, in the blank area, at least one of an object indicating a first connector for connection with an external device and an object indicating a second connector for connection with an additional detachable memory.

10. The image display apparatus according to claim 1, wherein the additional information related to the mirroring image is changed according to an attribute of the mirroring the image.

11. The image display apparatus according to claim 1, wherein the mirroring image received from the mobile terminal is scaled and the display displays the scaled mirroring image in a first area of the display and displays the additional information related to the mirroring image in a second area, the second area being the blank area.

12. The image display apparatus according to claim 1,
wherein, when the first application in the application list is selected, the interface receives, from the mobile terminal, the mirroring image in response to the request for transmission of the mirroring image.

13. The image display apparatus according to claim 1, wherein, when pairing with a second mobile terminal is additionally performed while the object indicating the paired mobile terminal is displayed, the display displays the object indicating the paired mobile terminal and a second object indicating the second mobile terminal.

14. The image display apparatus according to claim 1, wherein the mirroring image received from the mobile terminal comprises an application execution image of an application executed in the mobile terminal.

15. The image display apparatus according to claim 1, wherein, when the mobile terminal receives the request for transmission of the mirroring image, the mobile terminal performs an application corresponding to the first application, displays an image of the performed application, and transmits the mirroring image corresponding to the image of the performed application.

* * * * *